United States Patent
Lowe et al.

(10) Patent No.: US 12,485,535 B2
(45) Date of Patent: Dec. 2, 2025

(54) OBJECT MANIPULATOR WITH EXTENDIBLE ARMS

(71) Applicant: Simbiotix Control Inc., Mississauga (CA)

(72) Inventors: Gregory Lowe, Mississauga (CA); Bradley Balaban, Mississauga (CA)

(73) Assignee: SIMBIOTIX CONTROL INC., Mississauga (CA)

( * ) Notice: Subject to any disclaimer, the term of this patent is extended or adjusted under 35 U.S.C. 154(b) by 136 days.

(21) Appl. No.: 18/419,125

(22) Filed: Jan. 22, 2024

(65) Prior Publication Data

US 2024/0253213 A1   Aug. 1, 2024

Related U.S. Application Data

(60) Provisional application No. 63/481,047, filed on Jan. 23, 2023.

(51) Int. Cl.
*B25J 9/00* (2006.01)
*B25J 9/02* (2006.01)
(Continued)

(52) U.S. Cl.
CPC ............ *B25J 9/1612* (2013.01); *B25J 9/023* (2013.01); *B25J 9/1653* (2013.01); *B25J 15/0028* (2013.01)

(58) Field of Classification Search
CPC ........ B25J 9/1612; B25J 9/023; B25J 9/1653; B25J 15/0028; B25J 9/041; B25J 15/0253; B25J 18/025
See application file for complete search history.

(56) References Cited

U.S. PATENT DOCUMENTS

| | | |
|---|---|---|
| 3,655,232 A | 4/1972 | Martelee |
| 9,327,411 B2 | 5/2016 | Ganz et al. |

(Continued)

FOREIGN PATENT DOCUMENTS

| | | |
|---|---|---|
| CN | 113212878 A | 8/2021 |
| EP | 2581328 B1 | 4/2013 |

(Continued)

OTHER PUBLICATIONS

Orbitor™ RS2 Microplate Mover (publication date Jan. 2020)—https://www.thermofisher.com/order/catalog/product/ORB2001.

(Continued)

*Primary Examiner* — Ian Jen
(74) *Attorney, Agent, or Firm* — Smart & Biggar LP

(57) ABSTRACT

Disclosed herein is an object manipulator, comprising first and second extendible arms, a support member, and an end effector configured for grasping an object. The end effector comprises first and second end effector counterparts, wherein the first counterpart is disposed on the first arm and the second counterpart is disposed on the second arm. The end effector is displaceable, relative to the support member, via extension and retraction of the extendible arms. While the end effector and the object are in a grasping-effectible relationship, the first and second end effector counterparts are disposed, relative to the object, such that the object is graspable by the end effector. While the end effector and the object are in a grasping-ineffective relationship, the first and second end effector counterparts are displaceable, relative to the object, via the extendible arms, such that the end effector and the object become disposed in the grasping-effective relationship.

46 Claims, 40 Drawing Sheets

(51) Int. Cl.
*B25J 9/16* (2006.01)
*B25J 15/00* (2006.01)

(56) References Cited

U.S. PATENT DOCUMENTS

| | | | |
|---|---|---|---|
| 11,254,015 B2 | 2/2022 | Riff et al. | |
| 12,312,187 B2 * | 5/2025 | Scott | B65G 59/106 |
| 2018/0222062 A1 | 8/2018 | Harkness et al. | |
| 2021/0024289 A1 | 1/2021 | Riff et al. | |

FOREIGN PATENT DOCUMENTS

| | | |
|---|---|---|
| EP | 2164684 B1 | 5/2020 |
| WO | 2003037574 A2 | 5/2003 |
| WO | 2022099437 A1 | 5/2022 |

OTHER PUBLICATIONS

Spinnaker Microplate Robot (publication date Apr. 2017)—https://www.thermofisher.com/order/catalog/product/SPK0001.
Automated Microplate Management (publication date Nov. 2020)—https://www.agilent.com/en/product/automated-liquid-handling/automated-microplate-management.
Mobile Robots (publication date Jun. 2022)—https://biosero.com/integrations/mobile-robots/.

* cited by examiner

OBJECT MANIPULATOR WITH EXTENDIBLE ARMS

FIELD

This disclosure generally relates to robotic apparatuses, systems, and methods, particularly robotic apparatuses, systems, and methods for displacing objects.

BACKGROUND

Existing systems include robots for displacing objects to effectuate the functionality of the systems. For example, medical, chemical, and biological laboratories use high numbers of microplates and related labware in their drug development and analytical programs. To be cost effective, accurate, and for health and safety, many modern high throughput laboratory analysis systems are automated, which include conveyors, robots, and other microplate handling devices integrated into the system for moving the microplates through a sequence of instrument workstations, such workstations including, for example, plate de-lidders, plate readers, plate flippers, plate shakers, thermocyclers and protein crystallography workstations. At each workstation, a pre-determined operation is performed on the respective sample contained in each microplate. Increasingly, such automated systems are centrally controlled by a computer programmed with control system software designed for this purpose. Each microplate is typically bar-coded or otherwise machine readably marked to allow for the individual identification and tracking of samples throughout the system.

Due to the inclusion of robots, existing systems avoid manual displacement of objects by a person. For example, existing automated analysis systems allow laboratory personnel to avoid manual displacement and restocking of the microplates. Such manual work is tedious, time consuming, and prevents laboratory personnel from doing higher level tasks. Moreover, failure to timely replenish the microplates may result in failed analytics, for example, due to expired reagents. Manual displacement and restocking of microplates may also be subject to error, which may lead to sequencing errors by the automated system.

Unfortunately, existing systems have a large footprint and take up valuable space. For example, existing automated analysis systems take up valuable space in the laboratory. In addition, microplate accessories of existing automated analysis systems, such as plate hotels comprising one or more plate nests, plate readers, de-lidders, and stacking sleeves, increase the footprint of the system and take up additional lab space.

SUMMARY

In one aspect, there is provided an object manipulator, comprising: a first extendible arm; a second extendible arm; a support member; and an end effector, configured for grasping an object, comprising a first end effector counterpart and a second end effector counterpart, wherein the first end effector counterpart is disposed on the first extendible arm and the second end effector counterpart is disposed on the second extendible arm; wherein: the first extendible arm is extendible and retractable for displacing the first end effector counterpart, relative to the support member; the second extendible arm is extendible and retractable for displacing the second end effector counterpart, relative to the support member; the end effector is configurable in a grasping-effective configuration and a grasping-ineffective configuration, wherein: in the grasping-effective configuration, the first end effector counterpart and the second end effector counterpart are co-operatively configured for grasping the object; and in the grasping-ineffective configuration, the first end effector counterpart and the second end effector counterpart are co-operatively configured such that the end effector is ineffective for grasping the object, such that there is an absence of grasping of the object; the end effector and the object are configurable for disposition in a grasping-effectible relationship and a grasping-ineffective relationship, wherein, while the end effector is in the grasping-ineffective configuration, and: the end effector and the object are disposed in the grasping-effectible relationship, the first and second end effector counterparts are disposed, relative to the object, such that grasping of the object, by the end effector, is effectuatable via transition of the end effector from the grasping-ineffective configuration to the grasping-effective configuration; and the end effector and the object are disposed in the grasping-ineffective relationship, the first end effector counterpart and the second end effector counterpart are displaceable, relative to the object, such that the end effector and the object become disposed in the grasping-effective relationship, wherein the displacement of the first end effector counterpart and the second end effector counterpart, relative to the object, for effectuating the disposition of the end effector and the object in the grasping-effective relationship, includes displacement of the first end effector counterpart and the second end effector counterpart, relative to the object, via the first and second extendible arms; and while the object is grasped by the end effector, the object is displaceable, relative to the support member, via the first and second extendible arms.

In another aspect, there is provided a kit for modifying a robot, the robot comprising a base, the kit comprising: robot adaptor components, comprising: an object manipulator, comprising: a first extendible arm; a second extendible arm; and an end effector, configured for grasping an object, comprising a first end effector counterpart and a second end effector counterpart, wherein the first end effector counterpart is disposed on the first extendible arm and the second end effector counterpart is disposed on the second extendible arm; wherein: while the robot adaptor components are installed on the robot, with effect that a modified robot is established, such that the modified robot includes the object manipulator and the base: the first extendible arm is extendible and retractable for displacing the first end effector counterpart, relative to the base; the second extendible arm is extendible and retractable for displacing the second end effector counterpart, relative to the base; the end effector is configurable in a grasping-effective configuration and a grasping-ineffective configuration, wherein: in the grasping-effective configuration, the first end effector counterpart and the second end effector counterpart are co-operatively configured for grasping the object; and in the grasping-ineffective configuration, the first end effector counterpart and the second end effector counterpart are co-operatively configured such that the end effector is ineffective for grasping the object, such that there is an absence of grasping of the object; the end effector and the object are configurable for disposition in a grasping-effectible relationship and a grasping-ineffective relationship, wherein, while the end effector is in the grasping-ineffective configuration, and: the end effector and the object are disposed in the grasping-effectible relationship, the first and second end effector counterparts are disposed, relative to the object, such that grasping of the object, by the end effector, is effectuatable via transition of the end effector from the grasping-ineffective configuration to the grasping-effective configuration; and the end effector and the object are disposed in the grasping-ineffective relationship, the first end effector counterpart and the second end effector counterpart are displaceable, relative to the object, such that the end effector and the object become disposed in the grasping-effective relationship, wherein the displacement of the first end effector counterpart and the second end effector counterpart, relative to the object, for effectuating the disposition of the end effector and the object in the grasping-effective relationship, includes displacement of the first end effector counterpart and the second end effector counterpart, relative to the object, via the first and second extendible arms; and while the object is grasped by the end effector, the object is displaceable, relative to the base, via the first and second extendible arms.

In another aspect, there is provided a robot, comprising: a base; an object manipulator, comprising: a first extendible arm; a second extendible arm; and an end effector, configured for grasping an object, comprising a first end effector counterpart and a second end effector counterpart, wherein the first end effector counterpart is disposed on the first extendible arm and the second end effector counterpart is disposed on the second extendible arm; wherein: the first extendible arm is extendible and retractable for displacing the first end effector counterpart, relative to the base; the second extendible arm is extendible and retractable for displacing the second end effector counterpart, relative to the base; the end effector is configurable in a grasping-effective configuration and a grasping-ineffective configuration, wherein: in the grasping-effective configuration, the first end effector counterpart and the second end effector counterpart are co-operatively configured for grasping the object; and in the grasping-ineffective configuration, the first end effector counterpart and the second end effector counterpart are co-operatively configured such that the end effector is ineffective for grasping the object, such that there is an absence of grasping of the object; the end effector and the object are configurable for disposition in a grasping-effectible relationship and a grasping-ineffective relationship, wherein, while the end effector is in the grasping-ineffective configuration, and: the end effector and the object are disposed in the grasping-effectible relationship, the first and second end effector counterparts are disposed, relative to the object, such that grasping of the object, by the end effector, is effectuatable via transition of the end effector from the grasping-ineffective configuration to the grasping-effective configuration; and the end effector and the object are disposed in the grasping-ineffective relationship, the first end effector counterpart and the second end effector counterpart are displaceable, relative to the object, such that the end effector and the object become disposed in the grasping-effective relationship, wherein the displacement of the first end effector counterpart and the second end effector counterpart, relative to the object, for effectuating the disposition of the end effector and the object in the grasping-effective relationship, includes displacement of the first end effector counterpart and the second end effector counterpart, relative to the object, via the first and second extendible arms; and while the object is grasped by the end effector, the object is displaceable, relative to the base, via the first and second extendible arms.

Other aspects will be apparent from the description and drawings provided herein.

BRIEF DESCRIPTION OF DRAWINGS

In the figures, which illustrate example embodiments.

DETAILED DESCRIPTION

Figure 1:
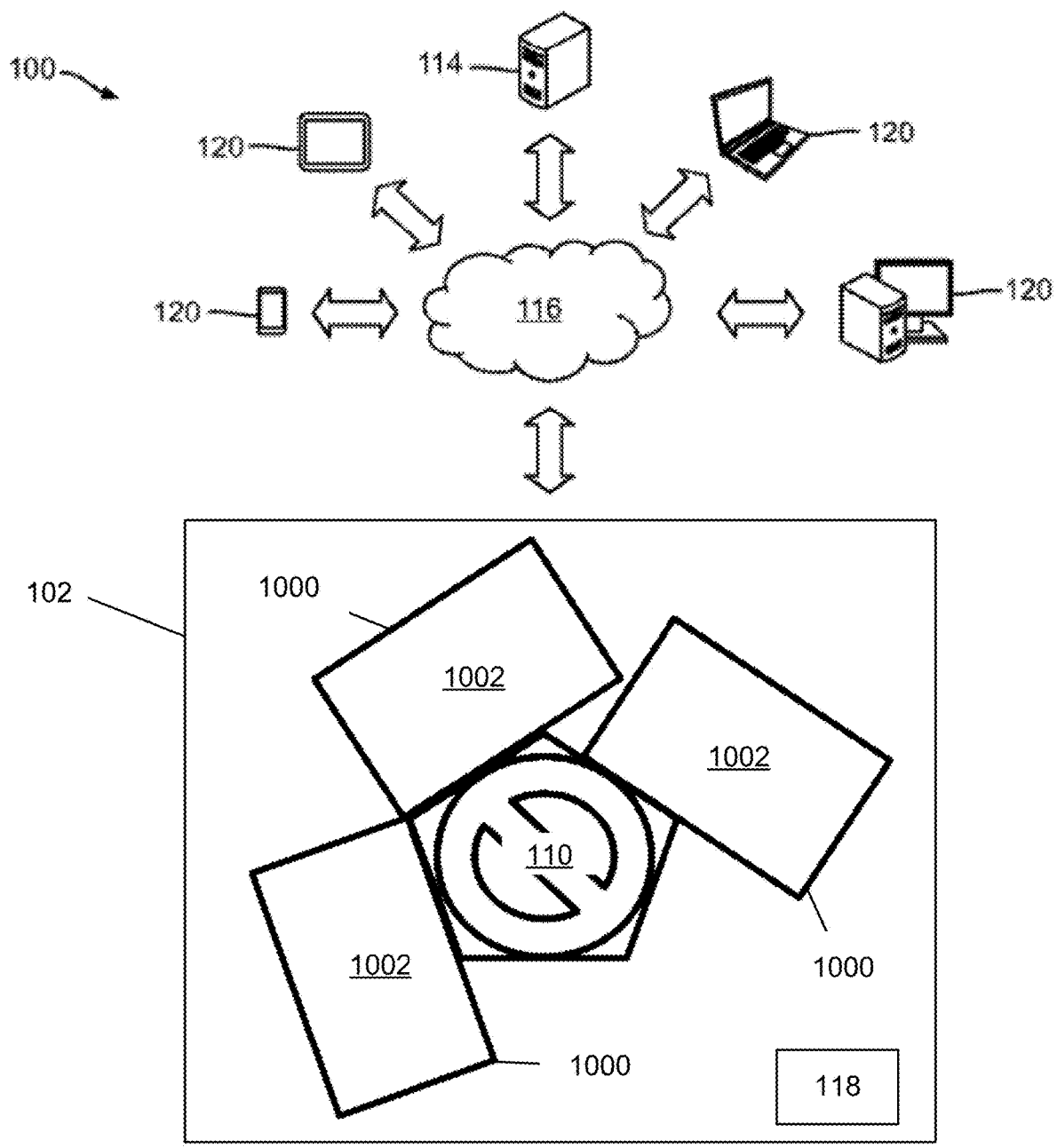
FIG. 1 is a schematic diagram of a robotic system.

Disclosed herein is a robot 110 for displacing an object 10. In some embodiments, for example, the object 10 is a microplate configuration 10, wherein the microplate configuration 10 includes a microplate 12 and a microplate lid 14, such that the robot 10 is a microplate manipulator robot 110. In some embodiments, for example, the robot 110 includes an object manipulator 402 that includes an extendible arm configuration 408 having a first extendible arm 420A and a second extendible arm 420B, and further includes an end effector 410 connected to the extendible arm configuration 408. The end effector 410 is displaceable vertically, longitudinally, laterally, and rotationally, relative to the robot base 302. In some embodiments, for example, the end effector 410 can be displaced to grasp the object 10. While the end effector 410 is grasping the object 10, the object 10 is displaceable vertically, longitudinally, laterally, and rotationally, relative to the robot base 302. In some embodiments, for example, the grasped object 10 can be displaced to a desired location (e.g. the grasped microplate configuration 10 can be displaced to a plate nest 1002 of an instrument workstation 1000, or to an accessory 502 of the robot 110 that is configured to interact with an object 10 that is grasped by the object manipulator 402).

In some embodiments, for example, the object manipulator 402 defines an internal window 520. While there is an absence of occlusion of the internal window 520 (e.g. while there is an absence of grasping of an object 10, such as a microplate configuration 10, by the object manipulator 402, or while the object 10 is grasped by the object manipulator 402 such that there is an absence of occlusion of the internal window 520 by the object 10), the object manipulator 402 is vertically displaceable, relative to an accessory 502 of the robot 110 that is configured to interact with a grasped object 10, such that the accessory 502 can pass through the internal window 520. In some embodiments, for example, wherein the object 10 is a microplate configuration 10, the object manipulator 402 is a microplate manipulator 402, and the accessory 502 is a microplate accessory 502.

In some embodiments, for example, the object manipulator 402 and the accessory 502 are disposed in vertical alignment.

FIG. 1 depicts a robotic system 100. In some embodiments, for example, the robotic system 100 is configured for automating object displacement in a site 102. In some embodiments, for example, wherein the object 10 is the microplate configuration 10, the site 102 is a laboratory.

In some embodiments, for example, the site 102 comprises one or more stations 1000. Each one of the one or more stations 1000, independently, includes one or more object supporters 1002. In some embodiments, for example, as depicted in FIG. 1, wherein the site 102 is a laboratory, the station 1000 is an instrument workstation 1000, and the object supporter 1002 is a plate nest 1002. As depicted, each workstation 1000 includes one plate nest 1002. In some embodiments, for example, a workstation 1000 includes more than one plate nest 1002. Each one of the one or more plate nests 1002 is configured to receive a microplate configuration 10, such that, while the microplate configuration 10 is received in the plate nest 1002, the microplate configuration 10 is supported by the plate nest 1002. While the microplate configuration 10 is disposed in the plate nest 1002, an interaction between the microplate configuration 10 and the workstation 1000 can be effectuated (e.g. a pre-determined operation is performed on the samples contained in the microplate 12). One or more robots 110 are deployed in the site 102 for moving microplate configurations 10 from one workstation 1000 to a second workstation 1000, from a workstation 1000 to the robot 110, or from the robot 110 to the workstation 1000.

Each one of the robots 110, independently, are disposed in operable communication, for example, data communication, with one or more server computers 114 via a network 116 such as the Internet, a local area network (LAN), a wide area network (WAN), a metropolitan area network (MAN), and/or the like, preferably via suitable wireless communication technologies such as such as WI-FI® (WI-FI is a registered trademark of Wi-Fi Alliance, Austin, TX, USA), BLUETOOTH® (BLUETOOTH is a registered trademark of Bluetooth Sig Inc., Kirkland, WA, USA), Bluetooth Low Energy (BLE), Z-Wave, Long Range (LoRa), ZIGBEE® (ZIGBEE is a registered trademark of ZigBee Alliance Corp., San Ramon, CA, USA), wireless broadband communication technologies such as Global System for Mobile Communications (GSM), Code Division Multiple Access (CDMA), Universal Mobile Telecommunications System (UMTS), Worldwide Interoperability for Microwave Access (WiMAX), CDMA2000, Long Term Evolution (LTE), 3GPP, 5G networks, and/or the like. In some embodiments, the network 116 may also comprise one or more communication nodes 118, such as routers, switches, wireless access points, and/or the like, deployed in the site 102 for facilitating access of the network 116 by the robots 110.

In some embodiments, for example, the robots 110 are disposed in operable communication with the server 114 and/or the network 116 using suitable wired communication technologies such as Ethernet, USB cables, serial cables, parallel cables, and/or the like, if needed.

In some embodiments, for example, the robotic system 100 comprises one or more client computing devices 120 used by one or more users to communicate with the server computer 114 via the network 116 for performing various tasks such as placing an object-moving order, querying the status of an object-moving order, querying the status of the robot 110 and workstations 1000, querying the locations of objects 10, receiving notifications of object-moving orders, teaching a position of the workstation 1000, for example, the nest 10002 of the workstation 1000, relative to the robot 110, to the robot 110, defining an end effector displacement sequence, and the like. In some embodiments, for example, the client computing devices 120 are any suitable portable or non-portable computing devices such as desktop computers, laptop computers, tablets, smartphones, Personal Digital Assistants (PDAs), and/or the like.

In some embodiments, for example, the server computer 114 and client computing device 120 have similar hardware architecture and comprise a plurality of components including, e.g., a processor (also called a processing structure), system memory (volatile and/or non-volatile memory, e.g., RAM, ROM, EEPROM, and/or the like), non-removable or removable memory (e.g., hard disk drives, CD-ROMs, DVDs, solid-state memory, flash memory, and/or the like), networking components for connecting to the network 116, a display, one or more input devices such as a keyboard and a computer mouse, other input/output devices such as a microphone, a speaker, a printer, a scanner, and/or the like, and a system bus coupling the various computer components to the processor.

In some embodiments, for example, the processor is one or more single-core or multiple-core computing processors such as INTEL® microprocessors (INTEL is a registered trademark of Intel Corp., Santa Clara, CA, USA), AMD® microprocessors (AMD is a registered trademark of Advanced Micro Devices Inc., Sunnyvale, CA, USA), ARM® microprocessors (ARM is a registered trademark of Arm Ltd., Cambridge, UK) manufactured by a variety of manufactures such as Qualcomm of San Diego, California, USA, under the ARM® architecture, or the like.

In some embodiments, for example, the processor is one or more real-time processors, programmable logic controllers (PLCs), microcontroller units (MCUs), µ-controllers (UCs), specialized or customized processors or controllers using e.g., field-programmable gate array (FPGA) or application-specific integrated circuit (ASIC) technologies, and/or the like.

In some embodiments, for example the robot 110 comprises a plurality of components including, e.g., a processor, system memory (volatile and/or non-volatile memory, e.g., RAM, ROM, EEPROM, and/or the like), non-removable or removable memory (e.g., hard disk drives, CD-ROMs, DVDs, solid-state memory, flash memory, and/or the like), networking components for connecting to the network 116, a plurality of sensors such as one or more proximity sensors, optical sensors, and encoders, a plurality of action components including a lift mechanism 340, an object manipulator 402, a base 302, and one or more accessories 502, and a system bus coupling the various components to the processor.

In some embodiments, for example the robot 110 comprises a display, one or more input devices such as a keyboard and a computer mouse, other input/output devices such as a microphone, a speaker, a printer, a scanner, and/or the like.

In some embodiments, for example the processor of the robot 110 is one or more real-time processors, PLCs, MCUs, UCs, specialized or customized processors or controllers using e.g., FPGA or ASIC technologies, and/or the like. In some embodiments, for example, the processor of the robot 110 is one or more single-core or multiple-core computing processors such as INTEL® microprocessors, AMD® microprocessors, ARM® microprocessors, and/or the like.

Figure 2:
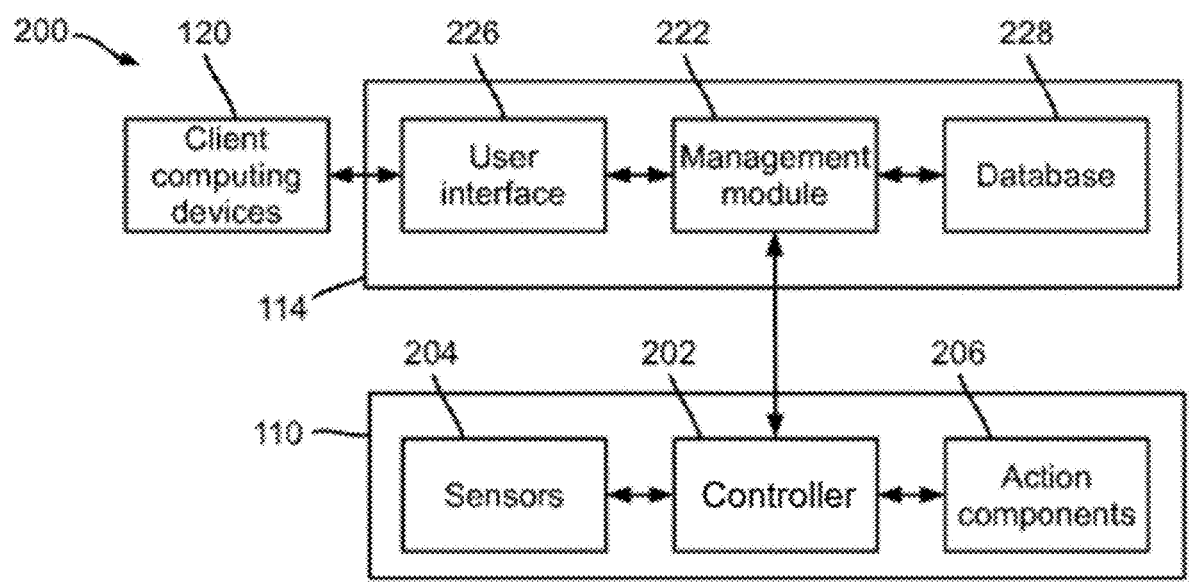
FIG. 2 is a schematic diagram showing the software structure of the robotic system of FIG. 1.

FIG. 2 is a schematic diagram showing the software structure 200 of the robotic system 100 in some embodiments. In some embodiments, for example, the robot 110 comprises a control module or a controller 202 disposed in operable communication with sensors 204, for example, proximity sensors, force sensors, vacuum sensors, optical sensors, and/or the like, as described in greater detail below, and action components 208, for example, the base 302, the lift mechanism 340, the object manipulator 402, and one or more accessories 502, as described in greater detail below.

The control module 202 receives data collected by the sensors 206 to make a plurality of decisions such as the exact location of an object (e.g. a microplate configuration 10 or a plate nest), robot navigation (e.g., the path from the current location of the robot 110 to a workstation 1000), the state of the accessory 502 (e.g. an empty space in a plate nest of an accessory 502), and the like, based on the received sensor data and the received user instructions. The controller 202 then instructs the action components 208 to perform an object-displacing action.

The server computer 114 comprises a management module 222 coupled to a user interface 226 and a database 228 thereof. The management module 222 communicates with the client computing devices 120 via the user interface 226 to receive user instructions such as instructions of moving one or more objects 10, initiating an object displacement sequence, initiating an interaction between the object 10 and the station 1000 (e.g. initiating a sample analysis sequence via one or more workstations 1000), and the like. The management module 222 then processes the user instructions and sends the processed instructions to the controller 202 of the robot 110 for execution. After receiving execution reports from the controller 202 of the robot 110, the management module 222 of the server computer 114 reports the execution reports and various information such as the object-moving results, status of the robot 110, the status of the site 102, the status of stations 1000, results of the interaction between the object 10 and the station 1000, and the like, to the user via the user interface 226. In some embodiments, for example, the management module 222 stores the execution reports and various information into the database 228.

In some embodiments, for example, the robot 110 includes sensors such as laser barcode readers, stereo camera, 3D camera, and light detection and ranging (LIDAR) sensors and computer vision technologies for object identification, such as identification of a microplate configuration 10 or a workstation 1000.

In some embodiments, for example, as depicted in FIG. 3 to FIG. 9, the robot 110 comprises: (i) a base 302 or base configuration 302, and (ii) a robot body 320. The robot body 320 comprises: (i) a frame 322, and (ii) an object manipulator configuration 330. The object manipulator configuration 330 comprises: (i) an object manipulator 402, (ii) a lift mechanism 340, (iii) an accessory mounting member 496, and (iv) an accessory configuration 500 comprising at least one accessory 502 that is configured to interact with an object 10 that is grasped by the object manipulator 402. In some embodiments, for example, wherein the object 10 is the microplate configuration 10, the accessory configuration 500 is a microplate accessory configuration 500.

The base 302 is connected to the robot body 320. The base 302 is configured to support the robot body 320. In this respect, in some embodiments, for example, the base 302 includes a support member 304, a bearing block 306 that is mounted to the support member 304, a bearing block 308 that is coupled to the bearing block 306, and a plurality of feet 310 that are mounted to the support member 304 with mechanical fasteners, such as nuts and bolts. The plurality of feet 310 are configured to be disposed in contact engagement with a reaction surface, such as the floor (e.g. of a laboratory) or the upper surface of a table (e.g. of a laboratory). The bearing block 308 is connected to a bottom frame member 324 of the frame 322. In some embodiments, for example, the support member 304, bearing blocks 306 and 308, feet 310, and the robot body 320 are co-operatively configured such that, while the feet 310 are disposed in contact engagement with the reaction surface, such that the base 302 is supported by the reaction surface, the robot body 320 is also supported by the reaction surface.

Figure 8:
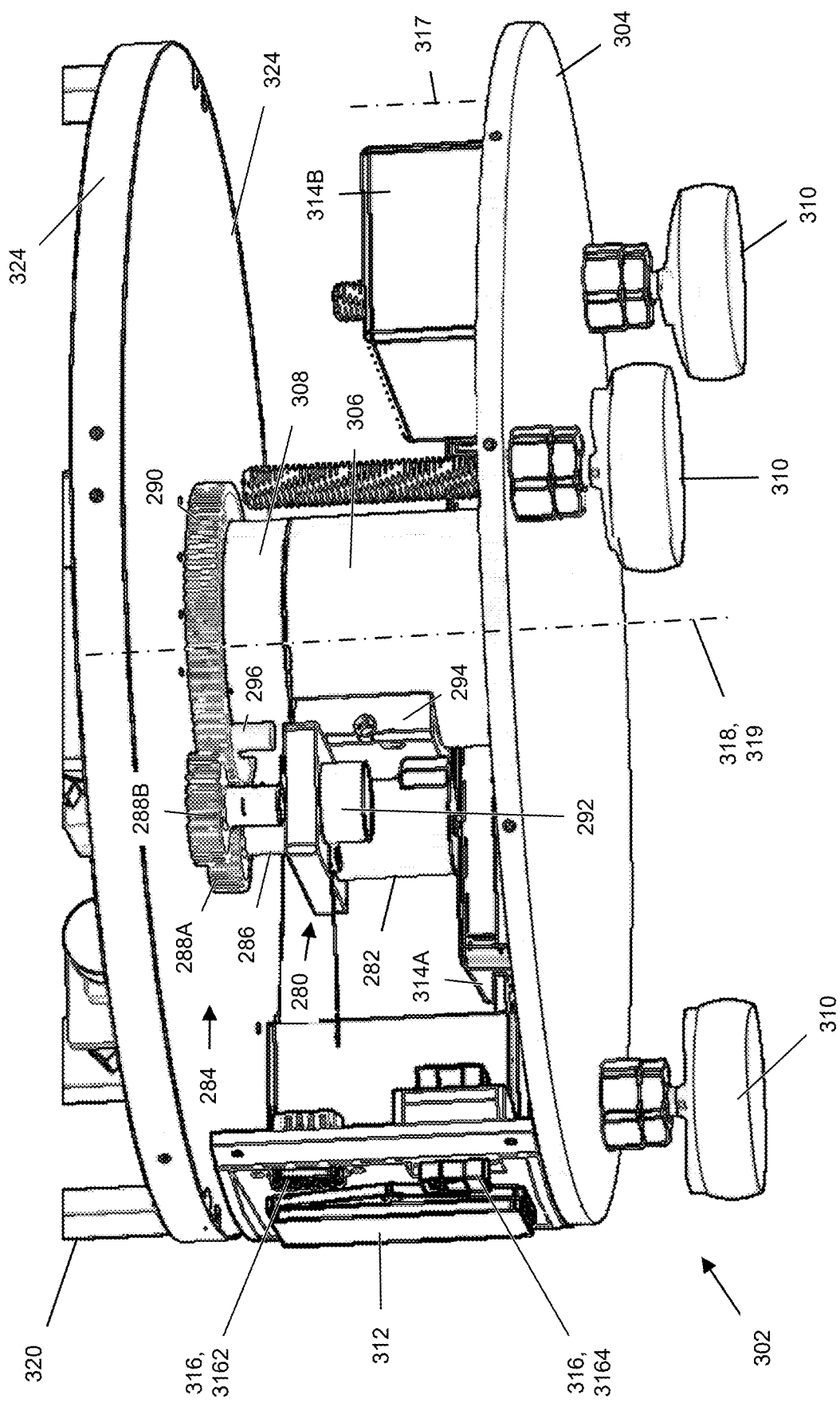
FIG. 8 is a front perspective view of a base of the robot of FIG. 3.
Figure 9:
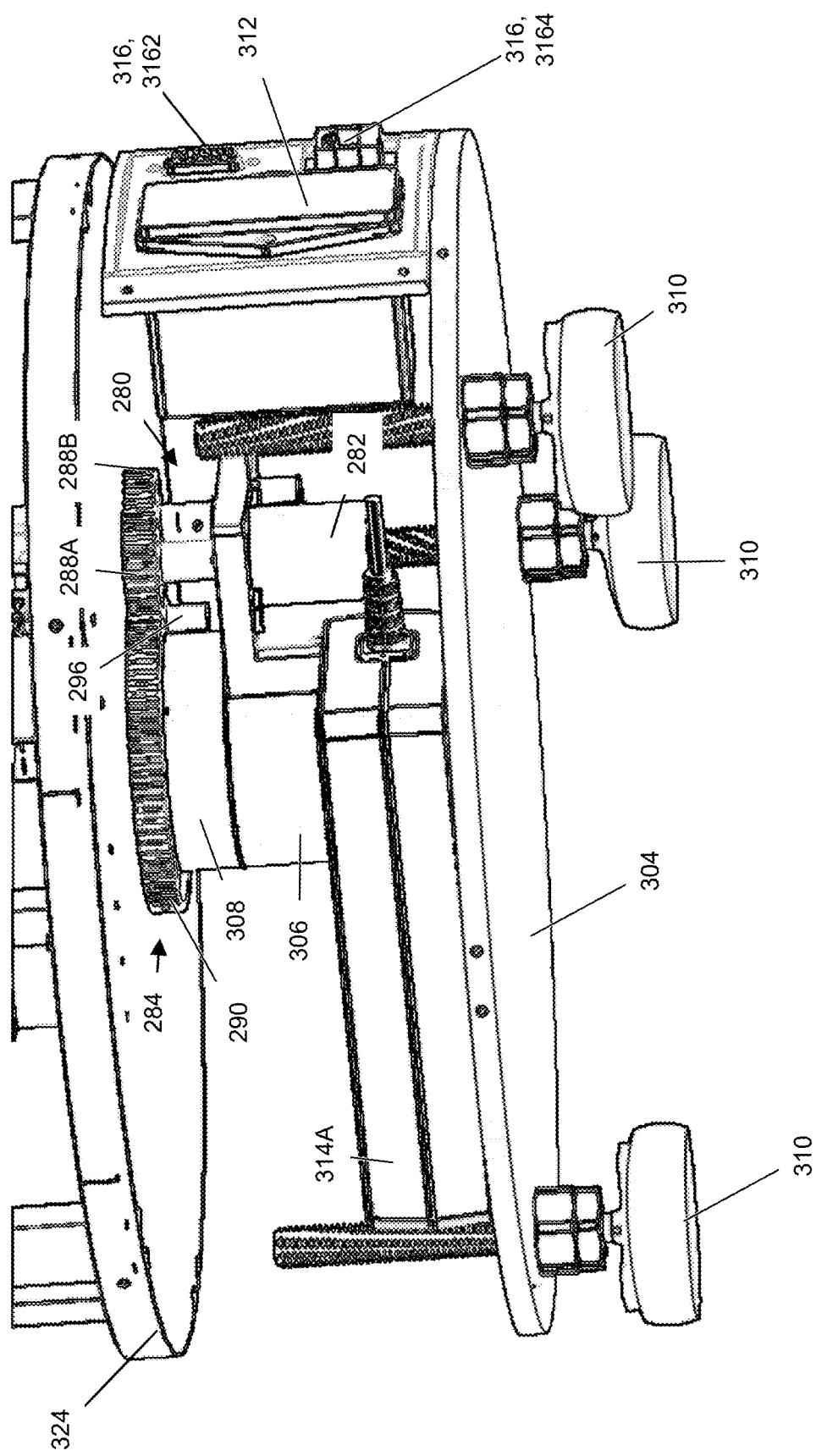
FIG. 9 is a rear perspective view of the base of the robot of FIG. 3.
Figure 10:
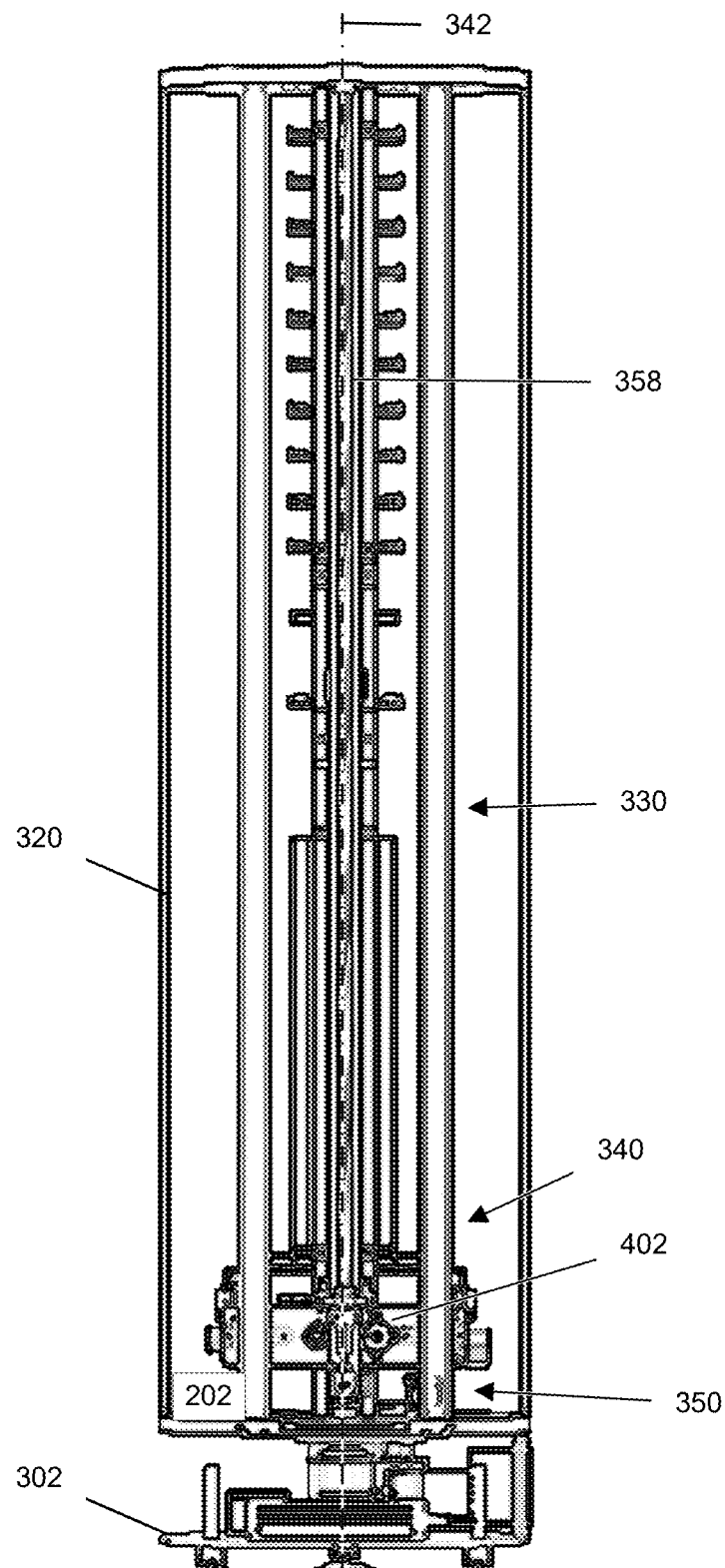
FIG. 10 is a rear view of the robot of FIG. 3.
Figure 11:
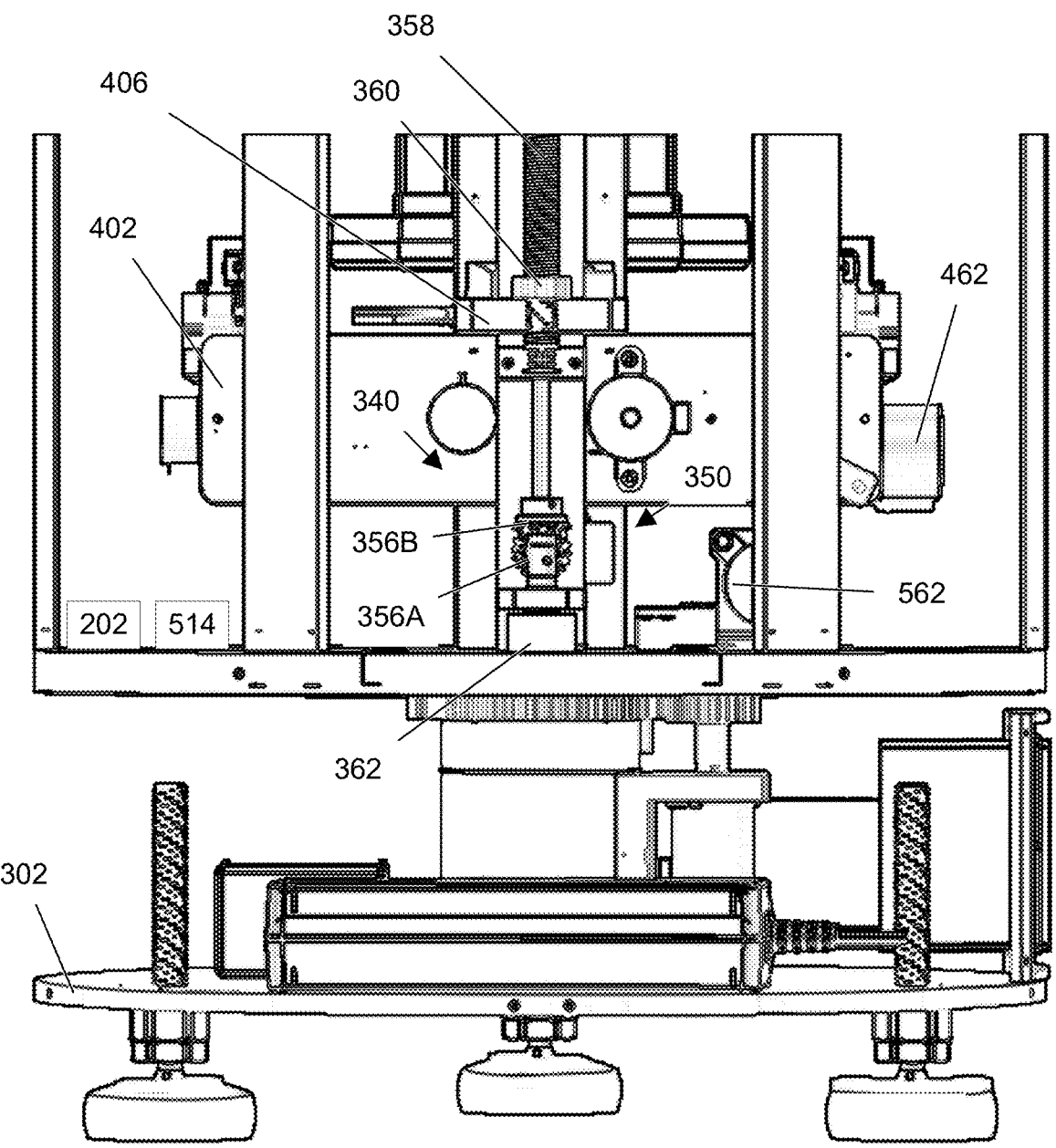
FIG. 11 is a rear view of a lower portion of the robot of FIG. 3.

In some embodiments, for example, the base 302 includes an electrical connector 312 that is disposed in electrical communication with a power supply 314 of the robot 110. As depicted in FIG. 8 and FIG. 9, in some embodiments, for example, the robot 110 includes two power supplies 314A and 314B. The power supplies 314A and 314B are mounted to the support member 304, and supply power to the electrical components of the robot 110. The electrical connector 312 is configured to be disposed in electrical communication with an electrical energy supply source, for example, an external electrical energy supply source, to supply electrical energy to the one or more power supplies 314 of the robot 110.

Figure 3:
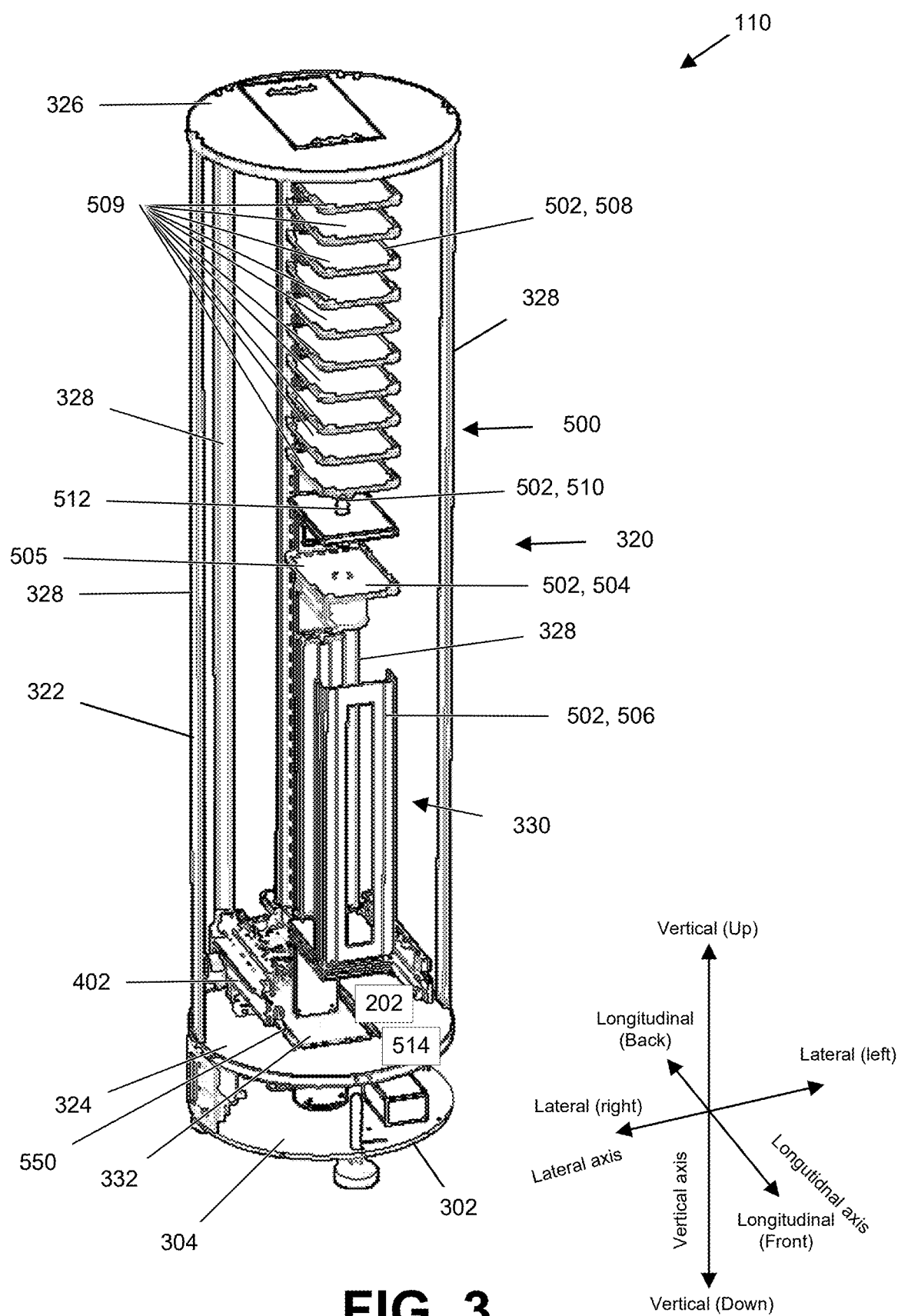
FIG. 3 is a front perspective view of a robot of the robotic system of FIG. 1.

In some embodiments, for example, the base 302 includes data connectors 316, such as serial pin connector 3162 and Ethernet cable connector 3162, which are disposed in data communication with the controller 202, which, in some embodiments, for example, is mounted to the bottom frame member 324, as depicted in FIG. 3. The data connectors 316 are configured to be disposed in data communication with the server 114 and/or the network 116 via serial cables and Ethernet cables, to effectuate the data communication between the controller 202 and the server 114 and/or the network 116.

In some embodiments, for example, the base 302 and the robot body 320 are co-operatively configured such that the robot body 320 is rotatable, relative to the base 302. In some embodiments, for example, the coupling of the bearing block 308 to the bearing block 306 is such that the bearing block 308 is rotatable, relative to the bearing block 306. In some embodiments, for example, the robot body 320 is rotatable 360 degrees, relative to the base 302. In some embodiments, for example, the robot body 320 is continuously rotatable, relative to the base 302 (e.g. the robot body 320 is rotatable, relative to the base 302, indefinitely). In some embodiments, for example, the connection of the bearing block 306 and the bearing block 308 is such that the bearing block 308 is continuously rotatable, relative to the bearing block 306. In some embodiments, for example, the continuous rotation of the robot body 320, relative to the base 302, is effectuated by slip rings. In some embodiments, the continuous rotatability of the robot body 320, relative to the base 302, is such that while the robot body 320 is disposed in a first angular position, relative to the base 302, the robot body 320 is configured to rotate, relative to the base 302, in a rotation direction (e.g. clockwise or counter-clockwise), to a second angular position, wherein the rotation of the robot body 320, relative to the base 302, from the first angular position to the second angular position includes: a rotation of the robot body 320, relative to the base 302, in the rotation direction, such that the robot body 320 is rotated, relative to the base 302, from the first angular position to the first angular position; and a further rotation of the robot body 320, relative to the base 302, in the rotation direction, such that the robot body 320 is rotated, relative to the base 302, from the first angular position to the second angular position.

In some embodiments, for example, the rotatability of the robot body 320, relative to the base 302, allows for a workstation 1000 to be disposed at any angular position relative to the robot 110. While the robot 110 is supported by the reaction surface, the rotatability of the robot body 320, relative to the base 302, is such that the robot body 320 is rotatable, relative to the reaction surface.

In some embodiments, for example, as depicted in FIG. 8 and FIG. 9, the base 302 includes an actuator configuration 280 to effect the rotational displacement of the robot body 320, relative to the base 302. In some embodiments, for example, the actuator configuration 280 includes a prime mover 282, for example, a motor, for example, an electric motor, that is disposed in operable communication with the robot body 320, for example, the bottom frame member 324. In some embodiments, for example, the prime mover 282 is mounted to the support member 304. The prime mover 282 is configured to generate a displacement force that is applicable to the bottom frame member 324 for rotationally displacing the robot body 320, relative to the base 302. In response to application of the displacement force from the prime mover 282 to the bottom frame member 324, the robot body 320 is rotationally displaced, relative to the base 302.

In some embodiments, for example, the prime mover 282 is configurable in a first rotational displacement drive state and a second rotational displacement drive state. In some embodiments, for example, while the prime mover 282 is disposed in the first rotational displacement drive state, the displacement force applied to the bottom frame member 324 has a clockwise direction, such that the robot body 320 is rotationally displaced in the clockwise direction, relative to the base 302, in response to application of the displacement force to the bottom frame member 324. In some embodiments, for example, while the prime mover 282 is disposed in the second rotational displacement drive state, the displacement force applied to the bottom frame member 324 has a counter-clockwise direction, such that the robot body 320 is rotationally displaced in the counter-clockwise direction, relative to the base 302, in response to application of the displacement force to the bottom frame member 324.

In some embodiments, for example, the prime mover 282 is disposed in data communication with the controller 202 and further disposed in electrical communication with the power supply 314, for actuation of the prime mover 282 in the first rotational displacement drive state and the second rotational displacement drive state, via control commands from the controller 202.

In some embodiments, for example, the actuator configuration 280 includes a transmission configuration 284 to effect the operable communication between the prime mover 282 and the robot body 320, in particular, between the prime mover 282 and the bottom frame member 324. In some embodiments, for example, the transmission configuration 284 includes an axle 286, gears 288A and 288B, and a bottom frame member connector 290, which, in some embodiments, for example, is a gear, which is disposed around the bearing block 308. As depicted in FIG. 8 and FIG. 9, the axle 286 connects the prime mover 282 and the gear 288A, which is connected to the gear 288B, which is connected to the bottom frame member connector 290, such that the displacement force generated by the prime mover 282 is applied to the bottom frame member 324 via the axle 286, gears 288A and 288B, and the bottom frame member connector 290. In this respect, the displacement force generated by the prime mover 282 is a robot body rotational displacement force. In response to application of the robot body rotational displacement force from the prime mover 282 to the bottom frame member 324, the robot body 320 is rotationally displaced, relative to the base 302.

In some embodiments, for example, the robot body 320 is rotatable, relative to the base 302, about a rotational axis 318, as depicted in FIG. 8. In some embodiments, for example, the rotational axis 318 is parallel to a vertical axis. In some embodiments, for example, the rotational axis 318 is parallel to a normal axis 317 of an upper surface of the support member 304. In some embodiments, for example, the rotational axis 318 is parallel to a central longitudinal axis 319 of the base 302 that extends through the center of the base 302. In some embodiments, for example, the rotational axis 318 and the central longitudinal axis 319 are congruent.

In some embodiments, for example, the actuator configuration 280 includes an encoder 292. The encoder 292 is coupled to the gear 288B, such that the encoder 292 is configured to detect the rotation of the gear 288B. In some embodiments, for example, the encoder 292 is disposed in data communication with the controller 202 and further disposed in electrical communication with the power supply 314. Based on the rotation of the gear 288B and the gear ratio between the gear 288B and the bottom frame member connector 290, the rotational displacement of the robot body 320, relative to the base 302, can be determined by the controller 202.

In some embodiments, for example, as depicted in FIG. 8 and FIG. 9, the base 302 includes a sensor 294 and a sensor actuator 296. In some embodiments, for example, the sensor 294 is a proximity sensor, for example a Littelfuse reed switch, and the sensor actuator 296 is a magnet. In some embodiments, for example, the sensor 294 is mounted to the bearing 306, and the sensor actuator 296 is mounted to the bottom frame member connector 290 such that the sensor actuator 296 is rotated, about the axis 318, while the bottom frame member connector 290 is rotated, about the axis 318. In some embodiments, for example, the sensor 294 is disposed in data communication with the controller 202 and further disposed in electrical communication with the power supply 314.

While the sensor 294 and the sensor actuator 296 are disposed in alignment, for example, a vertical alignment, the sensor 294 and the sensor actuator 296 are disposed in a proximate relationship, such that the sensor actuator 296 is detected by the sensor 294. While the sensor actuator 296 is detected by the sensor 294, the sensor 294 is configured to send data to the controller 202, representative of the sensor 294 and the sensor actuator 296 being disposed in the proximate relationship. In this respect, the sensor 294 and the sensor actuator 296 are co-operatively configured to define an initial rotational or angular position of the robot body 320, relative to the base 302. In response to processing of the data from the sensor 294 representative of the sensor 294 and the sensor actuator 296 being disposed in the proximate relationship, the controller 202 determines that the robot body 320 is disposed, relative to the base 302, in the initial rotational or angular position.

Figure 5:
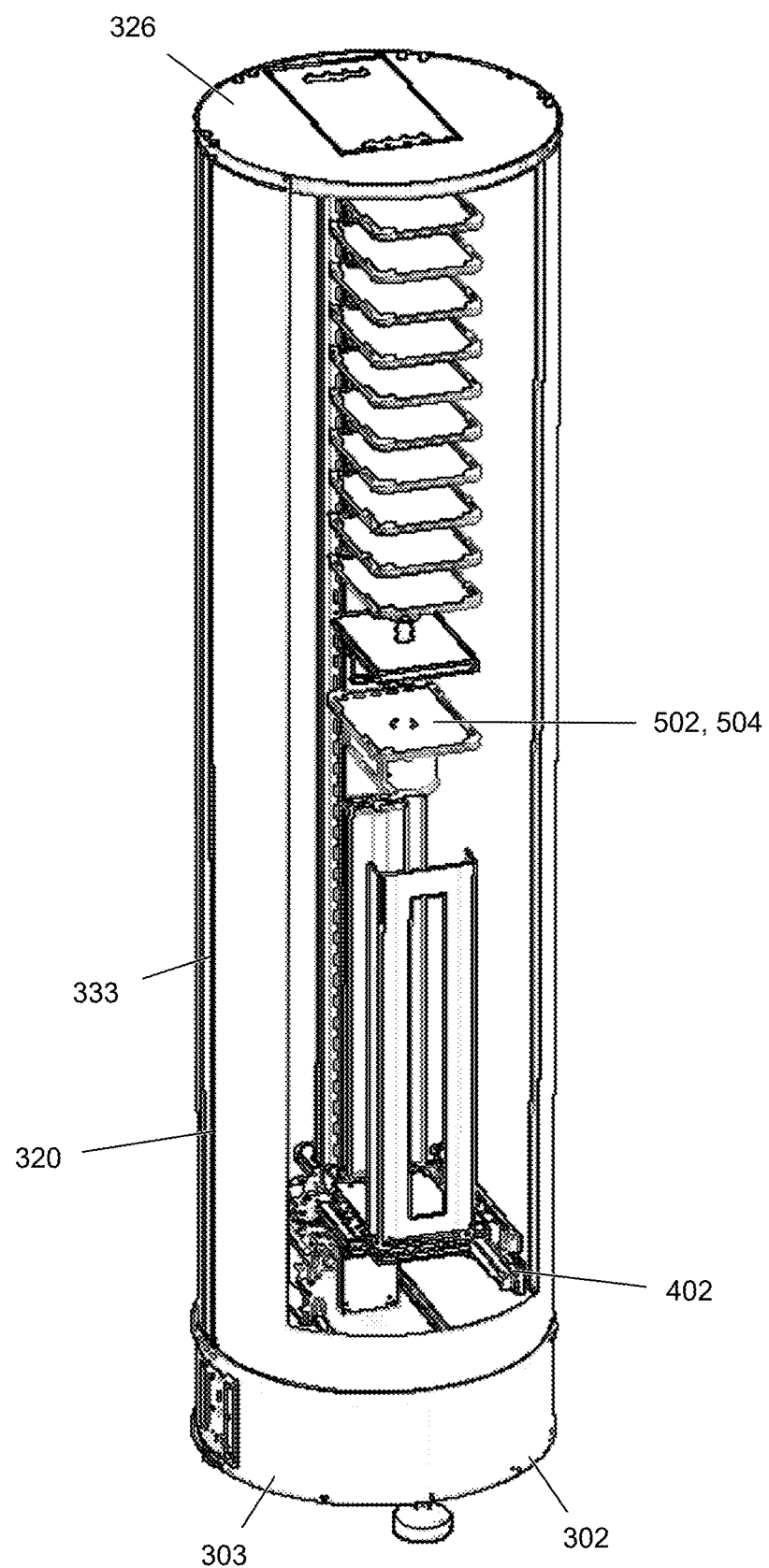
FIG. 5 is a front perspective view of the robot of FIG. 3, including a frame wall and a base wall.

In some embodiments, for example, the base 302 includes a base wall 303, as depicted in FIG. 5, to protect the components of the robot 110 that are disposed within the base 302 from damage, for example, damage from environmental elements or from personnel and other robots in the site 102. In some embodiments, for example, the mounting of internal components of the base 302, such as the actuator configuration 280, power supplies 314A and 314B, and the bearings 306 and 308, to the support member 304 is such that the internal components are accessible via a side panel of the base wall 303, for example, for maintenance or replacement of the internal components. In some embodiments, for example, the internal components are accessible by removal of the base wall 303.

In some embodiments, for example, as depicted in FIG. 3, the robot body 320 includes a frame 322. The frame 322 includes the lower frame member 324, an upper frame member 326, and frame support members 328 that extend between the lower frame member 324 and the upper frame member 326.

The object manipulator configuration 330 of the robot body 320 is coupled to the frame 322. In some embodiments, for example, as described in greater detail herein, the coupling of the object manipulator configuration 330 to the frame 322 is such that the object manipulator configuration 330 is laterally displaceable, relative to the frame 322.

In some embodiments, for example, the frame 322 includes a frame wall 333 to protect the components of the robot 110 that are disposed within the frame 322 from damage, for example, damage from environmental elements or from laboratory personnel and other robots in the site 102. In some embodiments, for example, the mounting of internal components of the frame 322 is such that the internal components are accessible via a side panel of the frame 322, for example, for maintenance or replacement of the internal components. In some embodiments, for example, the internal components are accessible by removal of the frame wall 333.

In some embodiments, for example, as depicted in FIG. 4 and FIG. 10 to FIG. 13, the object manipulator configuration 330 includes the lift mechanism 340. The lift mechanism 340 is mounted to a lift mechanism frame member 329 of the object manipulator configuration 330, which extends between an object manipulator configuration lower member 332 and an object manipulator configuration upper member 334. In some embodiments, for example, the central longitudinal axis of the lift mechanism 340 is perpendicular to an upper surface of the lower frame member 324. In some embodiments, for example, the central longitudinal axis of the lift mechanism 340 is perpendicular to a lower surface of the upper frame member 326. In some embodiments, for example, while the robot body 320 is supported by the base configuration 302, the central longitudinal axis of the lift mechanism 340 is perpendicular to an upper surface of the support member 304. In some embodiments, for example, the central longitudinal axis of the lift mechanism 340 is parallel to a vertical axis.

The lift mechanism 340 is configured to be coupled to the object manipulator 402 of the object manipulator configuration 330, and, while the lift mechanism 340 is coupled to the object manipulator 402, the lift mechanism 340 is further configured to vertically displace the object manipulator 402, for example, relative to the frame 322. In some embodiments, for example, while the robot body 320 is coupled to the base 302, the vertical displacement of the object manipulator 402 is relative to the base 302.

Figure 6:
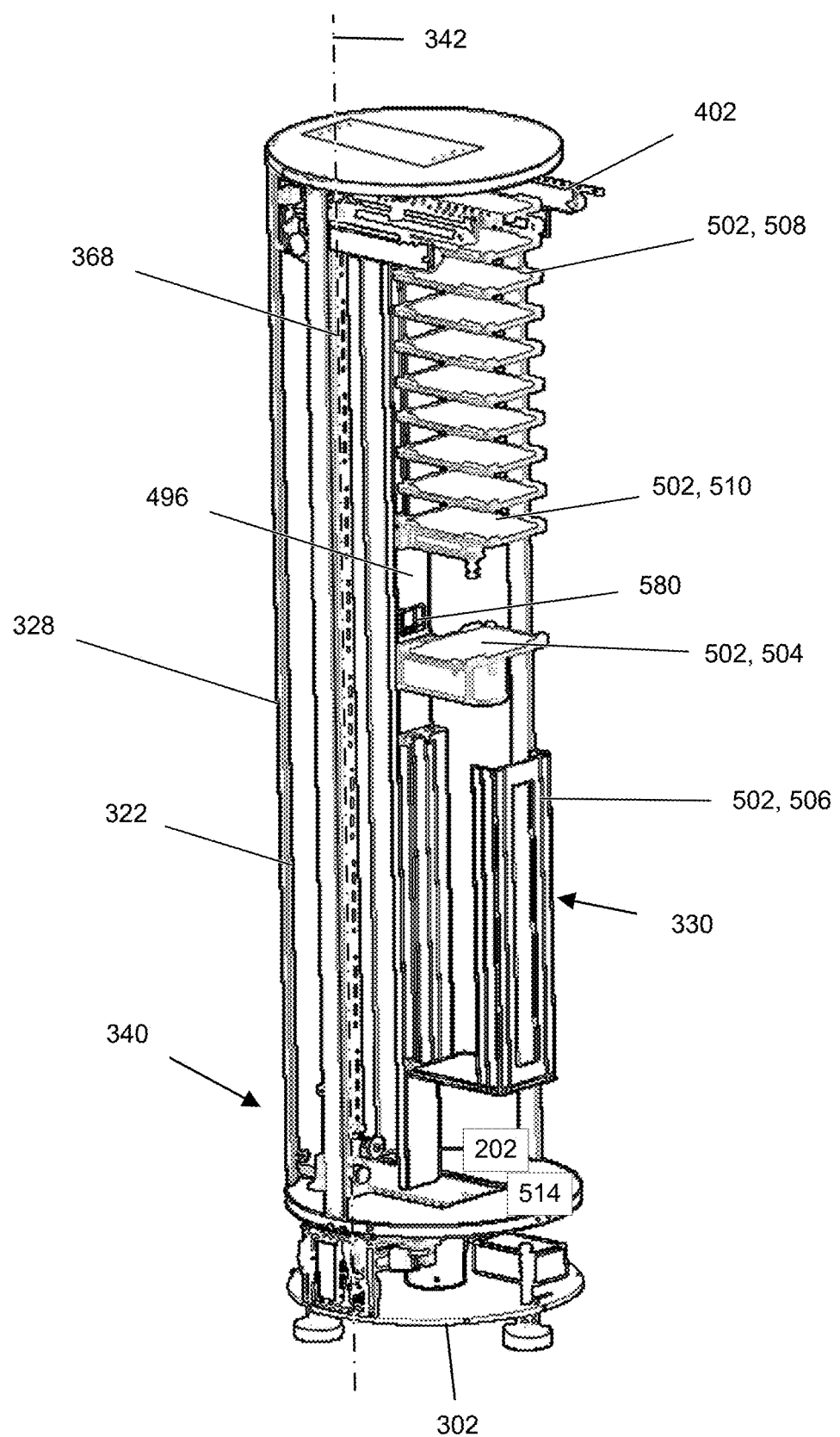
FIG. 6 is a front perspective view of the robot of FIG. 3, with an object manipulator disposed at an uppermost vertical position.
Figure 7:
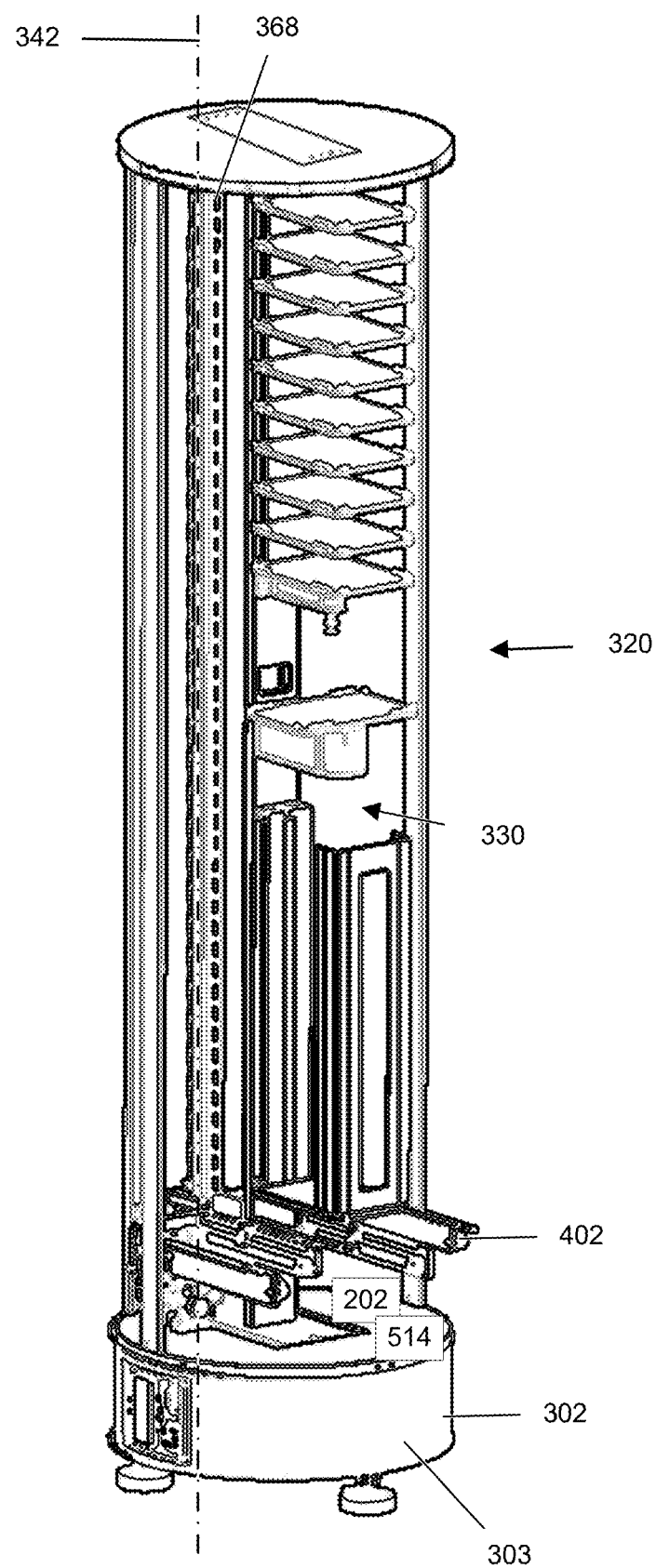
FIG. 7 is a front perspective view of the robot of FIG. 3, with the object manipulator disposed at a lowermost vertical position.

In some embodiments, for example, the object manipulator 402 is displaceable, relative to the base 302, by the lift mechanism 340, along a travel axis 342, as depicted in FIG. 6, from a first vertical position to a second vertical position, for effecting a change in elevation of the object manipulator 402. In some embodiments, for example, the travel axis 342 is parallel to a vertical axis. In some embodiments, for example, the travel axis 342 is parallel to the rotational axis 318.

In some embodiments, for example, the displaceability of the object manipulator 402, relative to the base 302, is a displaceability of the object manipulator 402, relative to the accessory configuration 500, the accessory configuration 500 comprising at least one accessory 502, as described in greater detail herein.

In some embodiments, for example, the displaceability of the object manipulator 402, relative to the base 302, is such that the object manipulator 402 is disposable in: (i) a lowermost vertical position, wherein the object manipulator 402 is disposed at the bottom of the robot body 320, as depicted in FIG. 3 and FIG. 5, (ii) an uppermost vertical position, wherein the object manipulator 402 is disposed at the top of the robot body 320, as depicted in FIG. 6, and (iii) an intermediate vertical position that is between the lowermost vertical position and the uppermost vertical position.

In some embodiments, for example, while there is an absence of grasping of the object 10, the vertical displacement of the object manipulator 402, relative to the base 302, is for disposition of an end effector 410 of the object manipulator 402 in vertical alignment with the object 10, for example, the microplate configuration 10 (e.g. the microplate 12), such that grasping of the object 10 by the end effector 410 is effectuatable.

In some embodiments, for example, wherein the object 10 is the microplate configuration 10, while the microplate configuration 10 is grasped by the object manipulator 402, and the microplate configuration 10 is disposed in an interaction-effective alignment with a plate nest 1002 of a workstation 1000 or a microplate accessory 502 of the microplate accessory configuration 500 of the robot 110, the vertical displacement of the object manipulator 402, relative to the base 302, is for effectuating an interaction between the microplate configuration 10 and the plate nest 1002 of a workstation 1000 or the microplate accessory 502 of the microplate accessory configuration 500.

In some embodiments, for example, wherein the object 10 is the microplate configuration 10, while the microplate configuration 10 is grasped by the object manipulator 402, and the microplate configuration 10 is disposed in an interaction-ineffective alignment with a plate nest 1002 of a workstation 1000 or a microplate accessory 502 of the microplate accessory configuration 500 of the robot 110, the vertical displacement of the object manipulator 402, relative to the base 302, is for disposition of the microplate configuration 10 in a vertical position, wherein the microplate configuration 10 is disposed, relative to the plate nest 1002 or the microplate accessory 502, such that the microplate configuration 10 is longitudinally displaceable (e.g. longitudinally retracted or extended), relative to the plate nest 1002 or the microplate accessory 502, with effect that the microplate configuration 10 and the plate nest 1002 or the microplate accessory 502 become disposed in the interaction-effective alignment.

In some embodiments, for example, while the object manipulator 302 is coupled to the lift mechanism 340, and the robot body 320 is connected to the base 302, the object manipulator 402 is supported on the base 302.

In some embodiments, for example, the lift mechanism 340 includes an actuator configuration 350 to effect the vertical displacement of the object manipulator 402, relative to the base 302, as depicted in FIG. 10 to FIG. 13. In some embodiments, for example, the actuator configuration 350 includes a prime mover 352, for example, a motor, for example, an electric motor, that is disposed in operable communication with the object manipulator 402, for example, a lead screw mount 406. In some embodiments, for example, the prime mover 352 is mounted to the lift mechanism frame member 329. The prime mover 352 is configured to generate a displacement force that is applicable to the object manipulator 402 for vertically displacing the object manipulator 402, relative to the base 302. In response to application of the displacement force from the prime mover 352 to the object manipulator 402, for example, the lead screw mount 406, the object manipulator 402 is vertically displaced, relative to the base 302.

In some embodiments, for example, the prime mover 352 is configurable in an upward displacement drive state and a downward displacement drive state. In some embodiments, for example, while the prime mover 352 is disposed in the upward displacement drive state, the displacement force applied to the object manipulator 402 has an upward direction, such that the object manipulator 402 is vertically displaced in the upward direction, relative to the base 302, in response to application of the displacement force to the object manipulator 402. In some embodiments, for example, while the prime mover 352 is disposed in the downward displacement drive state, the displacement force applied to the object manipulator 402 has a downward direction, such that the object manipulator 402 is vertically displaced in the downward direction, relative to the base 302, in response to application of the displacement force to the object manipulator 402.

In some embodiments, for example, the prime mover 352 is disposed in data communication with the controller 202 and further disposed in electrical communication with the power supply 314, for actuation of the prime mover 352 in the upward displacement drive state and the downward displacement drive state, via control commands from the controller 202.

In some embodiments, for example, the actuator configuration 350 includes a transmission configuration 354 to effect the operable communication between the prime mover 352 and the object manipulator 402, in particular, between the prime mover 352 and the lead screw mount 406. In some embodiments, for example, the transmission configuration 354 includes gears 356A and 356B, a lead screw 358 connected to the gear 356B, and a lead plate mount connector 360, such as a threaded nut, which is mounted to the lead plate mount and threadably coupled to the lead screw 358, such that the lead plate mount connector 360 is displaced along the lead screw 358 in response to rotation of the lead screw 358. As depicted in FIG. 10 to FIG. 13, the prime mover 352 is configured to drive the gear 356A, which is connected to the gear 356B, which is connected to the lead screw 358 such that rotation of the lead screw 358 is effectuated by rotation of the gear 356B, and the lead screw 358 and the lead plate mount connector 360 are threadably coupled, such that the displacement force generated by the prime mover 352 is applied to the lead screw mount 406 of the object manipulator 402 via the gears 356A and 356B, the lead screw 358, and the lead plate mount connector 360. In this respect, the displacement force generated by the prime mover 352 is an object manipulator vertical displacement force. In response to application of the object manipulator vertical displacement force from the prime mover 352 to the object manipulator 402, the object manipulator 402 is vertically displaced, relative to the base 302.

In some embodiments, for example, the actuator configuration 350 includes an encoder 362. The encoder 362 is coupled to the gear 356B, such that the encoder 362 is configured to detect the rotation of the gear 356B. In some embodiments, for example, the encoder 362 is disposed in data communication with the controller 202 and further disposed in electrical communication with the power supply 314. Based on the rotation of the gear 356B and the co-operative configuration of the threading of the lead screw 358 and the threading of the lead plate mount connector 360, the vertical displacement of the object manipulator 402, relative to the base 302, can be determined by the controller 202.

Figure 13:
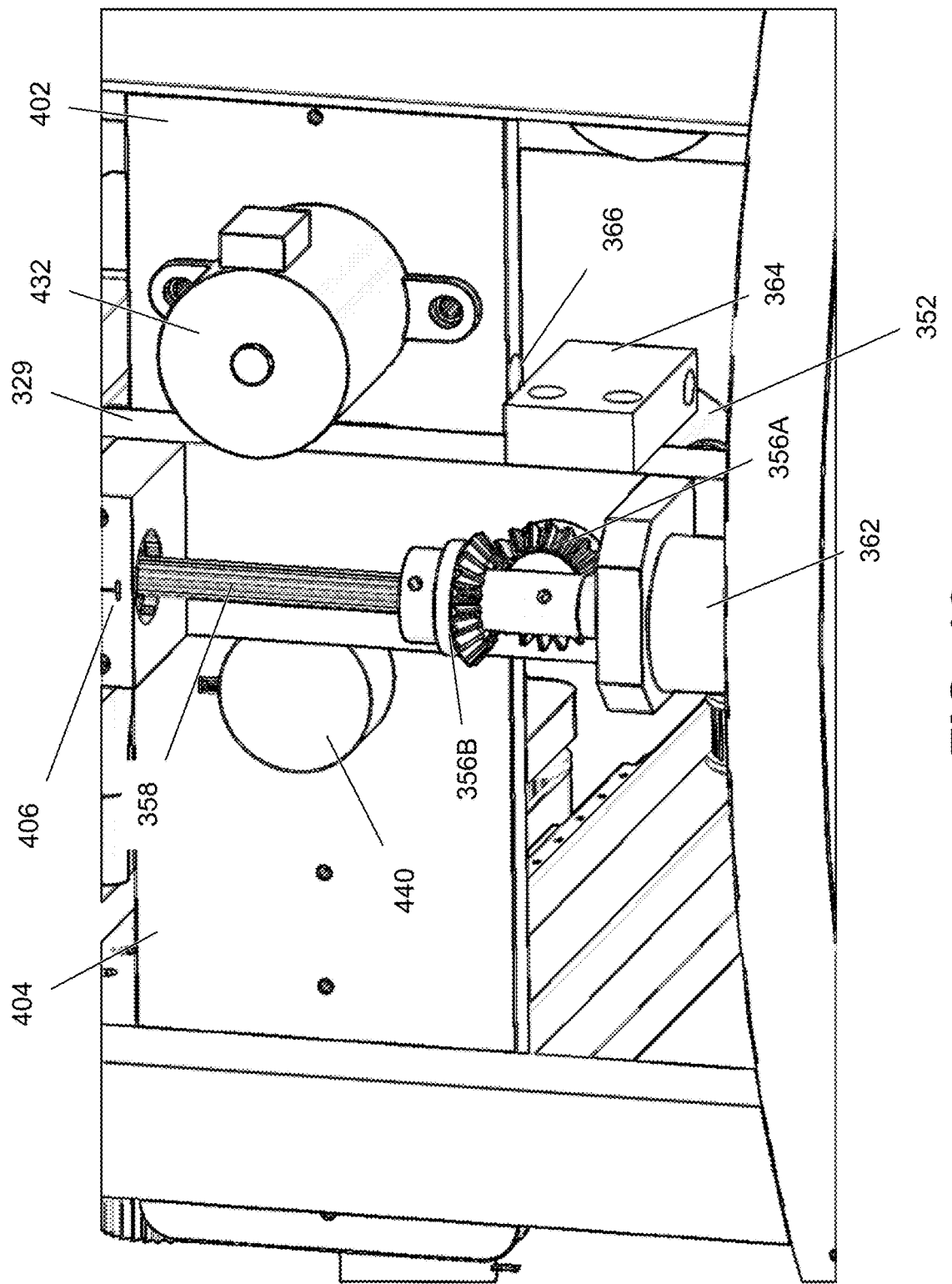
FIG. 13 is a rear perspective view of a lift mechanism of the robot of FIG. 3.

In some embodiments, for example, the lift mechanism 340 includes a sensor 364, and the object manipulator 402 includes a sensor actuator 366, as depicted in FIG. 13. In some embodiments, for example, the sensor 364 is a proximity sensor, for example a Littelfuse reed switch, and the sensor actuator 366 is a magnet. In some embodiments, for example, the sensor 364 is mounted to the lift mechanism frame member 329, and the sensor actuator 366 is mounted to the bottom of a mounting plate 404 of the object manipulator 402, such that the sensor actuator 366 is vertically displaced, relative to the base 302, while the object manipulator 402 is vertically displaced, relative to the base 302. In some embodiments, for example, the sensor 364 is disposed in data communication with the controller 202 and further disposed in electrical communication with the power supply 314.

In some embodiments, for example, the sensor 364 and the sensor actuator 366 are disposed in alignment, for example, in vertical alignment. While the sensor 364 and the sensor actuator 366 are disposed in a proximate relationship, the sensor actuator 364 is detected by the sensor 366. While the sensor actuator 366 is detected by the sensor 364, the sensor 364 is configured to send data to the controller 202, representative of the sensor 364 and the sensor actuator 366 being disposed in the proximate relationship. In this respect, the sensor 364 and the sensor actuator 366 are co-operatively configured to define an initial vertical position of the object manipulator 402, relative to the base 302. In some embodiments, for example, the initial vertical position of the object manipulator 402, relative to the base 302, is the lowermost vertical position of the object manipulator 402 In response to processing of the data from the sensor 364 representative of the sensor 364 and the sensor actuator 366 being disposed in the proximate relationship, the controller 202 determines that the object manipulator 402 is disposed, relative to the base 302, in the initial vertical position.

Figure 12:
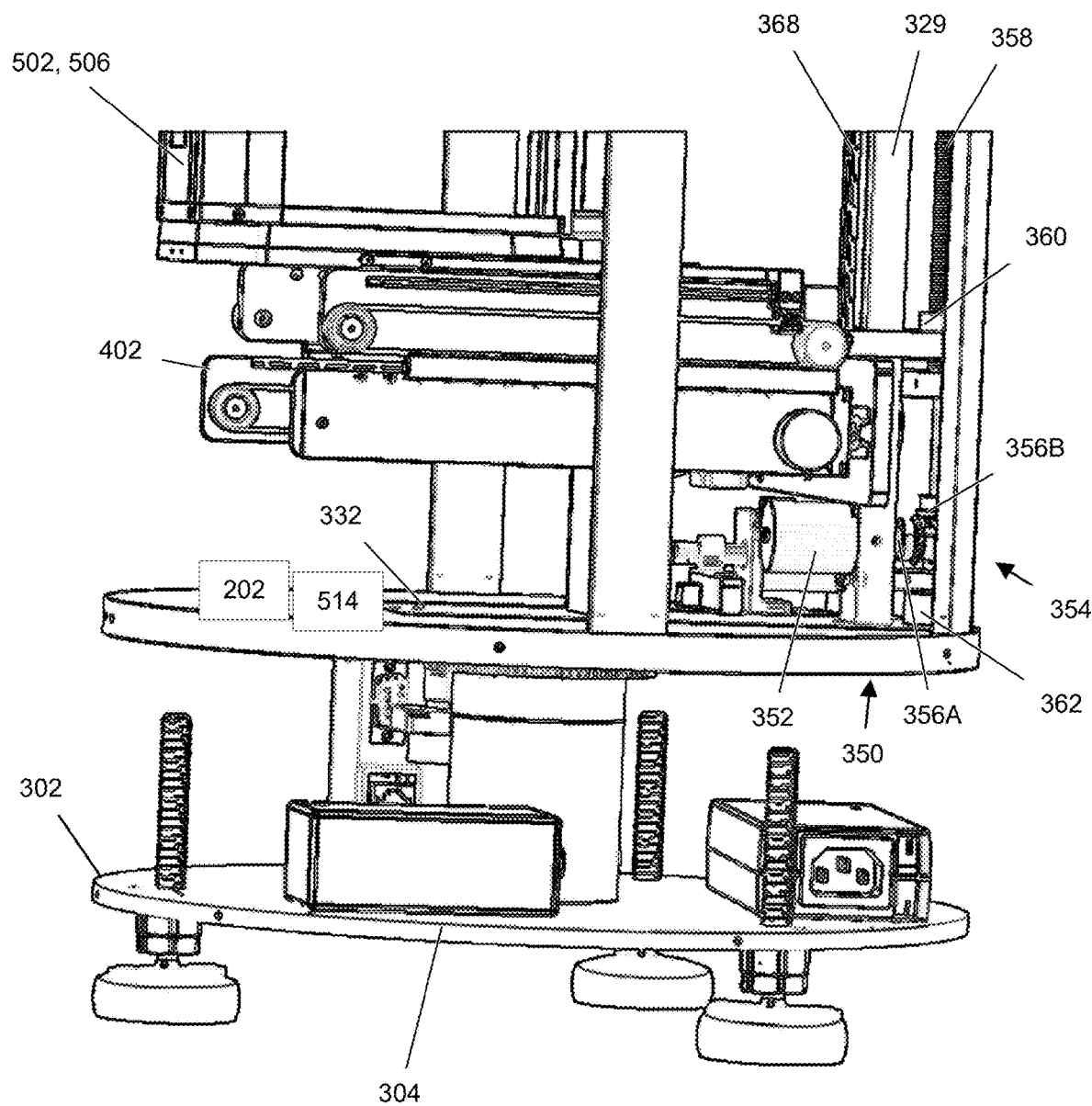
FIG. 12 is a front perspective view of the lower portion of the robot of FIG. 3.

In some embodiments, for example, the lift mechanism 340 includes a guide rail 368, to guide the vertical displacement of the object manipulator 402, relative to the base 302. As depicted in FIG. 12, the guide rail 368 is mounted to the lift mechanism frame member 329.

In some embodiments, for example, the object manipulator configuration 330 includes the object manipulator 402, as depicted in FIG. 14 to FIG. 22. The object manipulator 402 includes a mounting plate 404 or support member 404 and a lead screw mount 406. The lead screw mount 406 is connected to the mounting plate 404, and the lead plate mount connector is connected to the lead screw mount 406.

In some embodiments, for example, the object manipulator 402 includes an extendible arm configuration 408. The extendible arm configuration 408 includes a plurality of extendible arms 420. As depicted, the extendible arm configuration 408 includes a first extendible arm configuration 420A and a second extendible arm configuration 42B. In some embodiments, for example, the first extendible arm 420A and the second extendible arm 420B are disposed in opposing relationship.

In some embodiments, for example, the object manipulator 402 includes an end effector 410. The end effector 410 is configured for grasping the object 10, for example, the microplate configuration 10, for example, the microplate 12 or the microplate lid 14. In some embodiments, for example, the end effector 410 includes a first end effector counterpart 412 and a second end effector counterpart 414, wherein the first end effector counterpart 412 is disposed on the first extendible arm 420A and the second end effector counterpart 414 is disposed on the second extendible arm 420B. In some embodiments, for example, the first end effector counterpart 412 and the second end effector counterpart 414 are disposed in opposing relationship. In some embodiments, for example, the first end effector counterpart 412 is defined by one or more pads. In some embodiments, for example, the first end effector counterpart 412 is defined by an internal surface of the first extendible arm 420A, for example, an internal surface of a terminal arm segment 454A. In some embodiments, for example, the second end effector counterpart 414 is defined by one or more pads. In some embodiments, for example, the second end effector counterpart 414 is defined by an internal surface of the second extendible arm 420B, for example, an internal surface of a terminal arm segment 454B.

In some embodiments, for example, the first end effector counterpart 412 and the second end effector counterpart 414 are disposed between the first extendible arm 420A and the second extendible arm 420B.

In some embodiments, for example, the first extendible arm 420A is extendible and retractable for displacing the first end effector counterpart 412, relative to the base 302, and also relative to the mounting plate or support member 404. In some embodiments, for example, the second extendible arm 420B is extendible and retractable for displacing the second end effector counterpart 414, relative to the base 302, and also relative to the mounting plate or support member 404.

In some embodiments, for example, the end effector 410 is configurable in a grasping-effective configuration, as depicted in FIG. 19 to FIG. 22 and a grasping-ineffective configuration, as depicted in FIG. 14 to FIG. 18. In the grasping-effective configuration, the first end effector counterpart 412 and the second end effector counterpart 414 are co-operatively configured for grasping the object 10. In the grasping-ineffective configuration, the first end effector counterpart 412 and the second end effector counterpart 414 are co-operatively configured such that the end effector 410 is ineffective for grasping the object 10, such that there is an absence of grasping of the object 10.

In some embodiments, for example, the end effector 410 and the object 10 are configurable for disposition in a grasping-effectible relationship and a grasping-ineffective relationship.

While the end effector 410 is in the grasping-ineffective configuration, and the end effector 410 and the object 10 are disposed in the grasping-effectible relationship, the first and second end effector counterparts 412 and 414 are disposed, relative to the object 10, such that grasping of the object 10, by the end effector 410, is effectuatable via transition of the end effector 410 from the grasping-ineffective configuration to the grasping-effective configuration.

While the end effector 410 is in the grasping-ineffective configuration, and the end effector 410 and the object 10 are disposed in the grasping-ineffective relationship, the first end effector counterpart 412 and the second end effector counterpart 414 are displaceable, relative to the object 10, such that the end effector 410 and the object 10 become disposed in the grasping-effective relationship, wherein the displacement of the first end effector counterpart 412 and the second end effector counterpart 414, relative to the object 10, for effectuating the disposition of the end effector 410 and the object 10 in the grasping-effective relationship, includes displacement of the first end effector counterpart 412 and the second end effector counterpart 414, relative to the object 10, via the first and second extendible arms 420A and 420B.

In some embodiments, for example, while the object 10 is grasped by the end effector 410, the object 10 is displaceable, relative to the base 302 and also relative to the mounting plate or support member 404, via the first and second extendible arms 420A and 420B.

In some embodiments, for example, while the object 10 is grasped by the end effector 410, the displaceability of the object 10, relative to the base 302 and also relative to the mounting plate or support member 404, is such that the minimum spacing distance between the object 10 and the base 302, and the minimum spacing distance between the object 10 and the mounting plate 404, is reduced. In some embodiments, for example, while the object 10 is grasped by the end effector 410, the displaceability of the object 10, relative to the base 302 and also relative to the mounting plate or support member 404, is such that the minimum spacing distance between the object 10 and the base 302, and the minimum spacing distance between the object 10 and the mounting plate 404, is increased.

In some embodiments, for example, the transition of the end effector 410 from the grasping-ineffective configuration to the grasping-effective configuration, to effectuate the grasping of the object 10, while the end effector 410 and the object 10 are disposed in the grasping-effectible relationship, is effectuatable while the first extendible arm 420A is disposed in a retracted configuration and the second extendible arm 420B is disposed in a retracted configuration, and also while the first extendible arm 420A is disposed in an extended configuration and the second extendible arm 420B is disposed in an extended configuration.

In some embodiments, for example, while: (i) the end effector 410 is in the grasping-ineffective configuration, and (ii) the end effector 410 and the object 10 are disposed in the grasping-ineffective relationship, the displacement of the first end effector counterpart 412 and the second end effector counterpart 414, relative to the object 10, for effectuating the disposition of the end effector 410 and the object 10 in the grasping-effective relationship, includes displacement of the first end effector counterpart 412 and the second end effector counterpart 414, relative to the object 10, via extension of the first extendible arm 420A and extension of the second extendible arm 420B.

In some embodiments, for example, while: (i) the end effector 410 is in the grasping-ineffective configuration, and (ii) the end effector 410 and the object 10 are disposed in the grasping-ineffective relationship, the displacement of the first end effector counterpart 412 and the second end effector counterpart 414, relative to the object 10, for effectuating the disposition of the end effector 410 and the object 10 in the grasping-effective relationship, includes displacement of the first end effector counterpart 412 and the second end effector counterpart 414, relative to the object 10, via retraction of the first extendible arm 420A and retraction of the second extendible arm 420B.

Figure 21:
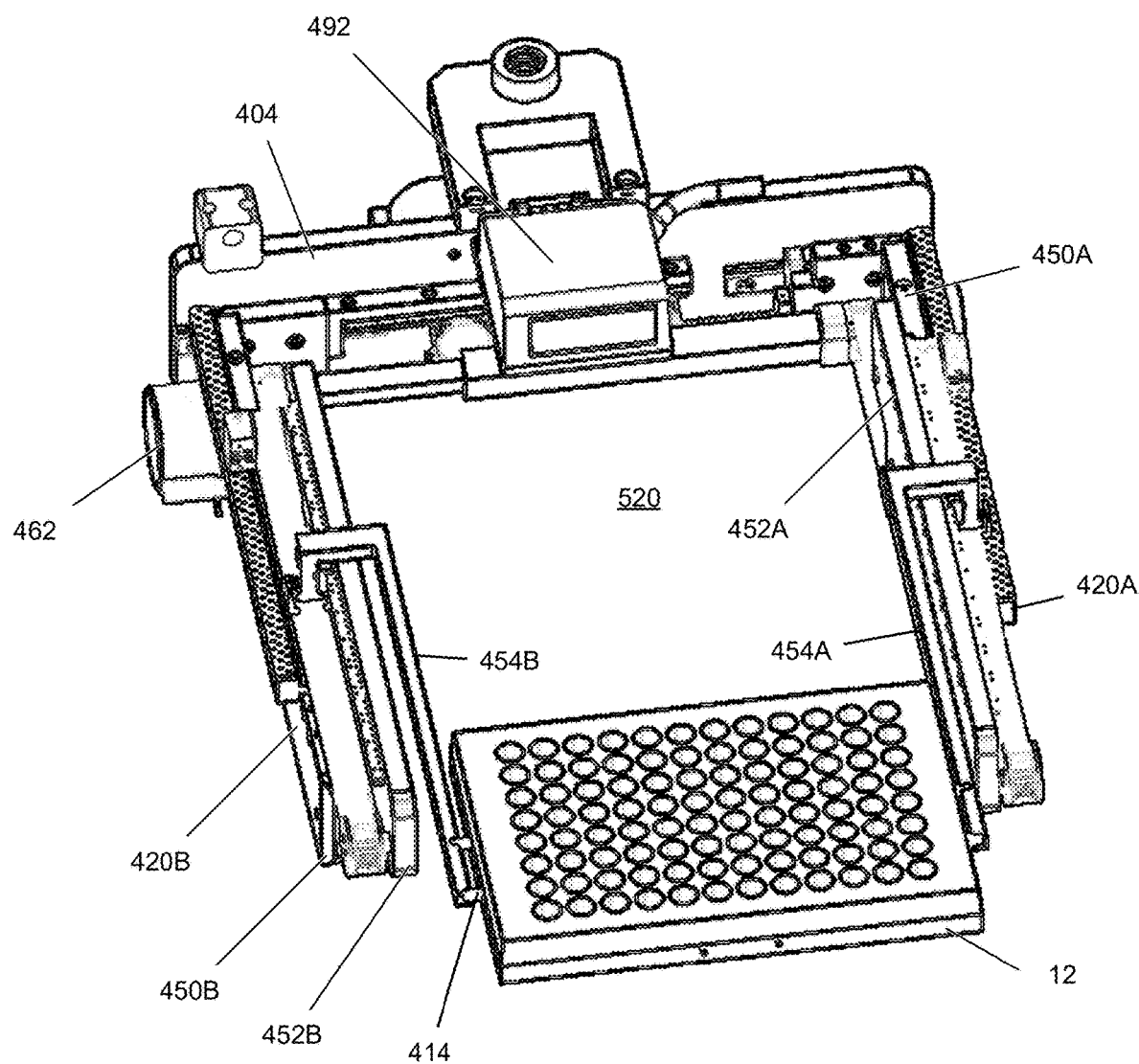
FIG. 21 is a front perspective view of an object manipulator and a microplate configuration, disposed in a displacement-ready relationship.
Figure 22:
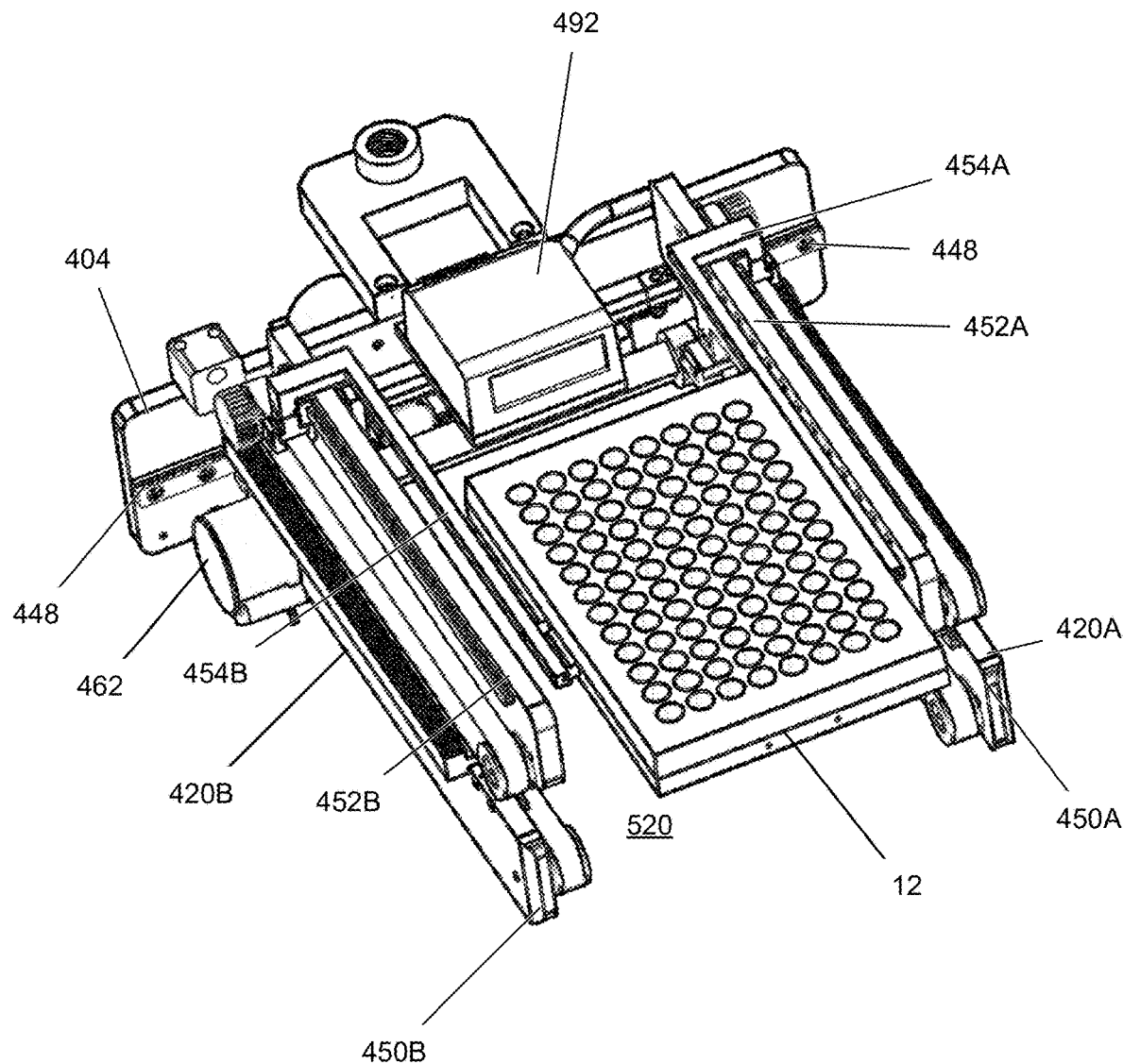
FIG. 22 is a front perspective view of an object manipulator and a microplate configuration, disposed in a displacement-ineffective relationship.

In some embodiments, for example, as depicted in FIG. 21 and FIG. 22, while the end effector 410 and the object 10 are disposed in the grasping-effectible relationship: the first end effector counterpart 412 is disposed in opposing relationship with a first side surface of the object 10; and the second end effector counterpart 414 is disposed in opposing relationship with a second side surface of the object 10, wherein the second side surface is disposed on an opposite side of the object 10 relative to the first side surface.

In some embodiments, for example, while the end effector 410 and the object 10 are disposed in the grasping-ineffective relationship: the first end effector counterpart 412 is disposed in an offset relationship with the first side surface of the object 10; and the second end effector counterpart 414 is disposed in an offset relationship with the second side surface of the object 10.

In some embodiments, for example, while: (i) the end effector 410 is in the grasping-ineffective configuration, and (ii) the end effector 410 and the object 10 are disposed in the grasping-ineffective relationship: the first and second end effector counterparts 412 and 414 are disposed, relative to the object 10, such that there is an absence of grasping of the object 10, by the end effector 410, in response to the transition of the end effector 410 from the grasping-ineffective configuration to the grasping-effective configuration.

In some embodiments, for example, while the end effector 410 is disposed in the grasping-effective configuration, relative to its disposition in the grasping-ineffective configuration, the first and second end effector counterparts 412 and 414 are disposed closer together.

In some embodiments, for example, the first extendible arm 420A is displaceable laterally, relative to the base 302 and also relative to the mounting plate or support member 404, and the second extendible arm 420B is displaceable laterally, relative to the base 302 and also relative to the mounting plate or support member 404.

In transitioning from the grasping-effective configuration to the grasping-ineffective configuration: the first extendible arm 420A is displaced laterally, relative to the base 302 and also relative to the mounting plate or support member 404, in a first direction (e.g. in a direction away from the second extendible arm 420B); and the second extendible arm 420B is displaced laterally, relative to the base 302 and also relative to the mounting plate or support member 404, in a second direction that is opposite the first direction (e.g. in a direction away from the first extendible arm 420A); with effect that the minimum spacing distance between the first end effector counterpart 412 and the second end effector counterpart 414 is increased.

In transitioning from the grasping-ineffective configuration to the grasping-effective configuration: the first extendible arm 420A is displaced laterally, relative to the base 302 and also relative to the mounting plate or support member 404, in the second direction (e.g. in a direction towards the second extendible arm 420B); and the second extendible arm 420B is displaced laterally, relative to the base 302 and also relative to the mounting plate or support member 404, in the first direction (e.g. in a direction towards the first extendible arm 420A); with effect that the minimum spacing distance between the first end effector counterpart 412 and the second end effector counterpart 414 is reduced.

In some embodiments, for example: (i) the lateral displacement of the first extendible arm 420A, relative to the base 302 and also relative to the mounting plate or support member 404, and (ii) the lateral displacement of the second extendible arm 420B, relative to the base 302, occurs simultaneously or synchronously.

Figure 14:
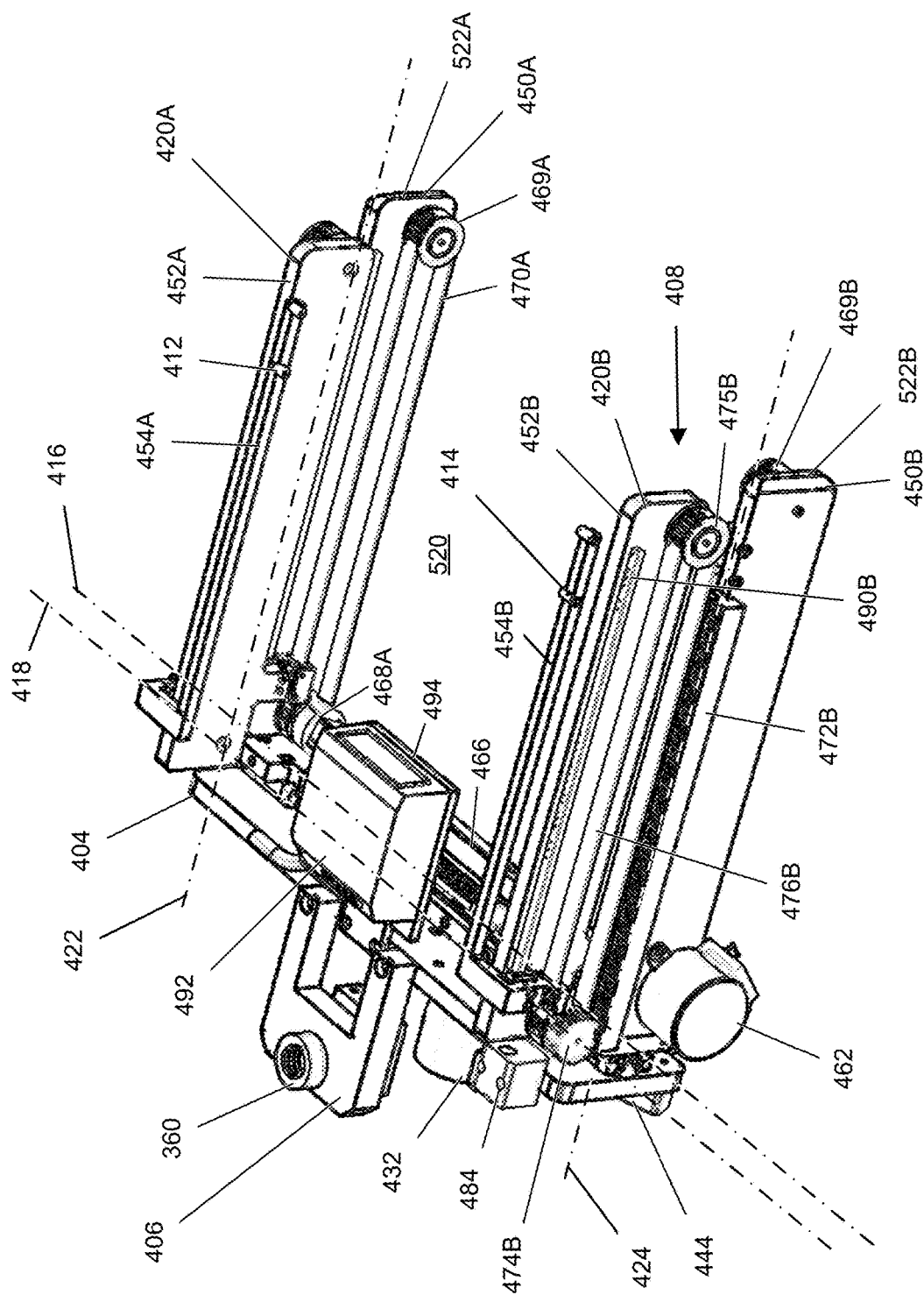
FIG. 14 is a front perspective view of an object manipulator of the robot of FIG. 3, the object manipulator disposed in a retracted configuration.

In some embodiments, for example, the lateral displacement of the first extendible arm 420A is along a first extendible arm lateral displacement axis 416, as depicted in FIG. 14. In some embodiments, for example, the first extendible arm lateral displacement axis 416 is parallel to a lateral axis.

In some embodiments, for example, the lateral displacement of the second extendible arm 420B is along a second extendible arm lateral displacement axis 418, as depicted in FIG. 14. In some embodiments, for example, the second extendible arm lateral displacement axis 418 is parallel to a lateral axis.

In some embodiments, for example, the first extendible arm lateral displacement axis 416 and the second extendible arm lateral displacement axis 418 are disposed in a parallel relationship.

In some embodiments, for example, the first extendible arm 420A is extendible and retractable along a first extendible arm longitudinal displacement axis 422, as depicted in FIG. 14. In some embodiments, for example, the first extendible arm longitudinal displacement axis 422 is parallel to a longitudinal axis.

In some embodiments, for example, the second extendible arm 420B is extendible and retractable along a second extendible arm longitudinal displacement axis 424, as depicted in FIG. 14. In some embodiments, for example, the second extendible arm longitudinal displacement axis 424 is parallel to a longitudinal axis.

In some embodiments, for example, the first extendible arm longitudinal displacement axis 422 and the second extendible arm longitudinal displacement axis 424 are disposed in a parallel relationship.

In some embodiments, for example, the first extendible arm lateral displacement axis 416 and the first extendible arm longitudinal displacement axis 420 are disposed in a perpendicular relationship. In some embodiments, for example, the second extendible arm lateral displacement axis 418 and the second extendible arm longitudinal displacement axis 424 are disposed in a perpendicular relationship.

In some embodiments, for example, the extension and retraction of the first extendible arm 420A is independent of the lateral displacement of the first extendible arm 420A, relative to the base 302. In some embodiments, for example, the extension and retraction of the second extendible arm 420B is independent of the lateral displacement of the second extendible arm 420B, relative to the base 302.

In some embodiments, for example, while the object 10 is grasped by the end effector 410, the grasping of the object 10 by the end effector 410 is defeatable via transition of the end effector 410 from the grasping-effective configuration to the grasping-ineffective configuration.

In some embodiments, for example, the lateral displaceability of the first extendible arm 420A, relative to the base 302 and also relative to the mounting plate or support member 404, is effectuatable via the coupling of the first extendible arm 420A to the mounting plate 404. In such embodiments, for example, the coupling of the first extendible arm 420A to the mounting plate 404 is such that the first extendible arm 420A is laterally displaceable, relative to the mounting plate 404.

In some embodiments, for example, the lateral displaceability of the second extendible arm 420B, relative to the base 302 and also relative to the mounting plate or support member 404, is effectuatable via the coupling of the second extendible arm 420B to the mounting plate 404. In such embodiments, for example, the coupling of the second extendible arm 420B to the mounting plate 404 is such that the second extendible arm 420B is laterally displaceable, relative to the mounting plate 404.

In some embodiments, for example, the object manipulator 402 includes an actuator configuration 430 to effect the lateral displacement of the first extendible arm 420A, relative to the mounting plate 404, and also to effect the lateral displacement of the second extendible arm 420B, relative to the mounting plate 404, as depicted in FIG. 14 to FIG. 22. In some embodiments, for example, the actuator configuration 430 includes a prime mover 432, for example, a motor, for example, an electric motor, that is disposed in operable communication with the first extendible arm 420A and the second extendible arm 420B. In some embodiments, for example, the prime mover 432 is mounted to the mounting plate 404. The prime mover 432 is configured to generate a displacement force that is applicable to the first extendible arm 420A for laterally displacing the first extendible arm 420A, relative to the mounting plate 404, and also relative to the base 302. In response to application of the displacement force from the prime mover 432 to the first extendible arm 420A, the first extendible arm 420A is laterally displaced, relative to the mounting plate 404. The prime mover 432 is further configured to generate a displacement force that is applicable to the second extendible arm 420B for laterally displacing the second extendible arm 420B, relative to the mounting plate 404, and also relative to the base 302. In response to application of the displacement force from the prime mover 432 to the second extendible arm 420B, the second extendible arm 420B is laterally displaced, relative to the mounting plate 404.

In some embodiments, for example, the prime mover 432 is configurable in a laterally outward displacement drive state and a laterally inward displacement drive state. In some embodiments, for example, while the prime mover 432 is disposed in the laterally outward displacement drive state, the displacement forces applied to the first extendible arm 420A and the second extendible arm 420B have a laterally outward direction, such that the first extendible arm 420A and the second extendible arm 420B are laterally displaced in the outward direction (e.g. laterally displaced away from each other), relative to the mounting plate 404 (and also relative to the base 302), in response to application of the displacement forces to the first extendible arm 420A and the second extendible arm 420B. In some embodiments, for example, while the prime mover 432 is disposed in the laterally inward displacement drive state, the displacement forces applied to the first extendible arm 420A and the second extendible arm 420B have a laterally inward direction, such that the first extendible arm 420A and the second extendible arm 420B are laterally displaced in the inward direction (e.g. laterally displaced towards each other), relative to the mounting plate 404 (and also relative to the base 302), in response to application of the displacement forces to the first extendible arm 420A and the second extendible arm 420B.

In some embodiments, for example, the prime mover 432 is disposed in data communication with the controller 202 and further disposed in electrical communication with the power supply 314, for actuation of the prime mover 432 in the laterally outward displacement drive state and the laterally inward displacement drive state, via control commands from the controller 202.

Figure 17:
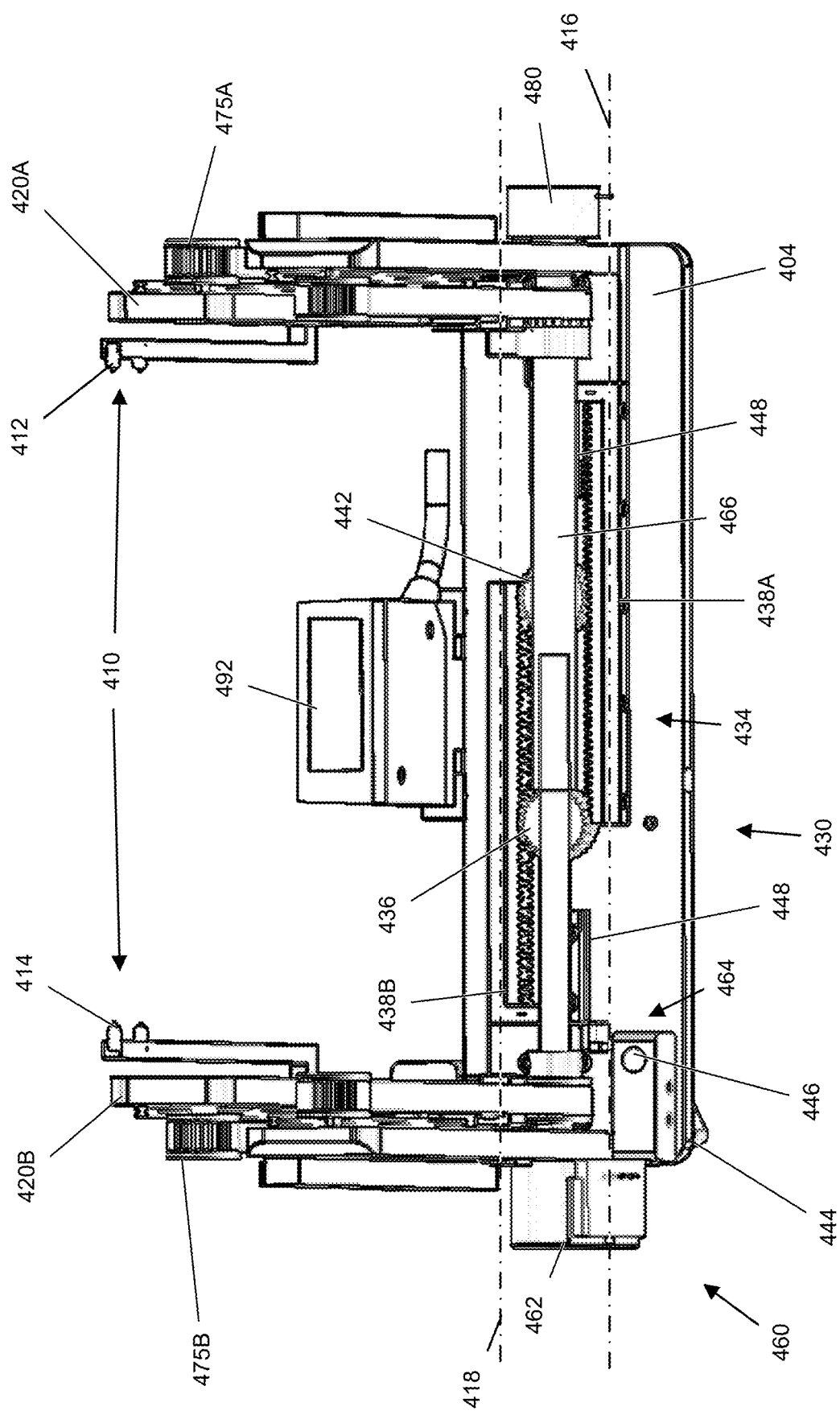
FIG. 17 is another front perspective view of the object manipulator of FIG. 14.

In some embodiments, for example, the actuator configuration 430 includes a transmission configuration 434 to effect the operable communication between the prime mover 432 and the first extendible arm 420A and the second extendible arm 420B. In some embodiments, for example, the transmission configuration 434 includes a gear 436 and linear gears 438A and 438B. As depicted in FIG. 17, in some embodiments, for example, the gear 436 and linear gear 438A are disposed in a rack and pinion configuration, and the gear 436 and linear gear 438B are disposed in a rack and pinion configuration. The linear gear 438A and the linear gear 438B are disposed on opposite sides of the gear 436. As the gear 436 is driven to rotate by the prime mover 432 in a first rotational direction, the gear 436 urges displacement of the linear gear 438A in a first lateral direction, and further urges displacement of the linear gear 438B in a second lateral direction that is opposite the first lateral direction. As the gear 436 is driven to rotate by the prime mover 432 in a second rotational direction that is opposite the first rotational direction, the gear 436 urges displacement of the linear gear 438A in the second lateral direction, and further urges displacement of the linear gear 438B in the first lateral direction that is opposite the second lateral direction. The linear gear 438A is connected to the first extendible arm 420A such that the first extendible arm 420A is laterally displaced, relative to the base 302, while the linear gear 438A is laterally displaced, relative to the base 302, and the linear gear 438B is connected to the second extendible arm 420B such that the second extendible arm 420B is laterally displaced, relative to the base 302, while the linear gear 438B is laterally displaced, relative to the base 302. As depicted in FIG. 17, the prime mover 432 is configured to drive the gear 436, which is connected to the linear gears 438A and 438B, such that the displacement forces generated by the prime mover 432 are applied to the first extendible arm 420A and the second extendible arm 420B via the gear 436 and the linear gears 438A and 438B. In this respect, the displacement forces generated by the prime mover 432 are extendible arm lateral displacement forces. In response to application of the extendible arm lateral displacement force from the prime mover 432 to the first extendible arm 420A and the second extendible arm 420B, the first extendible arm 420A and the second extendible arm 420B are laterally displaced, relative to the mounting plate 404 (and also relative to the base 302).

In some embodiments, for example, the actuator configuration 430 includes an encoder 440 and a gear 442. As depicted in FIG. 17, in some embodiments, for example, the gear 442 and linear gear 438A are disposed in a rack and pinion configuration, and the gear 442 and linear gear 438B are disposed in a rack and pinion configuration. The linear gear 438A and the linear gear 438B are disposed on opposite sides of the gear 442. As the linear gears 438A and 438B are laterally displaced by the gear 436, the gear 442 is rotated. The encoder 440 is coupled to the gear 442, such that the encoder 440 is configured to detect the rotation of the gear 442. In some embodiments, for example, the encoder 440 is disposed in data communication with the controller 202 and further disposed in electrical communication with the power supply 314. Based on the rotation of the gear 442, the lateral displacement of the first extendible arm 420A and the lateral displacement of the second extendible arm 420B, relative to the mounting plate 404, can be determined by the controller 202. In some embodiments, for example, the determination of the lateral displacement of the first and second extendible arms 420A and 420B allows for different grasping distances to be programmed.

In some embodiments, for example, the encoder 440 is configured to detect an absence of rotation of the gear 442, or that rotation of the gear 442 is opposed, while the first and second extendible arms 420A and 420B are laterally displaced towards each other. In some embodiments, for example, based on such detection by the encoder 440, it is determined by the controller 202 determines that the object 10 is applying a reaction force to the first and second extendible arms 420A and 420B, and that the object 10 is being grasped by the first and second extendible arms 420A and 420B.

Figure 18:
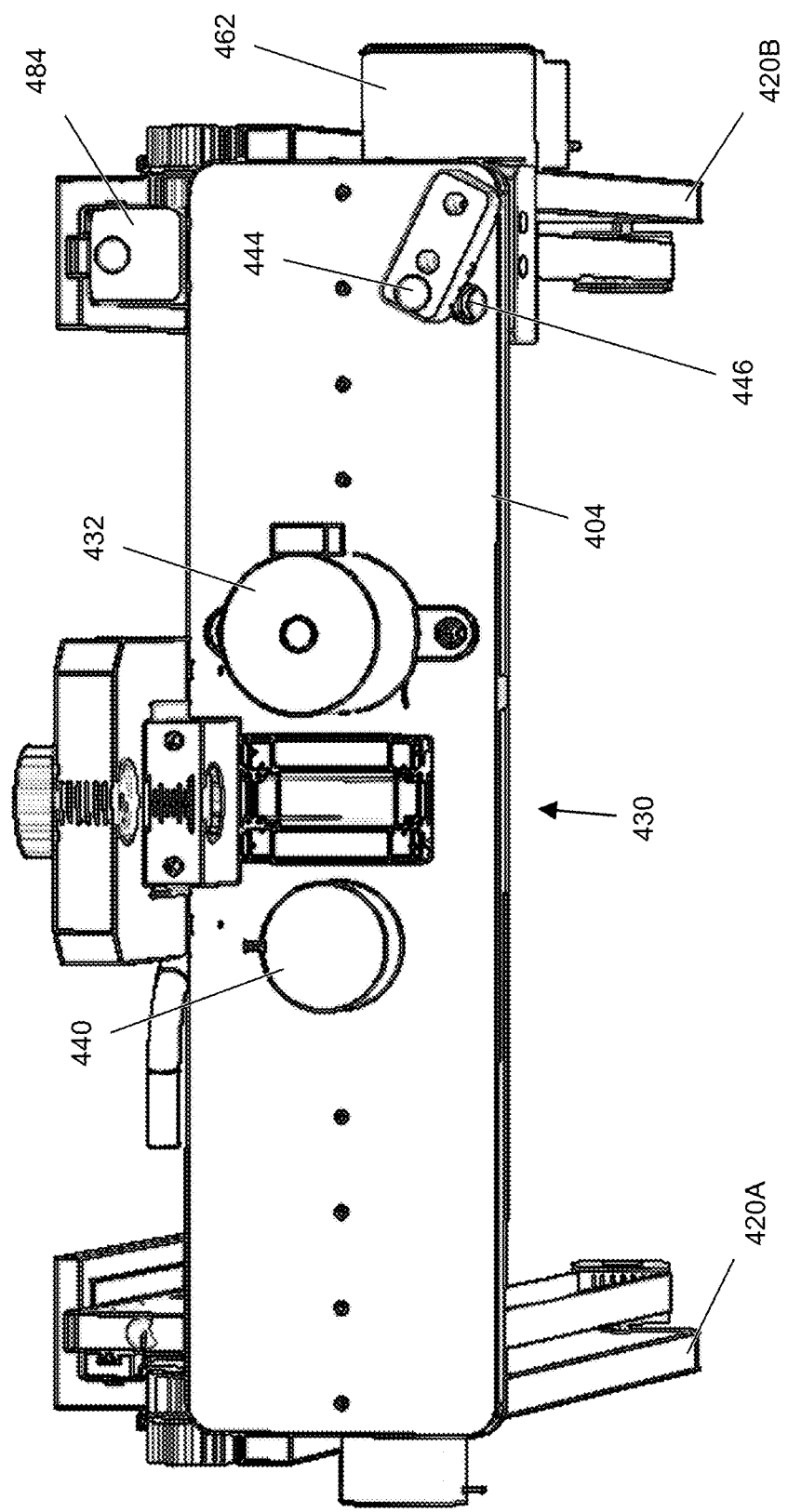
FIG. 18 is another rear perspective view of the object manipulator of FIG. 14.

In some embodiments, for example, the object manipulator 402 includes a sensor 444 and a sensor actuator 446, as depicted in FIG. 17 and FIG. 18. In some embodiments, for example, the sensor 444 is a proximity sensor, for example a Littelfuse reed switch, and the sensor actuator 446 is a magnet. In some embodiments, for example, the sensor 444 is mounted to a terminal right end of the mounting plate 404, and the sensor actuator 446 is mounted to the second extendible arm 420B, for example, a base arm segment 450B of the second extendible arm 420B, such that the sensor actuator 446 is laterally displaced, relative to the mounting plate 404, while the second extendible arm 420B is laterally displaced, relative to the mounting plate 404. In some embodiments, for example, the sensor 444 is disposed in data communication with the controller 202 and further disposed in electrical communication with the power supply 314. In some embodiments, for example, the sensor actuator 446 is mounted to the first extendible arm 420A, for example, a base arm segment 450A of the first extendible arm 420A. In such embodiments, for example, the sensor 444 is mounted to the terminal left end of the mounting plate 404.

While the sensor 444 and the sensor actuator 446 are disposed in alignment, for example, longitudinal alignment, the sensor 444 and the sensor actuator 446 are disposed a proximate relationship, such that the sensor actuator 444 is detected by the sensor 446. While the sensor actuator 446 is detected by the sensor 444, the sensor 444 is configured to send data to the controller 202, representative of the sensor 444 and the sensor actuator 446 being disposed in the proximate relationship. In this respect, the sensor 444 and the sensor actuator 446 are co-operatively configured to define an initial lateral position of the extendible arm configuration 408, relative to the mounting plate 404, and also relative to the base 302. In some embodiments, for example, the initial lateral position of the extendible arm configuration 408, relative to the mounting plate 404, and also relative to the base 302, is established while the minimum spacing distance between the first extendible arm 420A and the second extendible arm 420B is at its maximum value (e.g. while the first extendible arm 420A and the second extendible arm 420B are the furthest apart), as depicted in FIG. 14 to FIG. 18. In some embodiments, for example, the initial lateral position of the extendible arm configuration 408, relative to the mounting plate 404, and also relative to the base 302, is established while the end effector 410 is disposed in a fully grasping-ineffective configuration, wherein the minimum spacing distance between the first end effector counterpart 412 and the second end effector counterpart 414 is at its maximum value (e.g. while the first end effector counterpart 412 and the second end effector counterpart 414 are the furthest apart). In response to processing of the data from the sensor 444 representative of the sensor 444 and the sensor actuator 446 being disposed in the proximate relationship, the controller 202 determines that the extendible arm configuration 408 is disposed, relative to the mounting plate 404 and relative to the base 302, in the initial lateral position.

Figure 16:
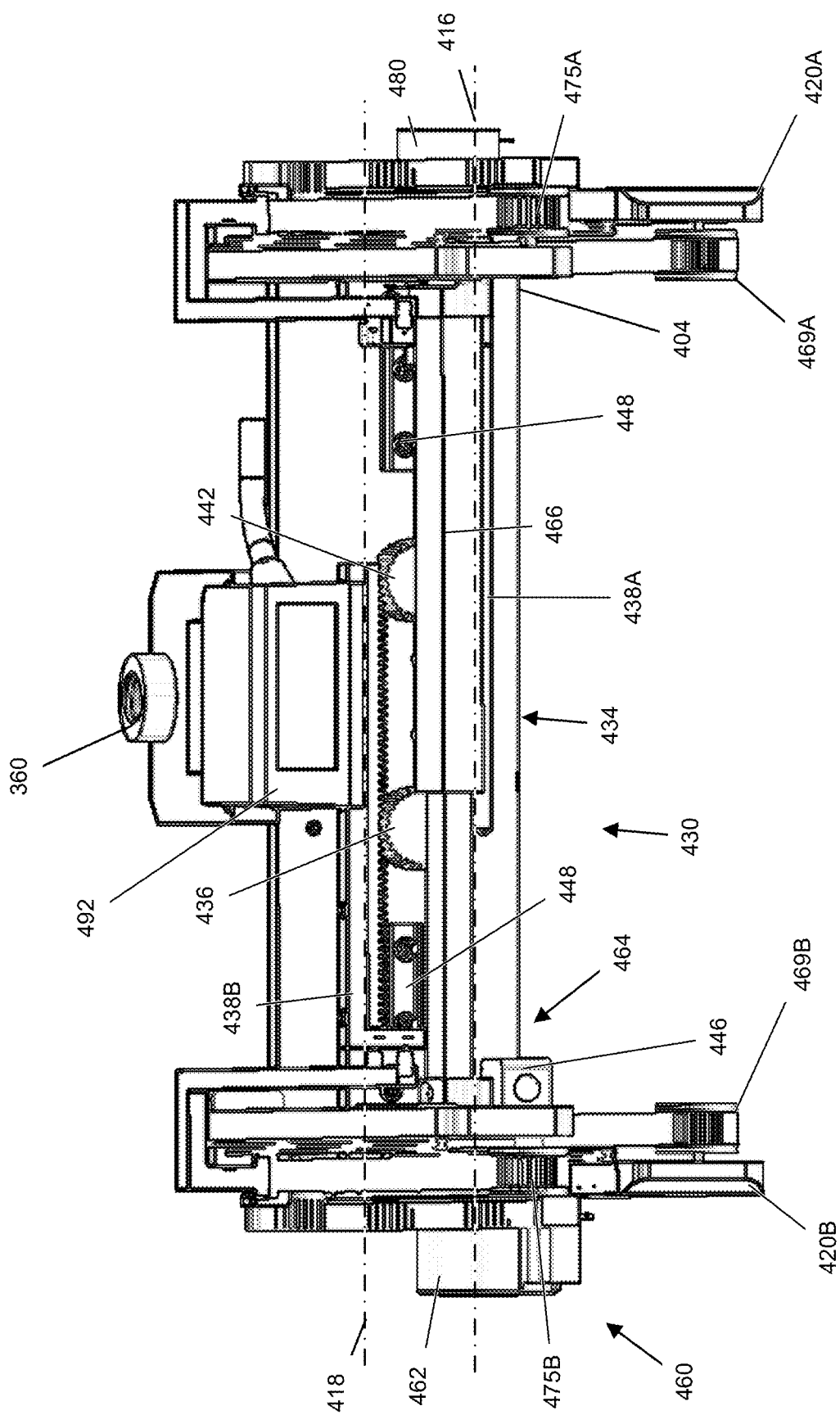
FIG. 16 is a front perspective view of the object manipulator of FIG. 14.

In some embodiments, for example, the object manipulator 402 includes guide rails 448, to guide the lateral displacement of the first extendible arm 420A and the second extendible arm 420B, relative to the mounting plate 404 and relative to the base 302. As depicted in FIG. 16 and FIG. 17, the guide rails 448 are mounted to the mounting plate 404.

In some embodiments, for example, the lateral displacement of the first extendible arm 420A and the second extendible arm 420B, relative to the mounting plate 404 and relative to the base 302, is such that different objects 10, for example, having different lengths and different widths, or the object 10 in different configurations (e.g. portrait or landscape configuration) can be grasped.

In some embodiments, for example, the extension and retraction of the first and second extendible arms 420A and 420B occurs simultaneously or synchronously.

In some embodiments, for example, the first extendible arm 420A is a first telescoping arm, and the second extendible arm 420B is a second telescoping arm. In this respect, in some embodiments, for example, the first extendible arm 420A includes a plurality of arm segments, including a base arm segment 450A, at least one intermediate segment 452A, for example, one intermediate arm segment 452A, and a terminal arm segment 454A, and the second extendible arm 420B includes a plurality of arm segments, including a base arm segment 450B, at least one intermediate segment 452B, for example, one intermediate arm segment 452B, and a terminal arm segment 454B.

Figure 19:
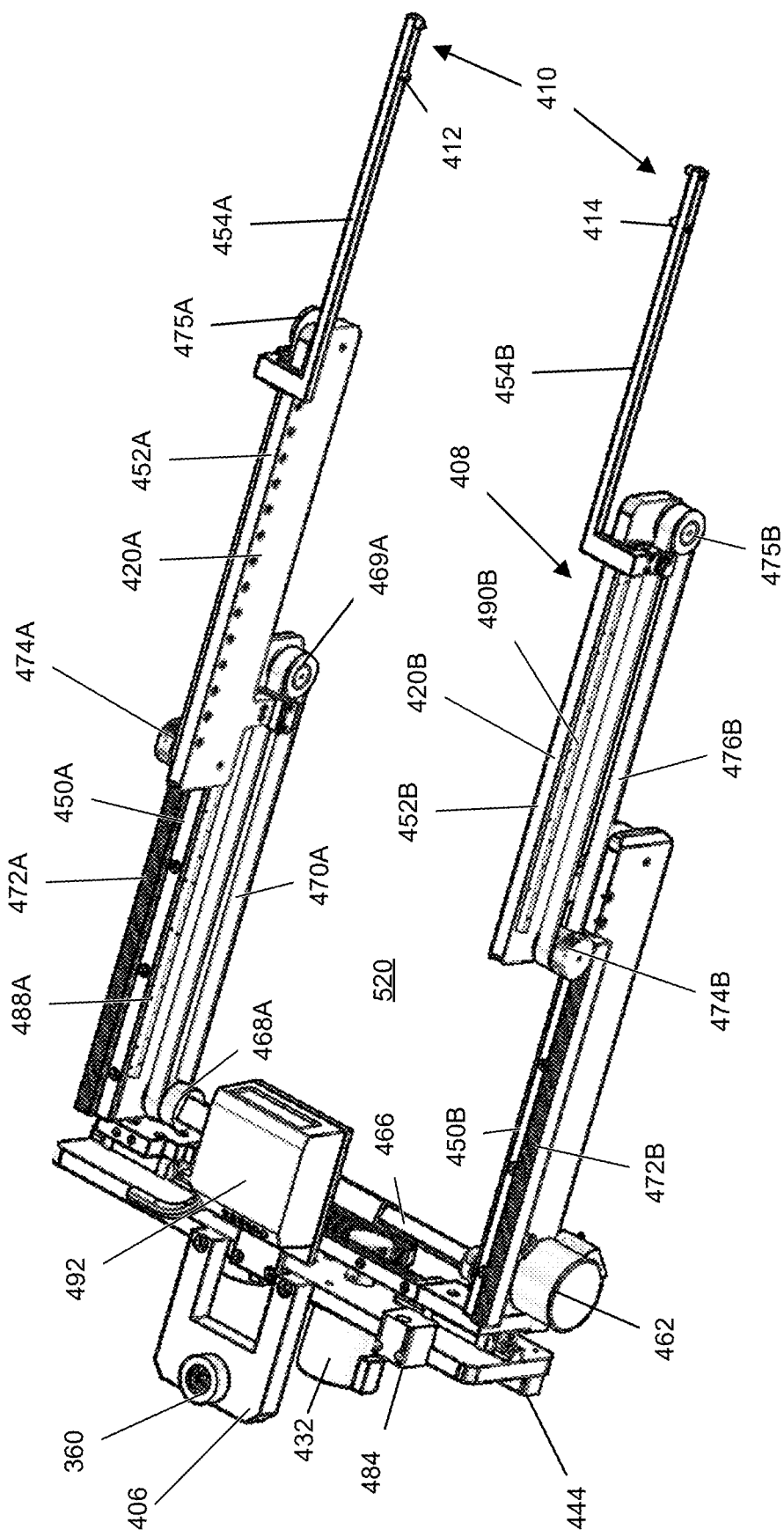
FIG. 19 is a front perspective view of the object manipulator of the robot of FIG. 3, the object manipulator disposed in an extended configuration.
Figure 20:
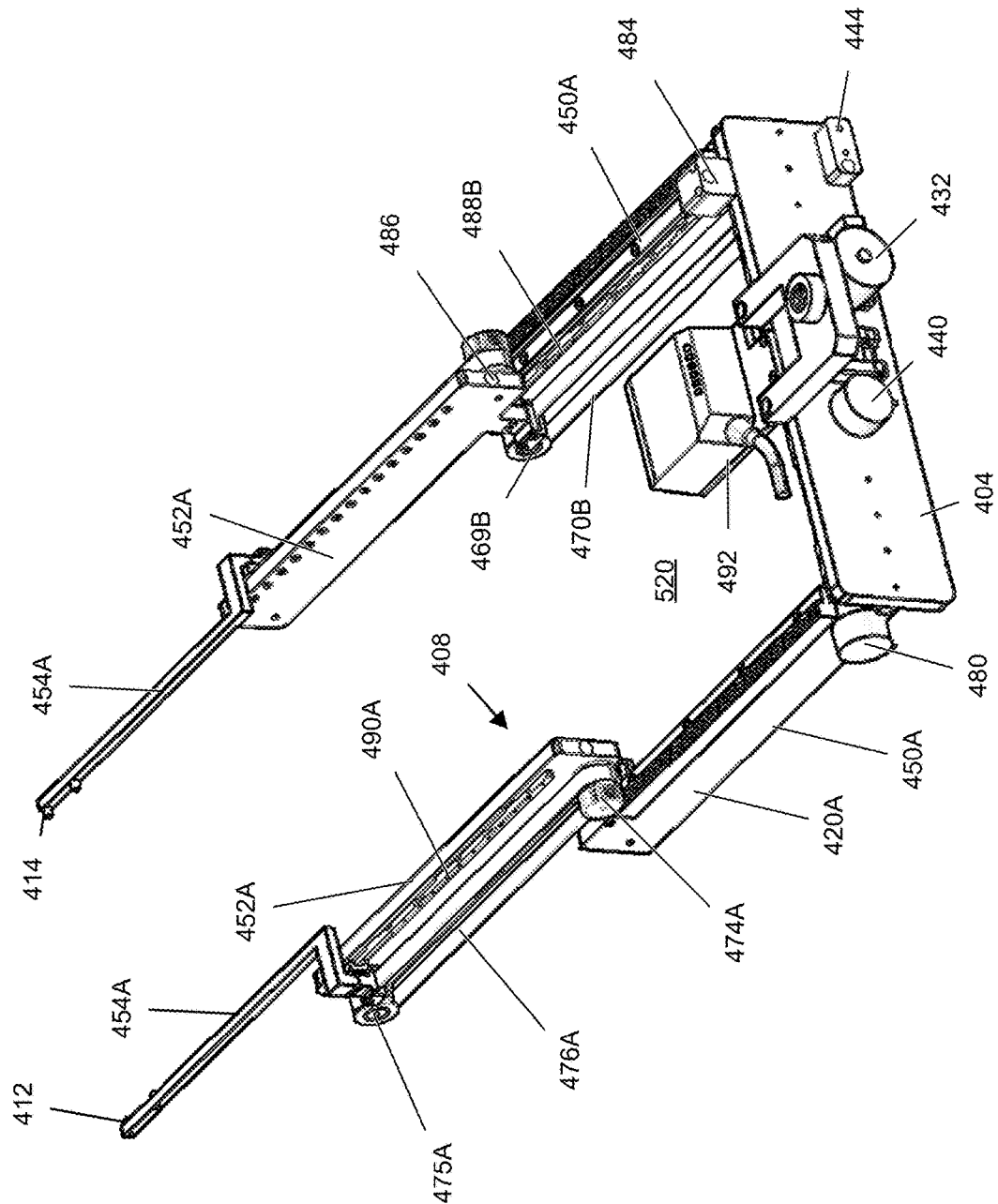
FIG. 20 is a rear perspective view of the object manipulator of FIG. 19.

In some embodiments, for example, each one of the extendible arms 420A and 420B, independently, is configurable in a retracted configuration (e.g. partially or fully retracted configuration), and an extended configuration (e.g. partially or fully extended configuration). FIG. 14 to FIG. 18 depict the extendible arms 420A and 420B in the fully retracted configuration. FIG. 19 to FIG. 20 depict the extendible arms 420A and 420B in the fully extended configuration.

In some embodiments, for example, while the first extendible arm 420A is disposed in the retracted configuration, base arm segment 450A, the intermediate arm segment 452A, and the terminal arm segment 454A are disposed in alignment, for example, in longitudinal alignment. In some embodiments, for example, while the first extendible arm 420A is disposed in the retracted configuration, the base arm segment 450A, the intermediate arm segment 452A, and the terminal arm segment 454A are disposed in a nested configuration. In some embodiments, for example, while the first extendible arm 420A is disposed in the extended configuration, at least a portion of the intermediate arm segment 452A is longitudinally offset from the base arm segment 450A, and at least a portion of the terminal arm segment 454A is longitudinally offset from the intermediate arm segment 452A. In some embodiments, for example, while the extendible arm 420A is disposed in the extended configuration, the base arm segment 450A, the intermediate arm segment 452A, and the terminal arm segment 454A are disposed in a de-nested configuration. In some embodiments, for example, while the extendible arm 420A is disposed in the extended configuration: (i) the intermediate arm segment 452A is disposed longitudinally, relative to the base arm segment 450A, and (iii) terminal arm segment 454A is disposed longitudinally, relative to the intermediate arm segment 452A.

In some embodiments, for example, the first extendible arm 420A is transitionable from the retracted configuration to the extended configuration via extension of the first extendible arm 420A. In some embodiments, for example, the first extendible arm 420A is transitionable from the extended configuration to the retracted configuration via retraction of the first extendible arm 420A.

In some embodiments, for example, while the second extendible arm 420B is disposed in the retracted configuration, base arm segment 450B, the intermediate arm segment 452B, and the terminal arm segment 454B are disposed in alignment, for example, in longitudinal alignment. In some embodiments, for example, while the second extendible arm 420B is disposed in the retracted configuration, the base arm segment 450B, the intermediate arm segment 452B, and the terminal arm segment 454B are disposed in a nested configuration. In some embodiments, for example, while the second extendible arm 420B is disposed in the extended configuration, at least a portion of the intermediate arm segment 452B is longitudinally offset from the base arm segment 450B, and at least a portion of the terminal arm segment 454B is longitudinally offset from the intermediate arm segment 452B. In some embodiments, for example, while the extendible arm 420B is disposed in the extended configuration, the base arm segment 450B, the intermediate arm segment 452B, and the terminal arm segment 454B are disposed in a de-nested configuration. In some embodiments, for example, while the extendible arm 420B is disposed in the extended configuration: (i) the intermediate arm segment 452B is disposed longitudinally, relative to the base arm segment 450B, and (iii) terminal arm segment 454B is disposed longitudinally, relative to the intermediate arm segment 452B.

In some embodiments, for example, the second extendible arm 420B is transitionable from the retracted configuration to the extended configuration via extension of the second extendible arm 420B. In some embodiments, for example, the second extendible arm 420B is transitionable from the extended configuration to the retracted configuration via retraction of the second extendible arm 420B.

While the extendible arms 420A and 420B are disposed in the fully retracted configuration, as depicted in FIG. 15 to FIG. 18, the minimum spacing distance between the end effector 410, for example, the first end effector counterpart 412 and the second end effector counterpart 414, and the mounting plate 404, taken along a longitudinal axis, is at its minimum value (e.g. the first end effector counterpart 412 and the second end effector counterpart 414 and the mounting plate 404 are closest together).

While the extendible arms 420A and 420B are disposed in the fully extended configuration, as depicted in FIG. 19 and FIG. 20, the minimum spacing distance between the end effector 410, for example, the first end effector counterpart 412 and the second end effector counterpart 414, and the mounting plate 404, taken along a longitudinal axis, is at its maximum value (e.g. the first end effector counterpart 412 and the second end effector counterpart 414 and the mounting plate 404 are furthest apart).

The extendible arms 420A and 420B are extendible and retractable for disposing the end effector 410 in a desired longitudinal position, for example, to grasp an object 10. While the end effector 410 is grasping the object 10, the extendible arms 420A and 420B are extendible and retractable for disposing the object 10 in a desired longitudinal position, for example, to effectuate an interaction of the object 10 with a station 1000, for example, a plate nest 1002 of a workstation 1000 or to effectuate an interaction with a accessory 502 of the robot 110, or to dispose the object 10 and the plate nest 1002 or microplate accessory 502 in an interaction-effective alignment.

In some embodiments, for example, the extension and retraction of the extendible arms 420A and 420B is with effect that the end effector 410 is displaced, relative to the base 302 and also relative to the mounting plate 404.

In some embodiments, for example, the object manipulator 402 includes an actuator configuration 460 to effect the longitudinal displacement (e.g. extension and retraction) of the first extendible arm 420A, relative to the mounting plate 404, and also to effect the longitudinal displacement (e.g. extension and retraction) of the second extendible arm 420B, relative to the mounting plate 404, as depicted in FIG. 14 to FIG. 22. In some embodiments, for example, the actuator configuration 460 includes a prime mover 462, for example, a motor, for example, an electric motor, that is disposed in operable communication with the first extendible arm 420A and the second extendible arm 420B. In some embodiments, for example, the prime mover 462 is mounted to the base arm segment 450B. The prime mover 462 is configured to generate a displacement force that is applicable to the first extendible arm 420A for longitudinally displacing (e.g. extending or retracting) the first extendible arm 420A, relative to the mounting plate 404, and also relative to the base 302. In response to application of the displacement force from the prime mover 462 to the first extendible arm 420A, the first extendible arm 420A is longitudinally displaced, relative to the mounting plate 404. The prime mover 462 is further configured to generate a displacement force that is applicable to the second extendible arm 420B for longitudinally displacing (e.g. extending or retracting) the second extendible arm 420B, relative to the mounting plate 404, and also relative to the base 302. In response to application of the displacement force from the prime mover 462 to the second extendible arm 420B, the second extendible arm 420B is longitudinally displaced, relative to the mounting plate 404.

In some embodiments, for example, the prime mover 462 is configurable in a longitudinal extension displacement drive state and a longitudinal retraction displacement drive state. In some embodiments, for example, while the prime mover 462 is disposed in the longitudinal extension displacement drive state, the displacement forces applied to the first extendible arm 420A and the second extendible arm 420B have a longitudinally outward direction, such that the first extendible arm 420A and the second extendible arm 420B are longitudinally displaced in the outward direction, relative to the mounting plate 404 (and also relative to the base 302), in response to application of the displacement forces to the first extendible arm 420A and the second extendible arm 420B (e.g. extending away from the mounting plate 404). In some embodiments, for example, while the prime mover 462 is disposed in the longitudinal retraction displacement drive state, the displacement forces applied to the first extendible arm 420A and the second extendible arm 420B have a longitudinally inward direction, such that the first extendible arm 420A and the second extendible arm 420B are longitudinally displaced in the inward direction, relative to the mounting plate 404 (and also relative to the base 302), in response to application of the displacement forces to the first extendible arm 420A and the second extendible arm 420B (e.g. retracting towards the mounting plate 404).

In some embodiments, for example, the prime mover 462 is disposed in data communication with the controller 202 and further disposed in electrical communication with the power supply 314, for actuation of the prime mover 462 in the longitudinal extension displacement drive state and the longitudinal retraction displacement drive state, via control commands from the controller 202.

In some embodiments, for example, the actuator configuration 460 includes a transmission configuration 464 to effect the operable communication between the prime mover 462 and the first extendible arm 420A and the second extendible arm 420B.

In some embodiments, for example, the transmission configuration 464 includes an axle 466, a gear 468A, a gear 468B, a gear 469A, a gear 469B, a transmission component 470A, such as a drive belt, a chain, a cable, and the like, a transmission component 470B, such as a drive belt, a chain, a cable, and the like, a linear gear 472A, a linear gear 472B, a gear 474A, a gear 474B, a gear 475A, a gear 475B, a transmission component 476A, such as a drive belt, a chain, a cable, and the like, and a transmission component 476B, such as a drive belt, a chain, a cable, and the like.

As depicted in FIG. 14 to FIG. 15 and FIG. 19 to FIG. 20, the gear 468A is connected to a first end (e.g. proximate end) of the base arm segment 450A, the gear 469A is connected to a second end (e.g. distal end) of the base arm segment 450A that is disposed on an opposite side of the base arm segment 450A, and the transmission component 470A connects the gear 468A and the gear 469A and extends between the gear 468A and the gear 469A, such that rotation of the gear 468A and the gear 469A effect displacement of the transmission component 470A around the gear 468A and the gear 469A. The transmission component 470A is further connected to the intermediate arm segment 452A, such that, as the transmission component 470A is displaced, the intermediate arm segment 452A is also displaced. As depicted, the intermediate arm segment 452A is connected to a portion of the transmission component 470A that is disposed between the gear 468A and the gear 469A. The displacement of the intermediate arm segment 452A, urged via displacement of the transmission component 470A, is relative to the base arm segment 450A, and along the extension axis 422 (e.g. along an axis that is parallel to the extension axis 422). As depicted, the linear gear 472A is mounted to the base arm segment 450A. As depicted, the gear 474A is connected to a first end (e.g. proximate end) of the intermediate arm segment 452A, the gear 475A is connected to a second end (e.g. distal end) of the intermediate arm segment 452A that is disposed on an opposite side of the intermediate arm segment 452A, and the transmission component 476A connects the gear 474A and the gear 475A and extends between the gear 474A and the gear 475A, such that rotation of the gear 474A and the gear 475A effect displacement of the transmission component 476A around the gear 474A and the gear 475A. The transmission component 476A is further connected to the terminal arm segment 454A, such that, as the transmission component 476A is displaced, the terminal arm segment 454A is also displaced. As depicted, the terminal arm segment 454A is connected to a portion of the transmission component 476A that is disposed between the gear 474A and the gear 475A. The displacement of the terminal arm segment 454A, urged via displacement of the transmission component 476A, is relative to the intermediate arm segment 452A, and along the extension axis 422 (e.g. along an axis that is parallel to the extension axis 422).

The linear gear 472A and the gear 474A are disposed in operable communication. In this respect, in some embodiments, for example, the linear gear 472A and the gear 474A are co-operatively configured such that, while the intermediate arm segment 452A is longitudinally displaced, relative to the base arm segment 450A, the gear 474A is rotated by the linear gear 472A, with effect that the transmission component 470A is displaced around the gear 474A and the gear 475A.

Similarly, as depicted in FIG. 14 to FIG. 15 and FIG. 19 to FIG. 20, the gear 468B is connected to a first end (e.g.

proximate end) of the base arm segment 450B, the gear 469B is connected to a second end (e.g. distal end) of the base arm segment 450B that is disposed on an opposite side of the base arm segment 450B, and the transmission component 470B connects the gear 468B and the gear 469B and extends between the gear 468B and the gear 469B, such that rotation of the gear 468B and the gear 469B effect displacement of the transmission component 470B around the gear 468B and the gear 469B. The transmission component 470B is further connected to the intermediate arm segment 452B, such that, as the transmission component 470B is displaced, the intermediate arm segment 452B is also displaced. As depicted, the intermediate arm segment 452B is connected to a portion of the transmission component 470B that is disposed between the gear 468B and the gear 469B. The displacement of the intermediate arm segment 452B, urged via displacement of the transmission component 470B, is relative to the base arm segment 450B, and along the extension axis 424 (e.g. along an axis that is parallel to the extension axis 424). As depicted, the linear gear 472B is mounted to the base arm segment 450B. As depicted, the gear 474B is connected to a first end (e.g. proximate end) of the intermediate arm segment 452B, the gear 475B is connected to a second end (e.g. distal end) of the intermediate arm segment 452B that is disposed on an opposite side of the intermediate arm segment 452B, and the transmission component 476B connects the gear 474B and the gear 475B and extends between the gear 474B and the gear 475B, such that rotation of the gear 474B and the gear 475B effect displacement of the transmission component 476B around the gear 474B and the gear 475B. The transmission component 476B is further connected to the terminal arm segment 454B, such that, as the transmission component 476B is displaced, the terminal arm segment 454B is also displaced. As depicted, the terminal arm segment 454B is connected to a portion of the transmission component 476B that is disposed between the gear 474B and the gear 475B. The displacement of the terminal arm segment 454B, urged via displacement of the transmission component 476B, is relative to the intermediate arm segment 452B, and along the extension axis 424 (e.g. along an axis that is parallel to the extension axis 424).

In some embodiments, for example, the extension axes 422 and 424 are disposed in a parallel relationship.

The linear gear 472B and the gear 474B are disposed in operable communication. In this respect, in some embodiments, for example, the linear gear 472B and the gear 474B are co-operatively configured such that, while the intermediate arm segment 452B is longitudinally displaced, relative to the base arm segment 450B, the gear 474B is rotated by the linear gear 472B, with effect that the transmission component 470B is displaced around the gear 474B and the gear 475B.

The axle 466 is configured to be rotated by the prime mover 462, and is connected to the gear 468A and the gear 468B, such that the gears 468A and 468A are rotated, for example, simultaneously or synchronously, in response to rotation of the axle 466.

While the extendible arms 420A and 420B are disposed in a retracted configuration, to extend the extendible arms 420A and 420B, for transitioning the extendible arms 420A and 420B to an extended configuration, the prime mover 462 drives rotation of the axle 466 in a first rotational direction. In response to rotation of the axle 466, the gear 468A and the gear 468B are rotated. In response to rotation of the gear 468A and the gear 468B, the transmission component 470A is displaced around the gear 468A and the gear 469A, and the transmission component 470B is displaced around the gear 468B and the gear 469B. In response to the displacement of the transmission component 470A around the gear 468A and the gear 469A and to the displacement of the transmission component 470B around the gear 468B and the gear 469B, the intermediate arm segment 452A is longitudinally displaced, for example, extended, relative to the base arm segment 450A, and the intermediate arm segment 452B is longitudinally displaced, for example, extended, relative to the base arm segment 450B. While the intermediate arm segment 452A is longitudinally displaced, relative to the base arm segment 450A, the gear 474A is rotated by the linear gear 472A. While the intermediate arm segment 452B is longitudinally displaced, relative to the base arm segment 450B, the gear 474B is rotated by the linear gear 472B. In response to rotation of the gear 474A, the transmission component 476A is displaced around the gear 474A and the gear 475A. In response to rotation of the gear 474B, the transmission component 470B is displaced around the gear 474B and the gear 475B. In response to displacement of the transmission component 476A around the gear 474A and the gear 475A, the terminal arm segment 454A is longitudinally displaced, for example, extended, relative to the intermediate arm segment 452A. In response to displacement of the transmission component 476B around the gear 474B and the gear 475B, the terminal arm segment 454B is longitudinally displaced, for example, extended, relative to the intermediate arm segment 452B. At this point, the first extendible arm 420A and the second extendible arm 420B are disposed in the extended configuration.

While the extendible arms 420A and 420B are disposed in an extended configuration, to retract the extendible arms 420A and 420B, for transitioning the extendible arms 420A and 420B to a retracted configuration, the prime mover 462 drives rotation of the axle 466 in a second rotational direction that is opposite the first rotational direction. In response to rotation of the axle 466, the gear 468A and the gear 468B are rotated. In response to rotation of the gear 468A and the gear 468B, the transmission component 470A is displaced around the gear 468A and the gear 469A, and the transmission component 470B is displaced around the gear 468B and the gear 469B. In response to the displacement of the transmission component 470A around the gear 468A and the gear 469A and to the displacement of the transmission component 470B around the gear 468B and the gear 469B, the intermediate arm segment 452A is longitudinally displaced, for example, retracted, relative to the base arm segment 450A, and the intermediate arm segment 452B is longitudinally displaced, for example, retracted, relative to the base arm segment 450B. While the intermediate arm segment 452A is longitudinally displaced, relative to the base arm segment 450A, the gear 474A is rotated by the linear gear 472A. While the intermediate arm segment 452B is longitudinally displaced, relative to the base arm segment 450B, the gear 474B is rotated by the linear gear 472B. In response to rotation of the gear 474A, the transmission component 476A is displaced around the gear 474A and the gear 475A. In response to rotation of the gear 474B, the transmission component 470B is displaced around the gear 474B and the gear 475B. In response to displacement of the transmission component 476A around the gear 474A and the gear 475A, the terminal arm segment 454A is longitudinally displaced, for example, retracted, relative to the intermediate arm segment 452A. In response to displacement of the transmission component 476B around the gear 474B and the gear 475B, the terminal arm segment 454B is longitudinally displaced, for example, retracted, relative to the intermediate arm segment 452B. At this point, the first extendible arm 420A and the second extendible arm 420B are disposed in the retracted configuration.

The prime mover 462 is configured to extend and retract the first and second extendible arms 420A and 420B via the axle 466, gear 468A, gear 468B, gear 469A, gear 469B, transmission component 470A, transmission component 470B, linear gear 472A, linear gear 472B, gear 474A, gear 474B, gear 475A, gear 475B, transmission component 476A, and transmission component 476B, such that the displacement forces generated by the prime mover 462 are applied to the first extendible arm 420A and the second extendible arm 420B via the axle 466, gear 468A, gear 468B, gear 469A, gear 469B, transmission component 470A, transmission component 470B, linear gear 472A, linear gear 472B, gear 474A, gear 474B, gear 475A, gear 475B, transmission component 476A, and transmission component 476B. In this respect, the displacement forces generated by the prime mover 462 are extendible arm longitudinal displacement forces. In response to application of the extendible arm longitudinal displacement force from the prime mover 462 to the first extendible arm 420A and the second extendible arm 420B, the first extendible arm 420A and the second extendible arm 420B are longitudinally displaced, relative to the mounting plate 404 (and also relative to the base 302).

In some embodiments, for example, the extension and retraction of the extendible arms 420A and 420B has a stroke of 277 millimeters.

In some embodiments, for example, the actuator configuration 460 includes an encoder 480. In some embodiments, for example, the encoder 440 is mounted to the base arm segment 450A. In some embodiments, for example, the encoder 440 is configured to detect the rotation of the axle 466, such that the encoder 440 is coupled to the axle 466. In some embodiments, for example, the encoder 440 is configured to detect the rotation of the axle 466 by detecting the rotation of the gear 468A, such that the encoder 440 is coupled to the gear 468A. In some embodiments, for example, the encoder 440 is disposed in data communication with the controller 202 and further disposed in electrical communication with the power supply 314. Based on the rotation of the axle 466 or the gear 468A, and the configuration of the transmission configuration 464, the longitudinal displacement of the first extendible arm 420A and the longitudinal displacement of the second extendible arm 420B, relative to the mounting plate 404, can be determined by the controller 202.

Figure 15:
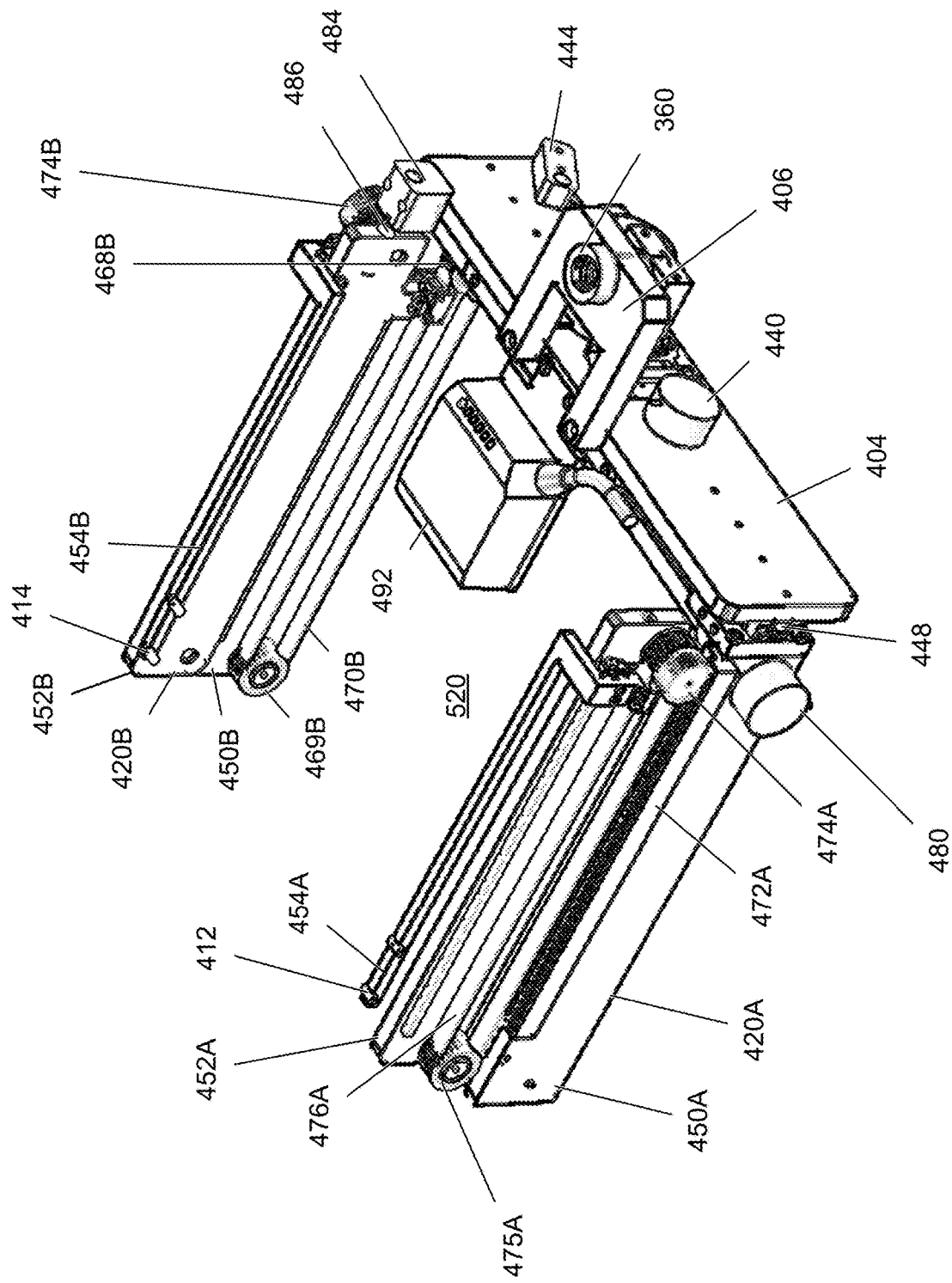
FIG. 15 is a rear perspective view of the object manipulator of FIG. 14.

In some embodiments, for example, the object manipulator 402 includes a sensor 484 and a sensor actuator 486, as depicted in FIG. 15 and FIG. 20. In some embodiments, for example, the sensor 484 is a proximity sensor, for example a Littelfuse reed switch, and the sensor actuator 486 is a magnet. In some embodiments, for example, the sensor 484 is mounted to an upper right portion of the mounting plate 404, and the sensor actuator 486 is mounted to the rear portion of the intermediate arm segment 452B, such that the sensor actuator 486 is longitudinally displaced, relative to the mounting plate 404, while the intermediate arm segment 452B is longitudinally displaced, relative to the mounting plate 404. In some embodiments, for example, the sensor 484 is disposed in data communication with the controller 202 and further disposed in electrical communication with the power supply 314. In some embodiments, for example, the sensor actuator 486 is mounted to the rear portion of the intermediate arm segment 452A. In such embodiments, for example, the sensor 484 is mounted to the upper left portion of the mounting plate 404.

In some embodiments, for example, the sensor 484 and the sensor actuator 486 are disposed in alignment, for example, longitudinal alignment. While the sensor 484 and the sensor actuator 486 are disposed a proximate relationship, that the sensor actuator 484 is detected by the sensor 486. While the sensor actuator 486 is detected by the sensor 484, the sensor 484 is configured to send data to the controller 202, representative of the sensor 484 and the sensor actuator 486 being disposed in the proximate relationship. In this respect, the sensor 484 and the sensor actuator 486 are co-operatively configured to define an initial longitudinal position of the extendible arm configuration 408, relative to the mounting plate 404, and also relative to the base 302. In some embodiments, for example, the initial longitudinal position of the extendible arm configuration 408, relative to the mounting plate 404, and also relative to the base 302, is established while the extendible arms 420A and 420B are fully retracted. In some embodiments, for example, the initial longitudinal position of the extendible arm configuration 408, relative to the mounting plate 404, and also relative to the base 302, is established while the minimum spacing distance between the end effector 410 (e.g. the first end effector counterpart 412 and the second end effector counterpart 414) and the mounting plate 404 is at its minimum value (e.g. while the end effector 410 and the mounting plate 404 are the closest together), as depicted in FIG. 14 to FIG. 18. In response to processing of the data from the sensor 484 representative of the sensor 484 and the sensor actuator 486 being disposed in the proximate relationship, the controller 202 determines that the extendible arm configuration 408 is disposed, relative to the mounting plate 404 and relative to the base 302, in the initial longitudinal position.

In some embodiments, for example, the object manipulator 402 includes a guide rail 488A, to guide the longitudinal displacement of the intermediate arm segment 452A, relative to the base arm segment 450A. In some embodiments, for example, the object manipulator 402 includes a guide rail 488B, to guide the longitudinal displacement of the intermediate arm segment 452B, relative to the base arm segment 450B. As depicted in FIG. 19 and FIG. 20, the guide rail 488A is mounted to the base arm segment 450A, and the guide rail 488B is mounted to the base arm segment 450B.

In some embodiments, for example, the object manipulator 402 includes a guide rail 490A, to guide the longitudinal displacement of the terminal arm segment 454A, relative to the intermediate arm segment 452A. In some embodiments, for example, the object manipulator 402 includes a guide rail 490B, to guide the longitudinal displacement of the terminal arm segment 454B, relative to the intermediate arm segment 452B. As depicted in FIG. 19 and FIG. 20, the guide rail 490A is mounted to the base arm segment 450A, and the guide rail 490B is mounted to the base arm segment 450B.

In some embodiments, for example, the object manipulator 402 includes a barcode reader 492 for scanning a barcode of the object 10, for example, the microplate configuration 10. In some embodiments, for example, the barcode reader 492 is an MS3 barcode reader. In some embodiments, for example, the barcode reader 492 is disposed in data communication with the controller 202, and further disposed in electrical communication with the power supply 314. In some embodiments, for example, the barcode reader 492 is mounted on a barcode mount 494 of the object manipulator 402, which is connected to the mounting plate 404.

In some embodiments, for example, various objects 10 are graspable by the object manipulator 402, for example, by changing the end effector 410. In some embodiments, for example, the end effector 410 can be changed, by changing the first and second end effector counterparts 412 and 414, such that the end effector 410 is suitable for grasping the object 10. In some embodiments, for example, the end effector 410 is selected based on the characteristics of the object 10, such as the shape, material properties, weight, and temperature of the object 10. In some embodiments, for example, the terminal arm segment 454A can be decoupled from the intermediate arm segment 452A and another terminal arm segment 454A can be coupled to the intermediate arm segment 452A, and the terminal arm segment 454B can be decoupled from the intermediate arm segment 452B, and another terminal arm segment 454B can be coupled to the intermediate arm segment 452B, to customize the first and second end effector counterparts 412 and 414, thereby customizing the end effector 410, based on the object 10 to be grasped. In some embodiments, for example, the object 10 is a petri dish. In some embodiments, for example, the object 10 is a box. In some embodiments, for example, the object 10 is a rod.

Figure 4:
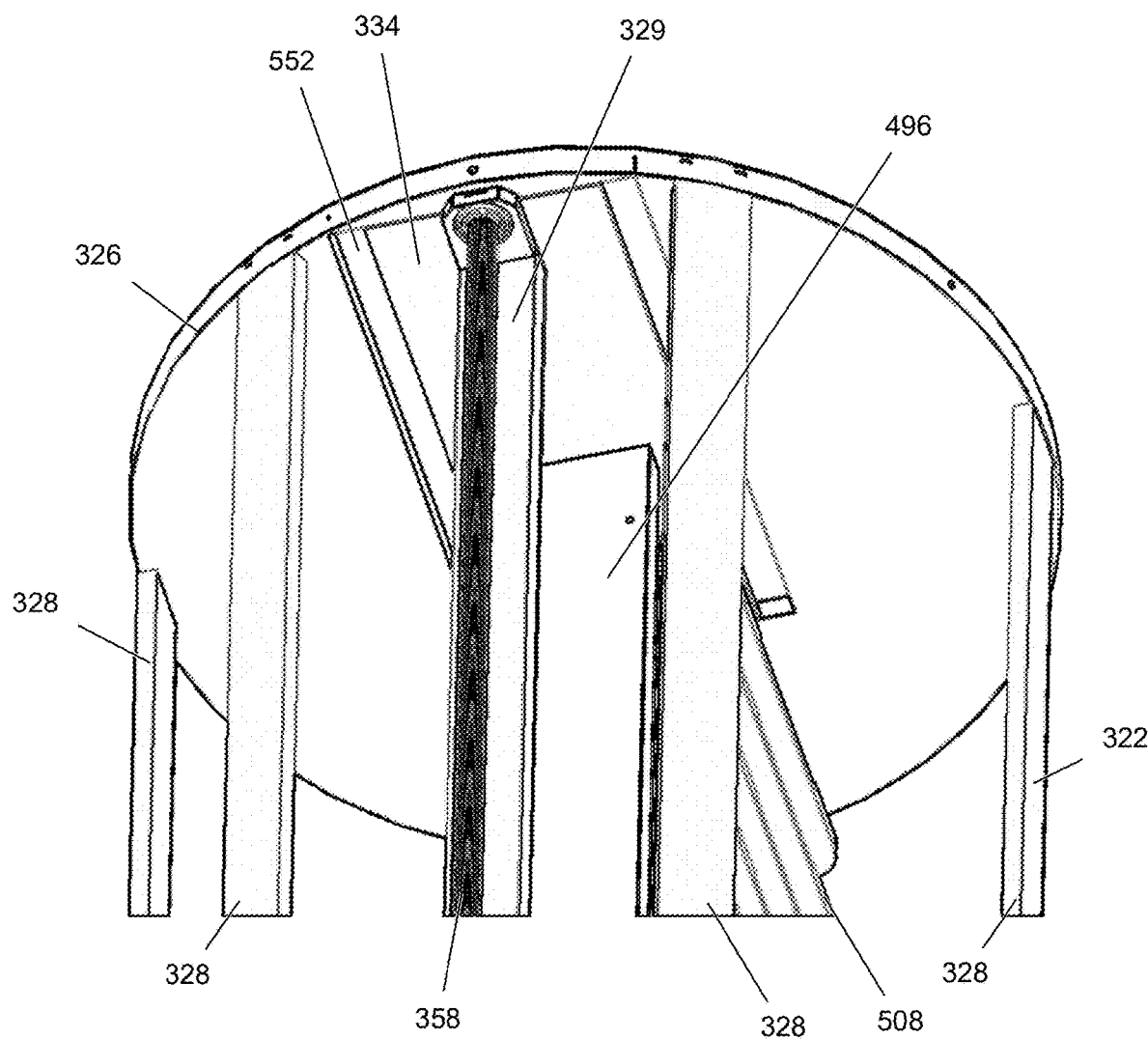
FIG. 4 is a rear perspective view of an upper portion of the robot of FIG. 3.

In some embodiments, for example, the object manipulator configuration 330 includes an accessory mounting member 496, as depicted in FIG. 4 and FIG. 6. The accessory mounting member 496 extends between the object manipulator configuration lower member 332 and the object manipulator configuration upper member 334. In some embodiments, for example, the lift mechanism frame member 329 and the accessory mounting member 496 are disposed in a parallel relationship. In some embodiments, for example, the lift mechanism frame member 329, the object manipulator 402, and the accessory mounting member 496 are co-operatively configured such that the mounting plate 404 is disposed between the lift mechanism frame member 329 and the accessory mounting member 496.

In some embodiments, for example, the object manipulator configuration 330 includes the accessory configuration 500, wherein the accessory configuration 500 includes at least one accessory 502 configured to interact with the object 10. In some embodiments, for example, the accessory mounting member 496 and the accessory configuration 500 are co-operatively configured such that the accessory configuration 500 is mounted to the accessory mounting member 496. In some embodiments, for example, each one of the at least one accessory 502, independently, is mounted to the same side, for example, the front side, of the accessory mounting member 496.

As depicted, the accessories 502 of the accessory configuration 500 of the robot 110 are configured to interact with the microplate configuration 10. In this respect, the accessories 502 are microplate accessories 502, and the accessory configuration 500 is the microplate accessory configuration 500. In some embodiments, for example, wherein the object 10 is an object 10 other than the microplate configuration 10, the robot 110, for example, the accessories 502 of the accessory configuration 500, the object manipulator 402, and the like, are configured to interact with such an object 10.

Figure 23:
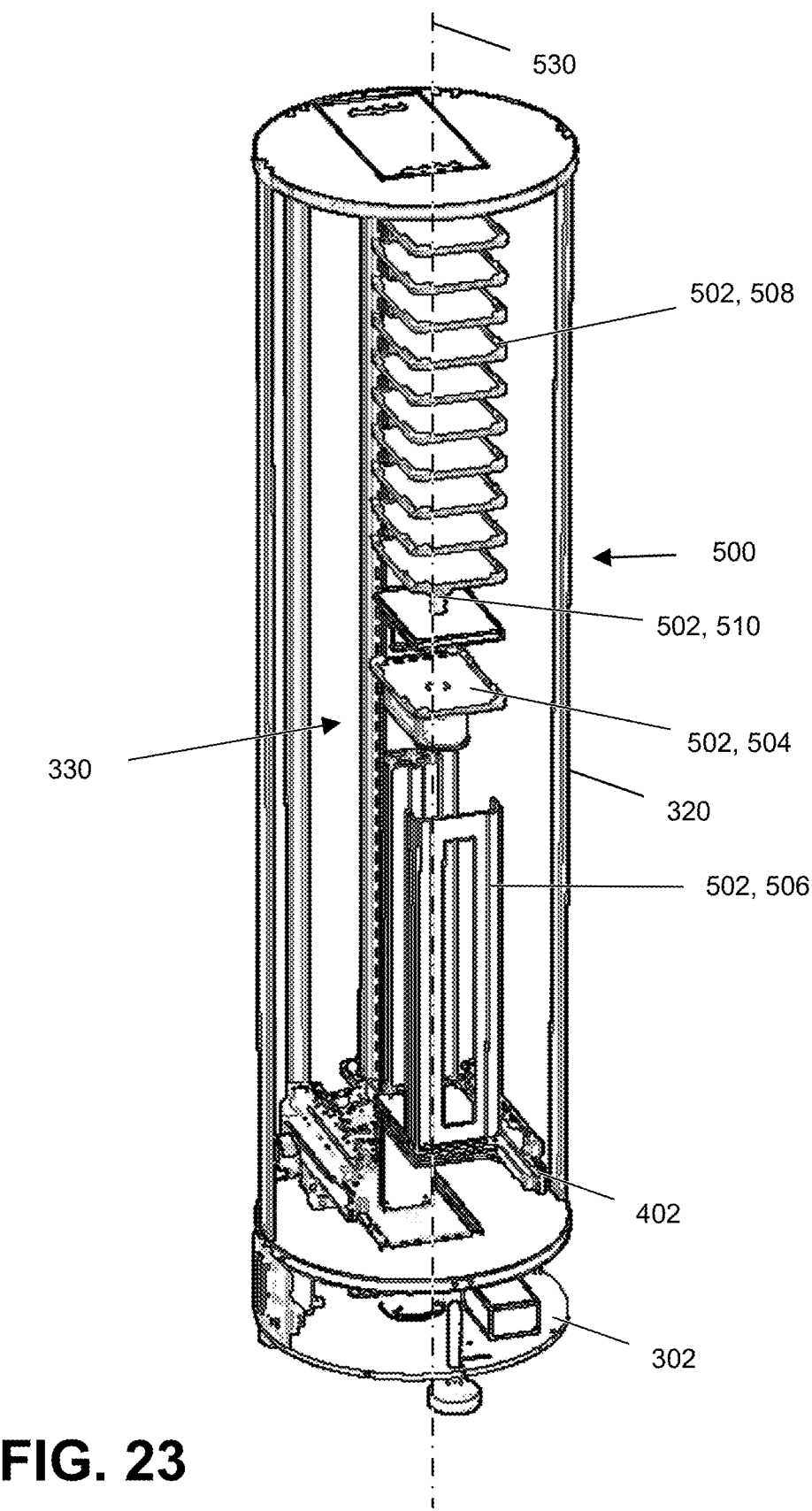
FIG. 23 is a front perspective view of the robot of FIG. 3.
Figure 24:
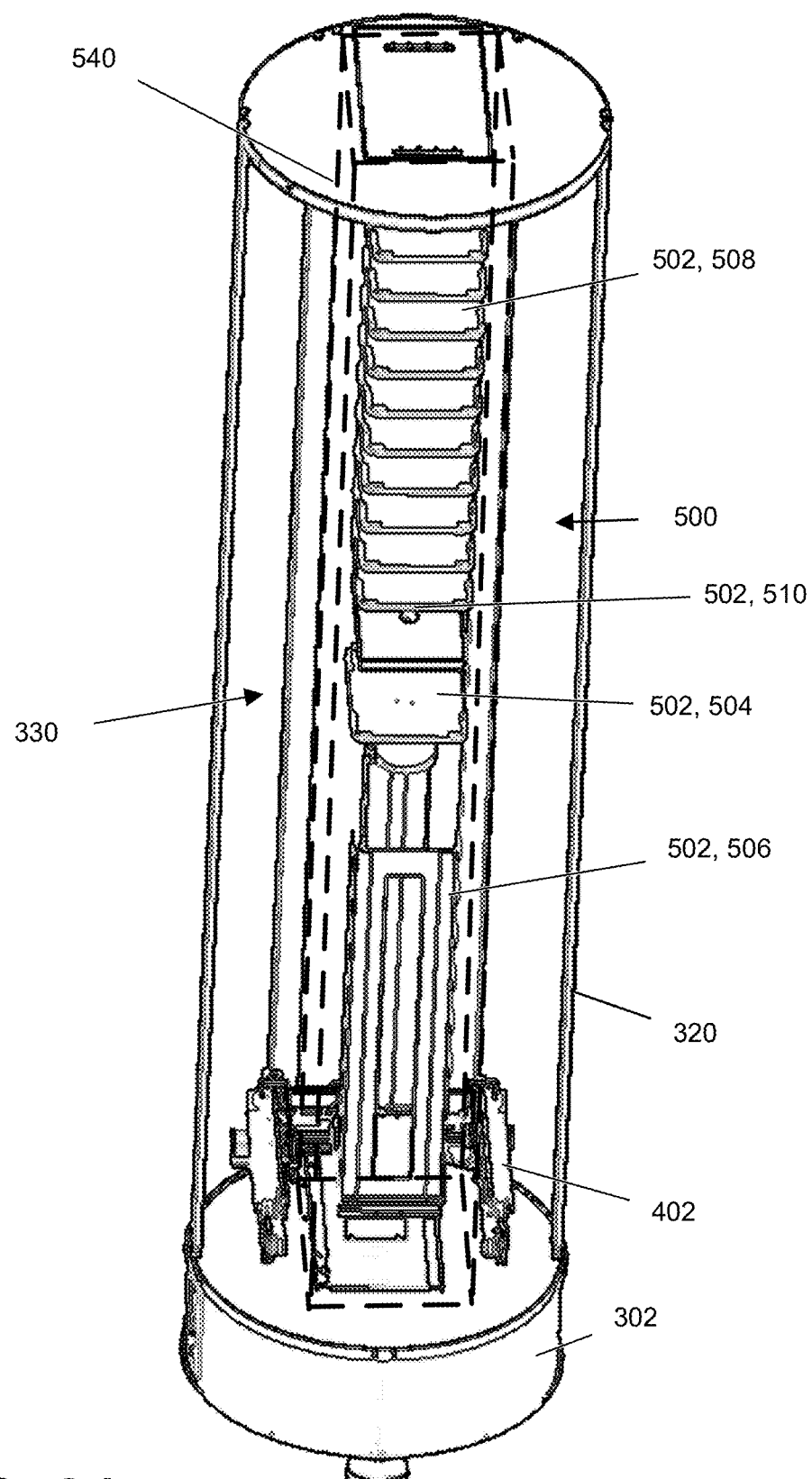
FIG. 24 is another front perspective view of the robot of FIG. 3.

In some embodiments, for example, wherein the object 10 is the microplate configuration 10, the microplate accessory configuration 500 includes more than one microplate accessory 502. As depicted in FIG. 3, FIG. 23, and FIG. 24, the accessories 502 of the microplate accessory configuration 500 includes a plate re-grip configuration 504 comprising a re-grip nest 505, a plate sleeve 506, a nest hotel 508 comprising one or more plate nests 509, and a de-lidder 510, comprising a suction cup 512.

In some embodiments, for example, the re-grip nest 505 of the plate re-grip configuration 504 is configured to rotate, relative to the base 302 (and also relative to the object manipulator 402), about a rotation axis that is parallel to a vertical axis. In some embodiments, for example, while the microplate configuration 10 is disposed in the plate re-grip nest 505, the microplate configuration 10 is rotatable, via the plate re-grip nest 505, relative to the base 302 (and also relative to the object manipulator 402), to transition the microplate configuration 10 between a landscape configuration and a portrait configuration. While the microplate configuration 10 is disposed in the landscape configuration, the long side of the microplate configuration 10 is extending in a direction that is parallel to a lateral axis. While the microplate configuration 10 is disposed in the portrait configuration, the long side of the microplate configuration 10 is extending in a direction that is parallel to a lateral axis.

In some embodiments, for example, the plate sleeve 506 is configured to receive a plurality of microplate configurations 10 for stacking the microplate configurations 10. In some embodiments, for example, the microplate configurations 10 are stacked in a last in, first out configuration. In some embodiments, for example, the microplate configurations 10 are placed in the plate sleeve 506 for storage of the microplate configurations 10. In some embodiments, for example, the plate sleeve 506 is configured in a portrait configuration.

In some embodiments, for example, the nest hotel 508 is configured to receive one or more microplate configurations 10. In this respect, in some embodiments, for example, the nest hotel 508 includes one or more plate nests 509. In some embodiments, for example, for each one of the one or more plate nests 509, independently, the plate nest 509 is configured to receive a microplate configuration 10. As depicted, the plate nests 509 of the nest hotel 508 are spaced apart, such that a particular one of microplate configurations 10 that are received in the nest hotel 508 can be retrieved by the object manipulator 10. In some embodiments, for example, each one of the one or more plate nests 509 is configured in a portrait configuration.

In some embodiments, for example, the de-lidder 510 is configured to remove the lid 14 of the microplate configuration 10 from the microplate 12. In this respect, the de-lidder 510 includes a suction cup 512 that is connected to a vacuum pump 514. In some embodiments, for example, the vacuum pump 514 is mounted to the bottom frame member 324. In some embodiments, for example, the vacuum pump 514 is disposed in data communication with the controller 202 and further disposed in electrical communication with the power supply 314, for actuation of the vacuum pump 514. While the lid 14 is disposed in contact engagement with the suction cup 512, the vacuum pump 514 is actuated to effectuate suction at the suction cup 512, such that the lid 14 is suctioned by the suction cup 512. While the lid 14 is suctioned by the suction cup 512, in response to displacement of the microplate 12, relative to the lid 14, for example, in a downward direction, the lid 14 is removed from the microplate 12.

In some embodiments, for example, the object manipulator 402 defines an internal window 520. In some embodiments, for example, the object manipulator 402 has a generally C-shaped or horseshoe-shaped configuration, wherein the first and second extendible arms 420A and 420B define the terminal ends of the C-shape or horseshoe, and the mounting plate 404 extends between the first and second extendible arms 420A and 420B. In some embodiments, for example, the window 520 is disposed between the first and second extendible arms 420A and 420B. In some embodiments, for example, the window 520 is disposed between the first end effector counterpart 412 and the second end effector counterpart 414. In some embodiments, for example, the window 520 is disposed forwardly of the mounting plate 404. In some embodiments, for example, the window 520 is disposed forwardly of the axle 466. In some embodiments, for example, the window 520 is disposed forwardly of the barcode reader 492. In some embodiments, for example, the window 520 is disposed rearwardly of the forwardmost surface 522A of the base arm segment 450A and the forwardmost surface 522B of the base arm segment 450B.

In some embodiments, for example, the internal window 520 of the object manipulator 402 and the accessory configuration 500 are disposed in vertical alignment. In some embodiments, for example, the internal window 520 of the object manipulator 402 and at least one of the accessories 502 of the accessory configuration 500 is disposed in vertical alignment. In some embodiments, for example, the internal window 520 of the object manipulator 402 and each one of the accessories 502 of the accessory configuration 500, independently, are disposed in vertical alignment.

In some embodiments, for example, the accessory mounting member 496 extends through the internal window 520.

In some embodiments, for example, the displaceability of the object manipulator 402, relative to the base 302, that is effectuatable by the lift mechanism 340, is a displaceability of the object manipulator 302, relative to the accessory configuration 500.

While the object 10 is grasped by the end effector 410 of the object manipulator 402, the object manipulator 402 and the object 10 are configurable for disposition in a displacement-ready relationship, as depicted in FIG. 21, wherein, in the displacement-ready relationship, there is an absence of occlusion of the internal window 520 by the object 10, for example, by the microplate 12 and/or the lid 14 of the microplate configuration 10.

The object manipulator 402, the lift mechanism 340, and the accessory configuration 500 are co-operatively configured such that, while: (i) the object 10 is grasped by the end effector 410, such that the object manipulator 402 and the object 10 are disposed in the displacement-ready relationship, and (ii) the object manipulator 402 is displaced, from a first vertical position to a second vertical position: the displacement of the object manipulator 402, relative to a accessory 502 of the accessory configuration 50, is such that at least a portion of the accessory 502 is passed through the internal window 520.

In some embodiments, for example, the object manipulator 402, the lift mechanism 340, and the accessory configuration 500 are co-operatively configured such that, while: (i) the object 10 is grasped by the end effector 410, such that the object manipulator 402 and the object 10 are disposed in the displacement-ready relationship, and (ii) the object manipulator 402 is displaced, from the first vertical position to the second vertical position: the displacement of the object manipulator 402, relative to the accessory 502, is such that the entirety of the accessory 502 is passed through the internal window 520.

In some embodiments, for example, the object manipulator 402 and the accessory 502 are co-operatively configured such that: while the object manipulator 402 is disposed at the first vertical position, the object 10 is disposed at a first side of the accessory 502; and while the object manipulator 402 is disposed at the second vertical position, the object 10 is disposed at a second side of the accessory 502 that is opposite the first side.

In some embodiments, for example, the first side of the accessory 502 is a bottom side of the accessory 502, and the second side of the accessory 502 is a top side of the accessory 502.

In some embodiments, for example, the first side of the accessory 502 is a top side of the accessory 502, and the second side of the accessory 502 is a bottom side of the accessory 502.

In some embodiments, for example, the first vertical position is a lower vertical position, and the second vertical position is a higher vertical position.

In some embodiments, for example, the first vertical position is a higher vertical position, and the second vertical position is a lower vertical position.

In some embodiments, for example, while the object 10 is grasped by the end effector 410, the object manipulator 402 and the object 10 are further configurable for disposition in a displacement-ineffective relationship, as depicted in FIG. 22, wherein the internal window 520 is occluded by the object 10.

In some embodiments, for example, the object manipulator 402 and the accessory configuration 500 are co-operatively configured such that, while the object 10 is grasped by the end effector 410, such that the object manipulator 402 and the object 10 are disposed in the displacement-ineffective relationship, passing of the accessory 502, through the internal window 520, for effectuating the displacement of the object manipulator 410, relative to the accessory 502, is opposed by the object 10.

In some embodiments, for example, while the object 10 is grasped by the end effector 410, such that the object manipulator 402 and the object 10 are disposed in the displacement-effective relationship, relative to its disposition while the object manipulator 402 and the object 10 are disposed in the displacement-ineffective relationship, the end effector 410 and the object 10 are disposed further from the lift mechanism 340 and also further from the mounting plate 404.

In some embodiments, for example, while the object 10 is grasped by the end effector 410, such that the object manipulator 402 and the object 10 are disposed in the displacement-effective relationship, the first and second extendible arms 420A and 420B are disposed in an extended configuration, as depicted in FIG. 21.

In some embodiments, for example, while the object 10 is grasped by the end effector 410, such that the object manipulator 402 and the object 10 are disposed in the displacement-ineffective relationship, the first and second extendible arms 420A and 420B are disposed in a retracted configuration, as depicted in FIG. 22.

In some embodiments, for example, while the object 10 is grasped by the end effector 410, such that the object manipulator 402 and the object 10 are disposed in the displacement-effective relationship, in response to retraction of the first and second extendible arms 420A and 420B to transition the extendible arms from the extended configuration to the retracted configuration, the object manipulator 402 and the object 10 become disposed in the displacement-ineffective relationship.

In some embodiments, for example, while the object 10 is grasped by the end effector 410, such that the object manipulator 402 and the object 10 are disposed in the displacement-ineffective relationship, in response to extension of the first and second extendible arms 420A and 420B to transition the extendible arms from the retracted configuration to the extended configuration, the object manipulator 402 and the object 10 become disposed in the displacement-effective relationship.

In some embodiments, for example, while the object 10 is grasped by the end effector 410, such that the object manipulator 402 and the object 10 are disposed in the displacement-effective relationship, in response to retraction of the first and second extendible arms 420A and 420B to transition the extendible arms from the extended configuration to the retracted configuration, the object 10 is longitudinally displaced (e.g. retracted), in a direction towards the mounting plate 404, such that the object 10 is disposed in an interaction-effective alignment with an accessory 502 of the accessory configuration 500. While the object 10 is disposed in the interaction-effective alignment with the accessory 502, an interaction between the object 10 and the accessory 502 is effectuatable in response to vertical displacement of the object 10, relative to the base 302, in a direction towards the accessory 502. In some embodiments, for example, while the object 10 is disposed in the interaction-effective alignment with the accessory 502, the object manipulator 402 and the object 10 are disposed in the displacement-ineffective relationship.

In some embodiments, for example, the object manipulator 402, the lift mechanism 340, and the accessory configuration 500 are co-operatively configured such that, while: (i) there is an absence of grasping of the object 10 by the object manipulator 402, and (ii) the object manipulator 402 is displaced, from a first vertical position to a second vertical position: the displacement of the object manipulator 402, relative to the accessory configuration 500, is such that at least a portion of the accessory 502 of the accessory configuration 500 is passed through the internal window 520.

In some embodiments, for example, while there is an absence of grasping of the object 10 by the object manipulator 402, there is an absence of occlusion of the internal window 520.

In some embodiments, for example, the object manipulator 402, the lift mechanism 340, and the accessory configuration 500 are co-operatively configured such that, while: (i) there is the absence of grasping of the object 10 by the object manipulator 402, and (ii) the object manipulator 402 is displaced, from the first vertical position to the second vertical position: the displacement of the object manipulator 402, relative to the accessory 502 of the accessory configuration 500, is such that the entirety of the accessory 502 is passed through the internal window 520.

In some embodiments, for example, the object manipulator 402 and the accessory configuration 500 are co-operatively configured such that: while the object manipulator 402 is disposed at the first vertical position, the object manipulator 402 is disposed at a first side of the accessory 502; and while the object manipulator 402 is disposed at the second vertical position, the object manipulator 402 is disposed at a second side of the accessory 502 that is opposite the first side.

In some embodiments, for example, the first side of the accessory 502 is a bottom side of the accessory 502, and the second side of the accessory 502 is a top side of the accessory 502.

In some embodiments, for example, the first side of the accessory 502 is a top side of the accessory 502, and the second side of the accessory 502 is a bottom side of the accessory 502.

In some embodiments, for example, the first vertical position is a lower vertical position, and the second vertical position is a higher vertical position.

In some embodiments, for example, the first vertical position is a higher vertical position, and the second vertical position is a lower vertical position.

In some embodiments, for example, for each one of the at least one accessory 502 of the accessory configuration 500, independently, the at least one accessory 502 and the object manipulator 402 are disposed in vertical alignment.

In some embodiments, for example, for each one of the at least one accessory 502 of the accessory configuration 500, independently, the at least one accessory 502 and the object manipulator 402 are disposed in vertical alignment along a vertical alignment axis 530, as depicted in FIG. 23. In some embodiments, for example, the vertical alignment axis 530 is parallel to a vertical axis. In some embodiments, for example, the vertical alignment axis 530 and the vertical travel axis 342 are disposed in a parallel relationship.

In some embodiments, for example, for each one of the at least one accessory 502 of the accessory configuration 500, independently, the vertical alignment of the at least one accessory 502 and the object manipulator 402 is such that the at least one accessory 502 and the internal window 520 of the object manipulator 402 are disposed in vertical alignment.

In some embodiments, for example, the at least one accessory 502 of the accessory configuration 500 includes a first accessory 502 and a second accessory 502; and the first accessory 502 and the second accessory 502 are disposed in vertical alignment, for example, along the vertical alignment axis 530.

In some embodiments, for example, by having the one or more accessories 502 of the robot 110 be disposed in vertical alignment with the object manipulator 402, the footprint of the robot 110 is reduced.

In some embodiments, for example, the displaceability of the object manipulator 402, relative to the base 302, along the vertical travel axis 342, via the lift mechanism 340, is such that a columnar space 540 is defined by the internal window 520 of the object manipulator 402, as depicted in FIG. 24 in broken line.

In some embodiments, for example, for each one of the at least one accessory 502 of the accessory configuration 500, independently, the at least one accessory 502 is disposed in the columnar space 540.

In some embodiments, for example, the columnar space 540 is a vertical columnar space 540.

In some embodiments, for example, the at least one accessory 502 of the accessory configuration 500 includes a first accessory 502 and a second accessory 502; and the first accessory 502 and the second accessory 502 are disposed in vertical alignment, for example, along the vertical alignment axis 530.

In some embodiments, for example, at least one accessory 502 of the accessory configuration 500 is disposed in the columnar space 540.

In some embodiments, for example, the object manipulator configuration 330, which includes: (i) the object manipulator 402, (ii) the lift mechanism 340, (iii) the accessory mounting member 496, and (iv) the accessory configuration 500, is laterally displaceable, relative to the frame 322.

Figure 28:
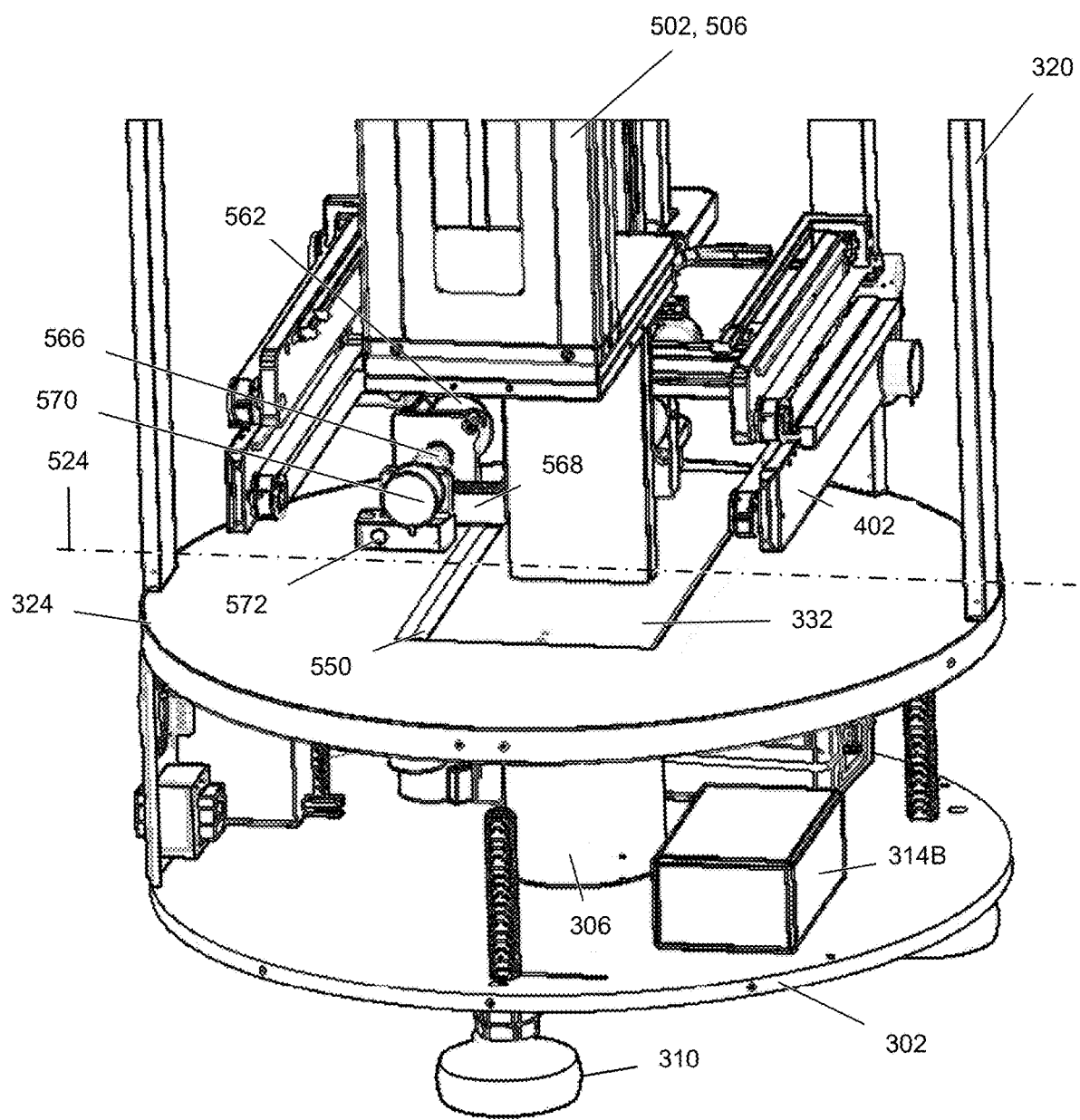
FIG. 28 is another front perspective view of the lower portion of the robot of FIG. 3.

In some embodiments, for example, the base 302 and the robot body 320 are co-operatively configured such that there is absence of lateral displaceability of the frame 322, relative to the base 302. Accordingly, the lateral displaceability of the object manipulator configuration 330, relative to the frame 322, is a lateral displaceability of the object manipulator configuration 330, relative to the base 302. In some embodiments, for example, the lateral displaceability is along a lateral displacement axis 524, as depicted in FIG. 28. In some embodiments, for example, the lateral displacement axis 524 is parallel to a lateral axis. In some embodiments, for example, the lateral displacement axis 524 and the vertical travel axis 342 are disposed in a perpendicular relationship. In some embodiments, for example, the lateral displacement axis 524 and the extension axis 422 of the first extendible arm 420A are disposed in a perpendicular relationship. In some embodiments, for example, the lateral displacement axis 524 and the extension axis 424 of the second extendible arm 420B are disposed in a perpendicular relationship.

In some embodiments, for example, the lateral displacement of the object manipulator configuration 330, relative to the base 302, includes the lateral displacement of the object manipulator 402, relative to the base 302. In some embodiments, for example, while the object manipulator 402 is grasping an object 10, the lateral displacement of the object manipulator configuration 330, relative to the base 302, includes the lateral displacement of the object 10, relative to the base 302.

In some embodiments, for example, after the object supporter 1002, such as a nest 1002 of a workstation 1000, is positioned, relative to the robot 110, the relative position of the object supporter 1002 is offset from a predetermined relative position, such that the object supporter 1002 is skewed relative to the robot 110 (e.g. the instrument nest position has nest skew). The lateral displaceability of the object manipulator configuration 330, relative to the base 302, allows for the robot 110 to adjust for the offset of the object supporter 1002 from the predetermined relative position.

In some embodiments, for example, the lower frame member 324 defines a recess 550, and the object manipulator configuration lower member 332 is disposed in the recess 550, as depicted in FIG. 3 and FIG. 28. In some embodiments, for example, the upper frame member 326 defines a recess 552, and the object manipulator configuration upper member 334 is disposed in the recess 552. In some embodiments, for example, while the object manipulator configuration 330 is displaced, relative to the base 302, the object manipulator configuration lower member 332 is laterally displaced within the recess 550, and the object manipulator configuration upper member 334 is laterally displaced within the recess 552.

In some embodiments, for example, the lateral displaceability of the object manipulator configuration 330, relative to the base 302, is such that the object manipulator configuration 330 is displaceable from a retracted configuration to a displaced configuration, wherein: in transitioning from the retracted configuration to the displaced configuration, the object manipulator configuration is displaced, relative to the base 302, in a first direction (e.g. to the left).

Figure 29:
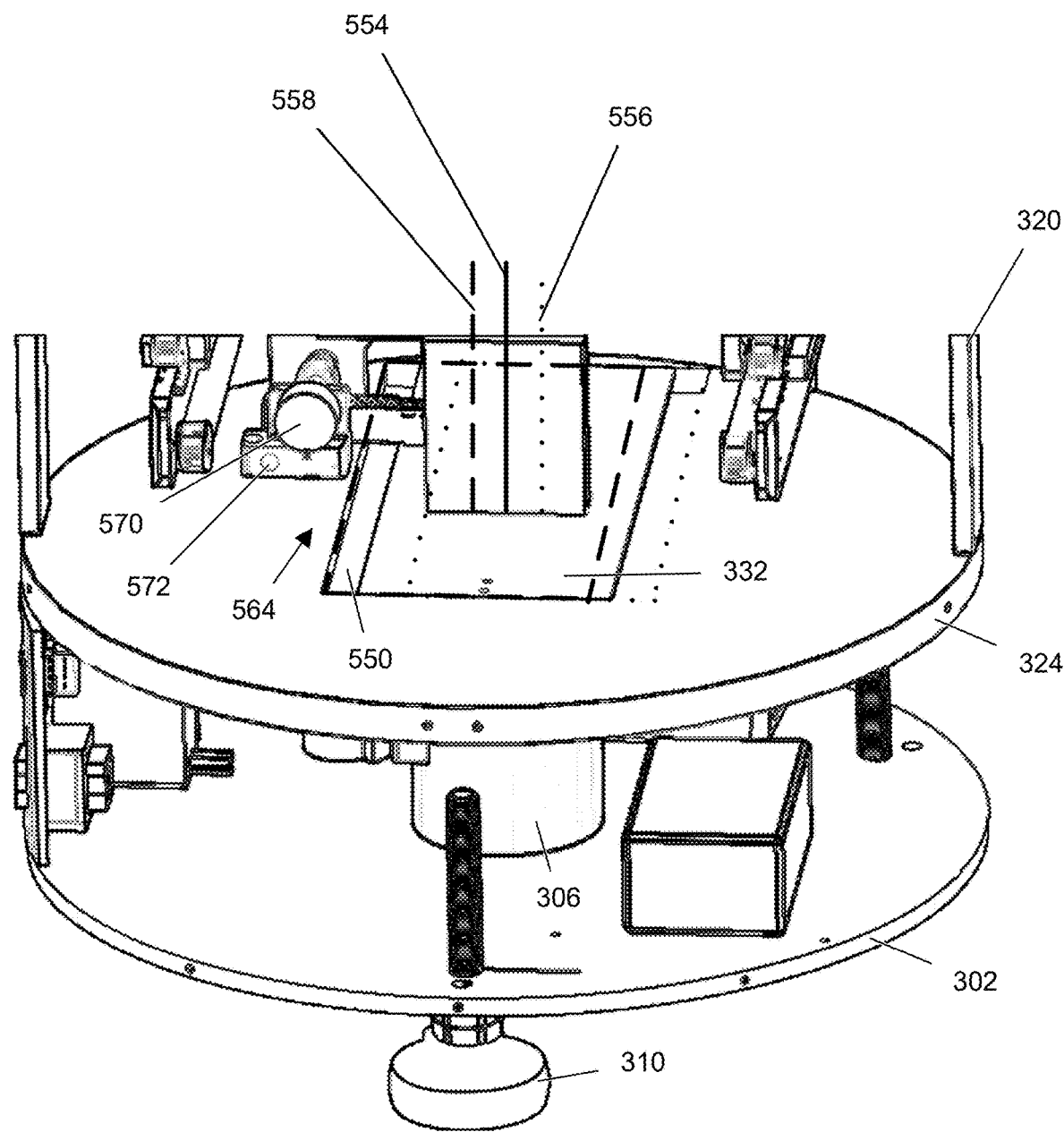
FIG. 29 is another front perspective view of the lower portion of the robot of FIG. 3.

In some embodiments, for example, as depicted in FIG. 29, while the object manipulator configuration 330 is disposed in the retracted configuration, the object manipulator 402 is displaceable, relative to the base, by the lift mechanism 340, along a first travel axis 554 for effecting the change in elevation of the object manipulator; and while the object manipulator configuration 330 is disposed in the displaced configuration, the object manipulator 402 is displaceable, relative to the base 302, by the lift mechanism 340, along a second travel axis 556, for effecting the change in elevation of the object manipulator 402, wherein the first travel axis 554 and the second travel axis 556 are disposed in an offset relationship. In some embodiments, for example, the first travel axis 554 and the second travel axis 556 are disposed in a laterally offset relationship.

In some embodiments, for example, the first travel axis 554 is parallel to a vertical axis; and the second travel axis 556 is parallel to the vertical axis.

In some embodiments, for example, as depicted in FIG. 29, the displaced configuration is a first displaced configuration; and the lateral displaceability of the object manipulator configuration 330, relative to the base 302, is such that the object manipulator configuration 330 is further displaceable from the retracted configuration to a second displaced configuration, wherein: in transitioning from the retracted configuration to the second displaced configuration, the object manipulator configuration 330 is displaced, relative to the base 302, in a second direction (e.g. to the right) that is opposite the first direction.

In some embodiments, for example, while the object manipulator configuration 330 is disposed in the retracted configuration, the object manipulator 402 is displaceable, relative to the base 302, by the lift mechanism 340, along the first travel axis 554, for effecting a change in elevation of the object manipulator 402; and while the object manipulator configuration 330 is disposed in the second displaced configuration, the object manipulator 402 is displaceable, relative to the base 302, by the lift mechanism 340, along a third travel axis 558, for effecting a change in elevation of the object manipulator 402; wherein the first travel axis 554 and the third travel axis 558 are disposed in an offset relationship. In some embodiments, for example, the first travel axis 554 and the third travel axis 558 are disposed in a laterally offset relationship.

In some embodiments, for example, the first travel axis 554 is parallel to a vertical axis; and the third travel axis 558 is parallel to the vertical axis.

FIG. 29 depicts: (i) the object manipulator configuration 330 in the retracted configuration and the first travel axis 554 in solid line, (ii) the object manipulator configuration 330 in the first displaced configuration and the second travel axis 556 in dotted line, and (iii) the object manipulator configuration 330 in the second displaced configuration and the third travel axis 558 in broken line.

In some embodiments, for example, the lateral displacement of the object manipulator configuration 330, to transition the object manipulator configuration 330 from the retracted configuration to the first displaced configuration, has a maximum value of 10 millimeters. In some embodiments, for example, the lateral displacement of the object manipulator configuration 330, to transition the object manipulator configuration 330 from the retracted configuration to the first displaced configuration, is a lateral displacement of the object manipulator configuration 330 by 3 millimeters in the first direction. In some embodiments, for example, the lateral displacement of the object manipulator configuration 330, to transition the object manipulator configuration 330 from the retracted configuration to the second displaced configuration, has a maximum value of 10 millimeters. In some embodiments, for example, the lateral displacement of the object manipulator configuration 330, to transition the object manipulator configuration 330 from the retracted configuration to the second displaced configuration, is a lateral displacement of the object manipulator configuration 330 by 3 millimeters in the second opposite direction.

In some embodiments, for example, the vertical displacement of the object manipulator 402, relative to the base 302, is independent of the lateral displacement of the object manipulator configuration 330, relative to the base 302.

In some embodiments, for example, the lateral displacement of the object manipulator configuration 330, relative to the base 302, is independent of the extension and retraction of the first and second extendible arms 420A and 420B.

In some embodiments, for example, the lateral displacement of the object manipulator configuration 330, relative to the base 302, is independent of the lateral displacement of the first and second extendible arms 420A and 420B, relative to the base 302.

As described herein, the base 302 and the robot body 320 are co-operatively configured such that the robot body 320 is rotatable, relative to the base 302. The rotatability of the robot body 320, relative to the base 302, is such that the object manipulator configuration 330 is rotatable, relative to the base 302. In this respect, in some embodiments, for example, the object manipulator configuration 330 and the base 302 are co-operatively configured such that the object manipulator configuration 330 is rotatable, relative to the base 302.

In some embodiments, for example, the rotation of the object manipulator configuration 330, relative to the base 302, is about the rotation axis 318. In some embodiments, for example, the rotation axis 318 is a linear axis.

In some embodiments, for example, the rotation axis 318 is parallel to a vertical axis.

In some embodiments, for example, the lateral displaceability of the object manipulator configuration 330, relative to the base 302, is a lateral displaceability of the object manipulator configuration 330, relative to the rotation axis 318.

In some embodiments, for example, the lateral displacement of the object manipulator configuration 330, relative to the base 302, is independent of the rotational displacement of the object manipulator configuration 330, relative to the base 302.

In some embodiments, for example, the robot body 320 includes an actuator configuration 560 to effect the lateral displacement of the object manipulator configuration 330, relative to the frame 322, and also relative to the base 302, as depicted in FIG. 25 to FIG. 29. In some embodiments, for example, the actuator configuration 560 includes a prime mover 562, for example, a motor, for example, an electric motor, that is disposed in operable communication with the object manipulator configuration 330, for example, the object manipulator configuration lower member 332. In some embodiments, for example, the prime mover 562 is mounted to the bottom frame member 324. The prime mover 562 is configured to generate a displacement force that is applicable to the object manipulator configuration 330 for laterally displacing the object manipulator configuration 330, relative to the frame 322 and also relative to the base 302. In response to application of the displacement force from the prime mover 562 to the object manipulator configuration 330, for example, to the object manipulator configuration lower member 332, the object manipulator configuration 330 is laterally displaced, relative to the base 302.

In some embodiments, for example, the prime mover 562 is configurable in a first lateral displacement drive state and a second lateral displacement drive state. In some embodiments, for example, while the prime mover 562 is disposed in the first lateral displacement drive state, the displacement force applied to the object manipulator configuration 330 has a first lateral direction, such that the object manipulator configuration 330 is laterally displaced in the first lateral direction (e.g. to the left), relative to the base 302, in response to application of the displacement force to the object manipulator configuration 330. In some embodiments, for example, while the prime mover 562 is disposed in the second lateral displacement drive state, the displacement force applied to the object manipulator configuration 330 has a second lateral direction that is opposite the first lateral direction, such that the object manipulator configuration 330 is laterally displaced in the second lateral direction (e.g. to the right), relative to the base 302, in response to application of the displacement force to the object manipulator configuration 330.

In some embodiments, for example, the prime mover 562 is disposed in data communication with the controller 202 and further disposed in electrical communication with the power supply 314, for actuation of the prime mover 562 in the first lateral displacement drive state and the second lateral displacement drive state, via control commands from the controller 202.

In some embodiments, for example, the actuator configuration 560 includes a transmission configuration 564 to effect the operable communication between the prime mover 562 and the object manipulator configuration 330, in particular, between the prime mover 562 and the object manipulator configuration lower member 332. In some embodiments, for example, the transmission configuration 564 includes a gear 566 and a linear gear 568. The prime mover 562 is configured to drive rotation of the gear 566. The gear 566 and the linear gear 568 are co-operatively configured such that rotation of the gear 566 effectuates lateral displacement of the linear gear 568, relative to the base 302. In some embodiments, for example, the gear 566 and the linear gear 568 are disposed in a rack and pinion configuration. The linear gear 568 is further connected to the object manipulator configuration lower member 332, such that the object manipulator configuration lower member 332 is displaced laterally, relative to the base 302, while the linear gear 568 is displaced laterally, relative to the base 302.

As depicted in FIG. 25 to FIG. 29, the prime mover 562 is configured to drive the gear 566, which is connected to the linear gear 568, which is connected to the object manipulator configuration lower member 332, such that driving of the gear 566 by the prime mover 562 effectuates lateral displacement of the object manipulator configuration lower member 332, and therefore, the object manipulator configuration 330, relative to the frame 322, and also relative to the base 302, and such that the displacement force generated by the prime mover 562 is applied to object manipulator configuration lower member 332 via the gear 566 and the linear gear 568. In this respect, the displacement force generated by the prime mover 562 is an object manipulator configuration lateral displacement force. In response to application of the object manipulator configuration lateral displacement force from the prime mover 562 to the object manipulator configuration 330, the object manipulator configuration 330 is laterally displaced, relative to the frame 322, and also relative to the base 302.

In some embodiments, for example, the actuator configuration 560 includes an encoder 570. The encoder 570 is coupled to the gear 566, such that the encoder 570 is configured to detect the rotation of the gear 566. In some embodiments, for example, the encoder 570 is disposed in data communication with the controller 202 and further disposed in electrical communication with the power supply 314. Based on the rotation of the gear 566, the lateral displacement of the object manipulator configuration 330, relative to the base 302, can be determined by the controller 202.

Figure 25:
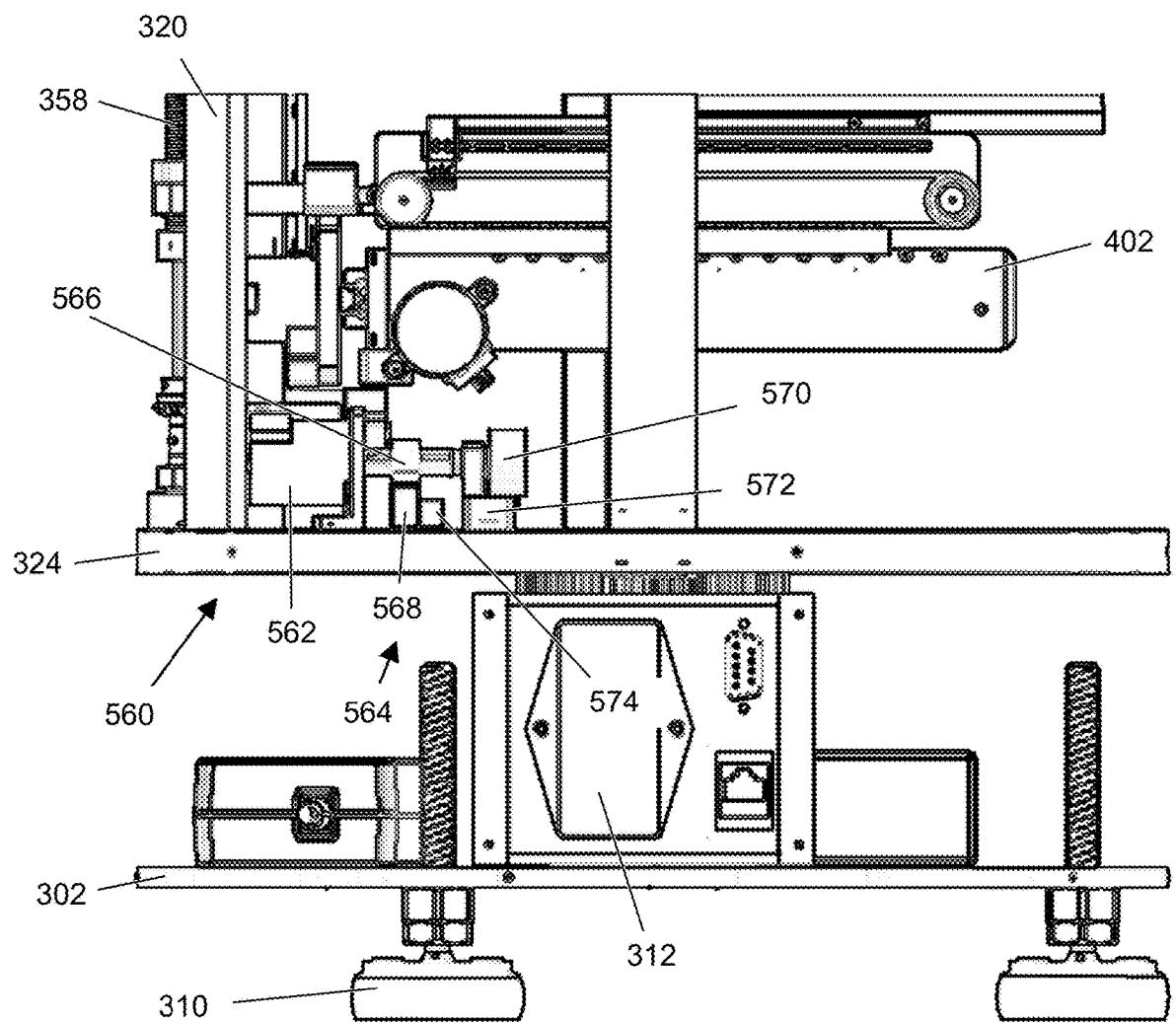
FIG. 25 is a side view of the lower portion of the robot of FIG. 3.
Figure 26:
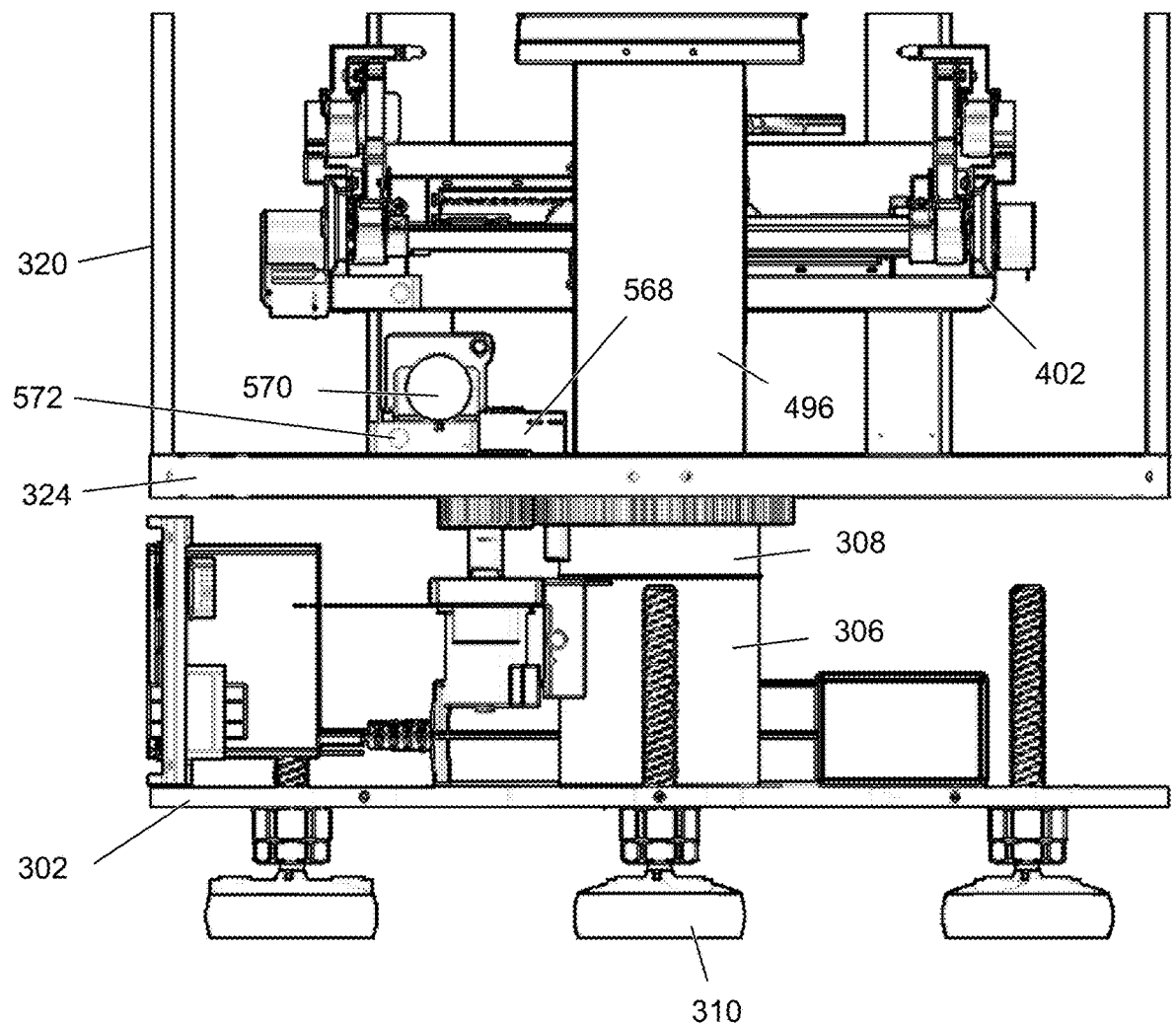
FIG. 26 is another side view of the lower portion of the robot of FIG. 3.
Figure 27:
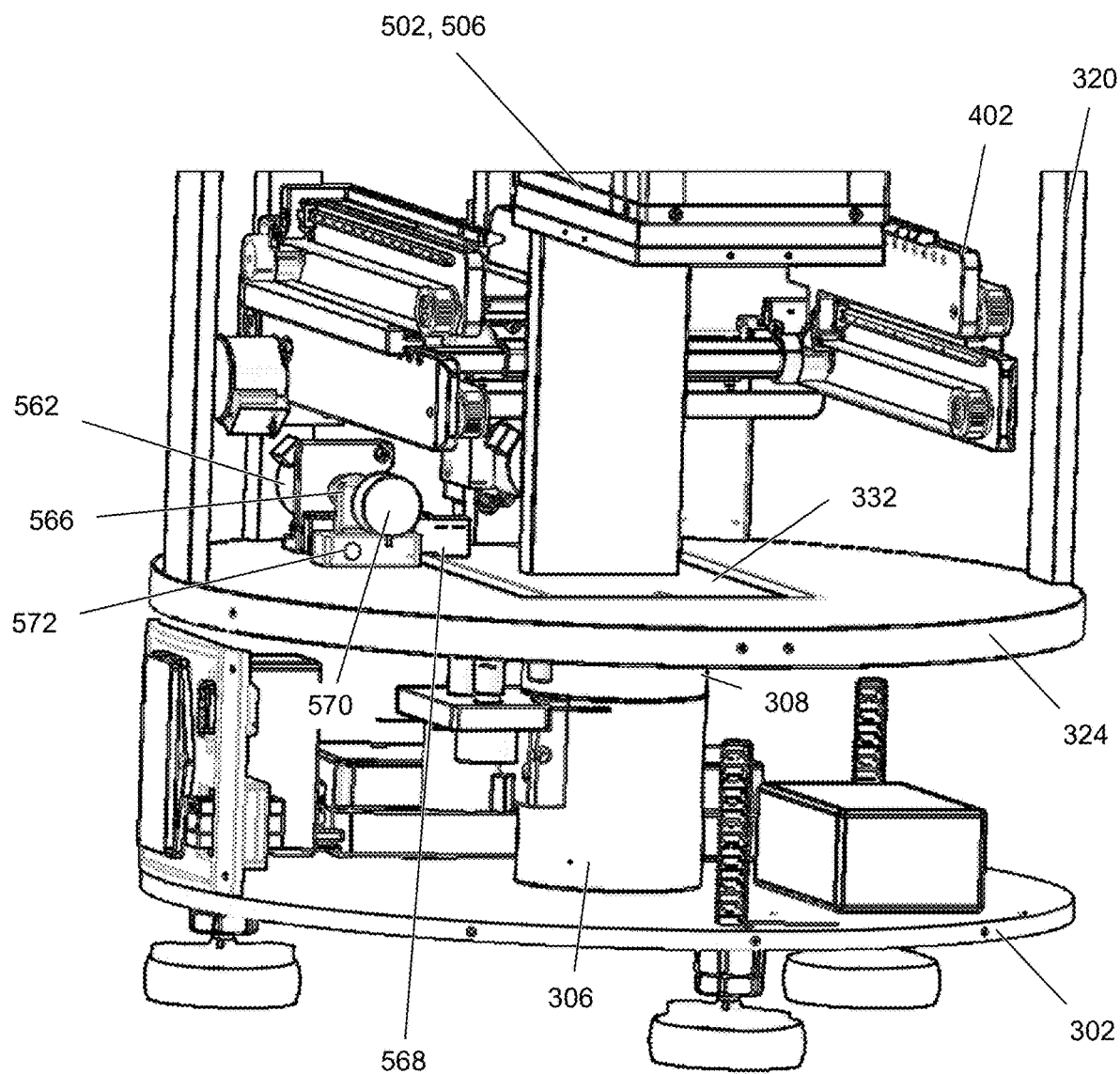
FIG. 27 is a front perspective view of the lower portion of the robot of FIG. 3.

In some embodiments, for example, the robot body 320 includes a sensor 572 and a sensor actuator 574, as depicted in FIG. 25. In some embodiments, for example, the sensor 572 is a proximity sensor, for example a Littelfuse reed switch, and the sensor actuator 574 is a magnet. In some embodiments, for example, the sensor 572 is mounted to the bottom frame member 324, and the sensor actuator 574 is mounted to the linear gear 568, such that the sensor actuator 574 is laterally displaced, relative to the base 302, while the linear gear 568 is laterally displaced, relative to the base 302. In some embodiments, for example, the sensor 572 is disposed in data communication with the controller 202 and further disposed in electrical communication with the power supply 314.

While the sensor 572 and the sensor actuator 574 are disposed in a longitudinal alignment, the sensor 572 and the sensor actuator 574 are disposed in a proximate relationship, such that the sensor actuator 574 is detected by the sensor 572. While the sensor actuator 574 is detected by the sensor 572, the sensor 572 is configured to send data to the controller 202, representative of the sensor 572 and the sensor actuator 574 being disposed in the proximate relationship. In this respect, the sensor 572 and the sensor actuator 574 are co-operatively configured to define an initial lateral position of the object manipulator configuration 330, relative to the base 302. In some embodiments, for example, the object manipulator configuration 330 is disposed in the initial lateral position, relative to the base 302, while the object manipulator configuration 330 is disposed in the retracted configuration, as depicted in FIG. 29 in solid line. In some embodiments, for example, the object manipulator configuration 330 is disposed in the initial lateral position, relative to the base 302, while the object manipulator configuration 330 is disposed in the middle of the recess 550 defined by the lower frame member 324 and further disposed in the middle of the recess 552 defined by the upper frame member 334. In response to processing of the data from the sensor 572 representative of the sensor 572 and the sensor actuator 574 being disposed in the proximate relationship, the controller 202 determines that the object manipulator configuration 330 is disposed, relative to the base 302, in the initial lateral position.

In some embodiments, for example, the robot body 320 includes one or more guide rails that are disposed in the recess 550, and one or more guide rails that are disposed in the recess 552, to guide the lateral displacement of the object manipulator configuration 330, relative to the base 302.

In operation, in response to start up of the robot 110, the robot 110 is disposed in an initial "home position" or "0" position, wherein: (i) the robot body 320 is disposed in the initial rotational or angular position, relative to the base 302, (ii) the object manipulator 402 is disposed in the initial vertical position, relative to the base 302, (iii) the extendible arm configuration 408 (e.g. the first and second extendible arms 420A and 420B) is disposed in the initial lateral position, relative to the base 302, (iv) the extendible arm configuration 408 (e.g. the first and second extendible arms 420A and 420B) is disposed in the initial longitudinal position, relative to the base 302, and (v) the object manipulator configuration 330 is disposed in the initial lateral position, relative to the base 302. While the robot 110 is disposed in the initial home position, the initial position of the end effector 410 can be determined by the controller 202. While the end effector 410 (e.g. the first and second end effector counterparts 412 and 414) is displaced (e.g. rotationally, vertically, longitudinally, laterally, or a combination thereof), relative to the base 302, the controller 202 can determine the position of the end effector 410, based on the initial position of the end effector 410, and the data from the encoders of the robot 110, which is processed by the controller 202 to determine the displacement of the end effector 410.

Figure 30:
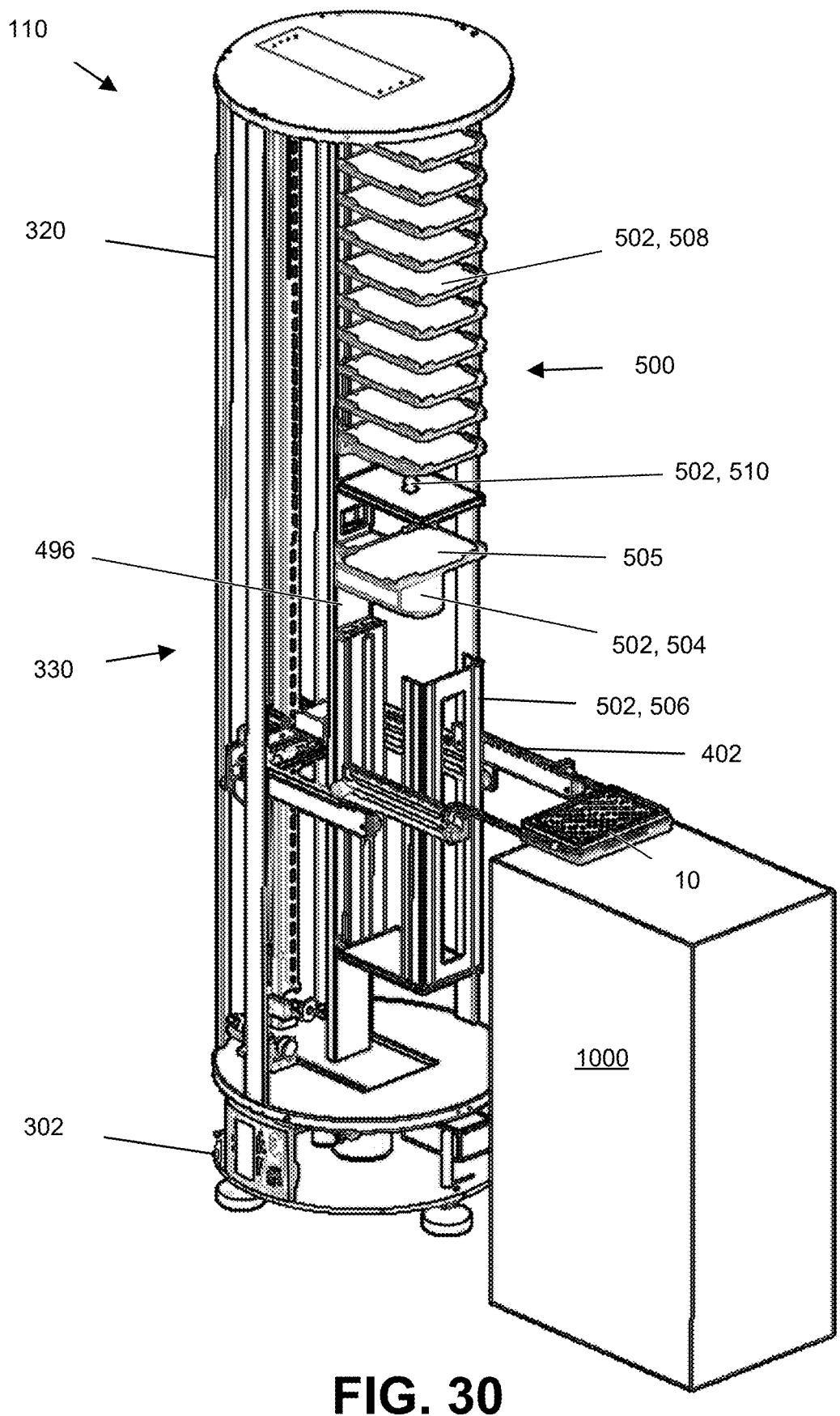
FIG. 30 is a front perspective view of the robot of FIG. 3, grasping a microplate configuration that is disposed in a plate nest of a workstation.

In some embodiments, for example, wherein the object 10 is the microplate configuration 10 and the robot 110 is configured to interact with the microplate configuration 10 (e.g. the object manipulator 402 is configured to grasp the microplate configuration 10, and the accessory configuration 500 is the microplate accessory configuration 500 and the accessories 502 are microplate accessories 502), as depicted in FIG. 30 to FIG. 38, to dispose the microplate configuration 10 that is disposed in a nest 1002 of a workstation 1000 to the re-grip nest 505 of the plate re-grip configuration 504, while the end effector 410 is disposed in the grasping-ineffective configuration (e.g. while the extendible arm configuration 408 (e.g. the first and second extendible arms 420A and 420B) is disposed in the initial lateral position, relative to the base 302), the end effector 410 is displaced, relative to the microplate configuration 10, such that the the end effector 410 and the microplate configuration 10 become disposed in the grasping-effectible relationship. At this point, the end effector 410 is transitioned from the grasping-ineffective configuration to the grasping-effective configuration, such that the microplate configuration 10 is grasped by the object manipulator 402 via the end effector 410, as depicted in FIG. 30.

Figure 31:
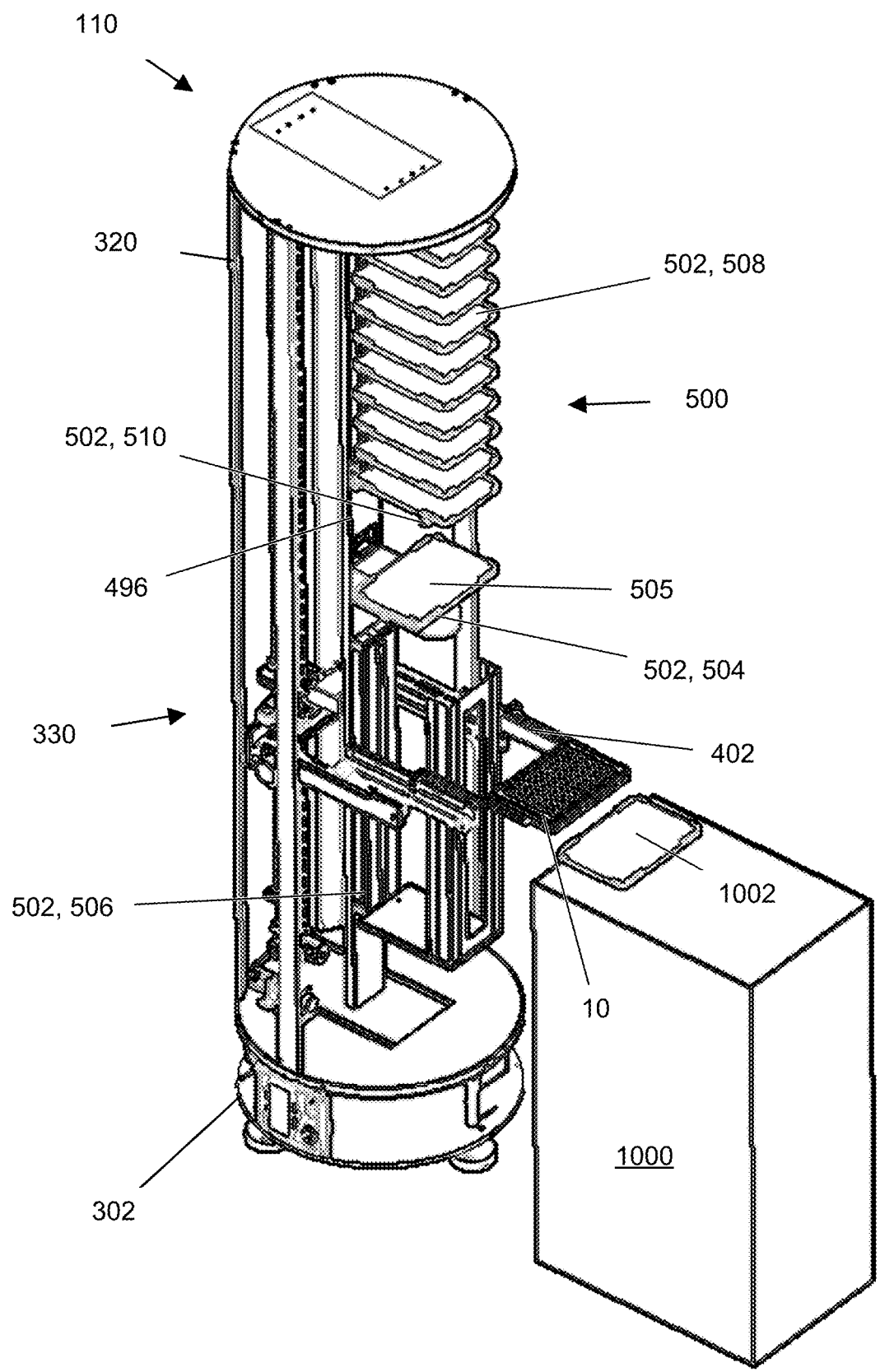
FIG. 31 is a front perspective view of the robot of FIG. 3, grasping a microplate configuration, the object manipulator and the microplate configuration disposed in a displacement-ready relationship.
Figure 32:
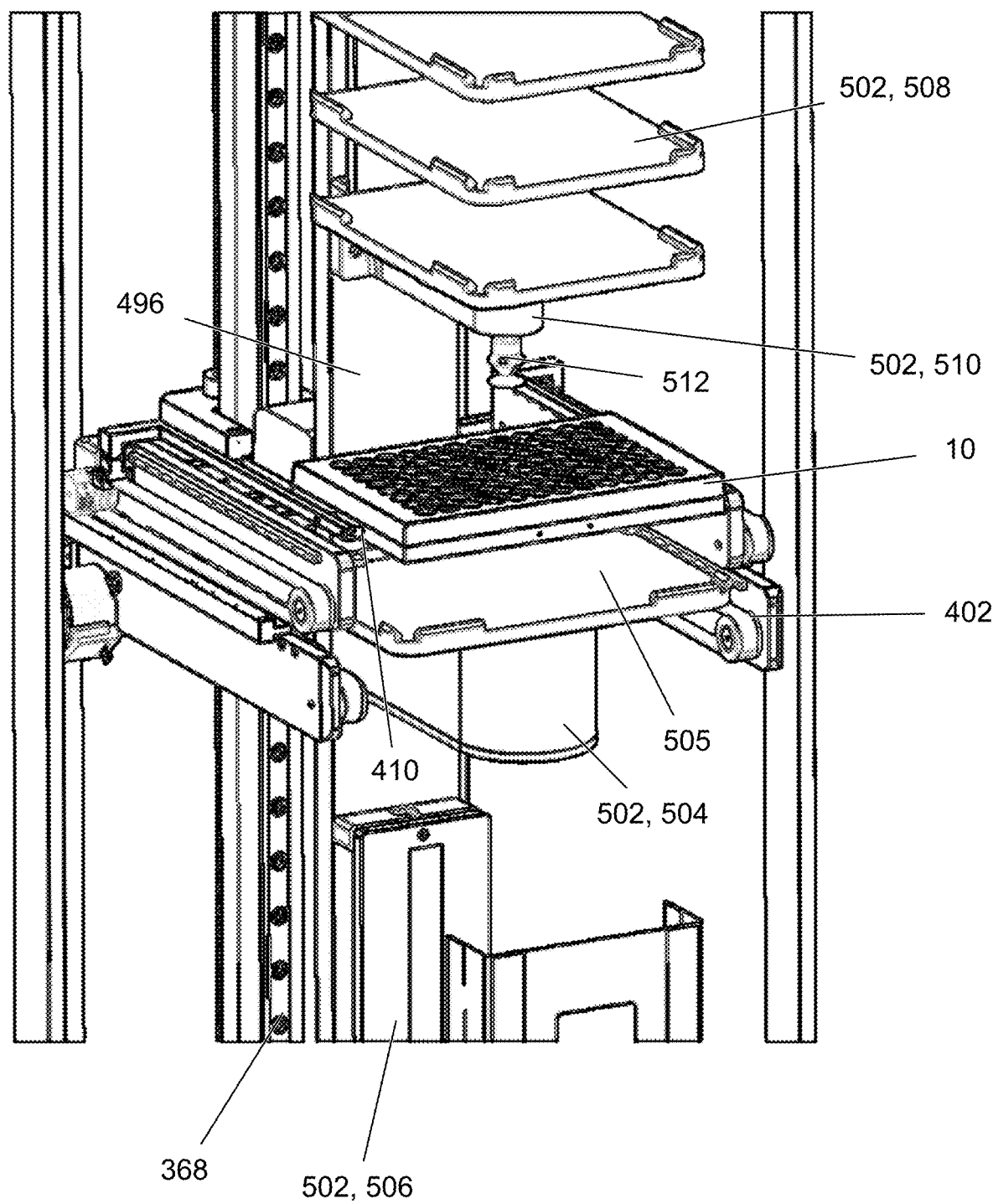
FIG. 32 is a front perspective view of the robot of FIG. 3, wherein the microplate configuration is grasped by the object manipulator, and disposed above a re-grip plate nest.

At this point, the object manipulator 402 is vertically displaced in an upward direction to lift the microplate configuration 10 out of the nest 1002, such that the disposition of the microplate configuration 10 in the nest 1002 is defeated, as depicted in FIG. 31. At this point, the object manipulator 402 and the microplate configuration 10 are disposed in the displacement-ready relationship.

As depicted, the microplate configuration 10 is disposed in the landscape configuration. Accordingly, the re-grip nest 505 is disposed in the landscape configuration. In some embodiments, for example, wherein the microplate configuration 10 is disposed in the portrait configuration, the re-grip nest 505 is disposed in the portrait configuration.

Figure 33:
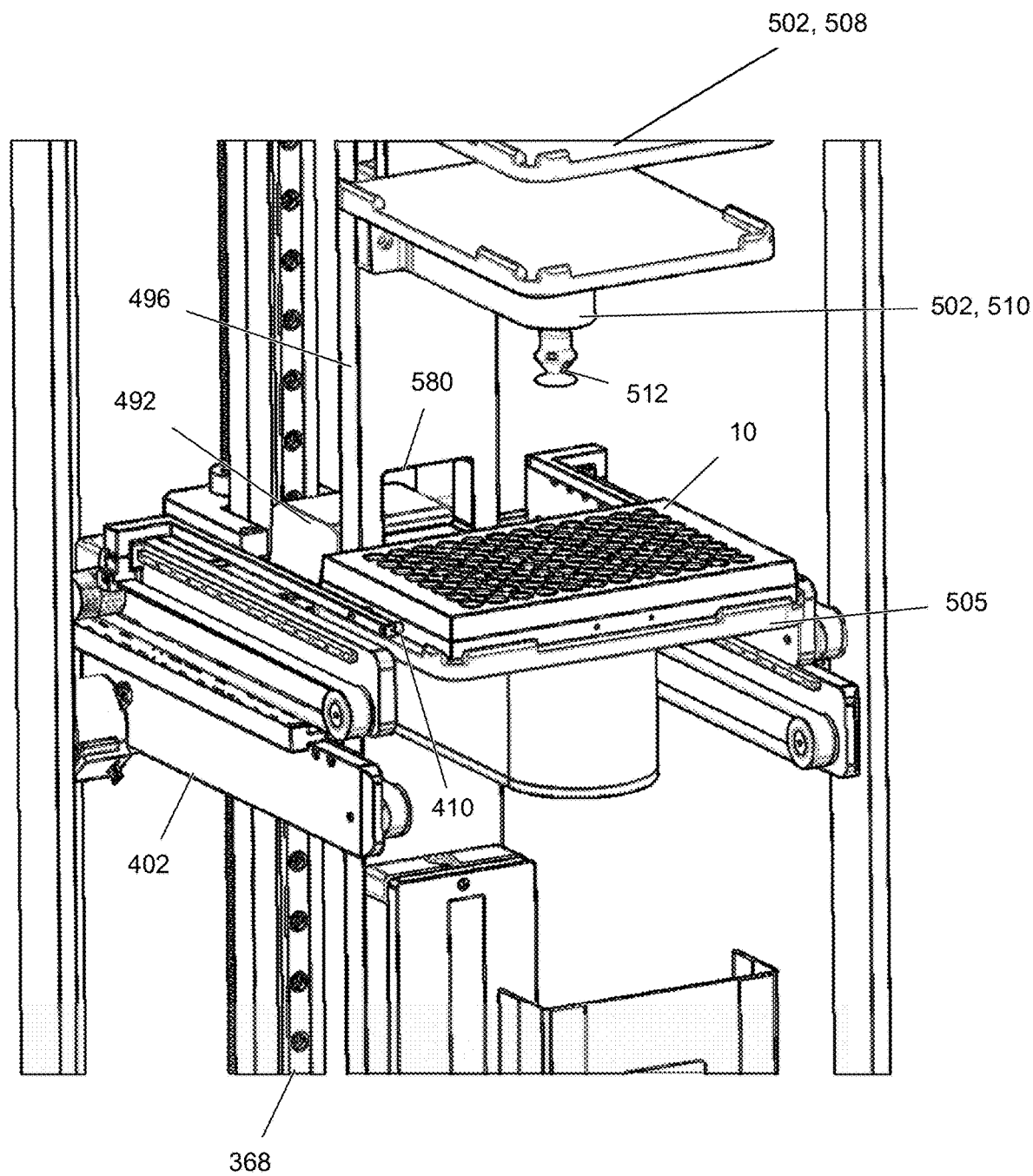
FIG. 33 is a front perspective view of the robot of FIG. 3, wherein the microplate configuration is grasped by the object manipulator, and disposed in the re-grip plate nest.

The object manipulator 402 and the microplate configuration 10 are displaced such that the object manipulator 402 and the microplate configuration 10 are disposed above the re-grip nest 505. At this point, the first and second extendible arms 420A and 420B are retracted, such that the microplate configuration 10 and the re-grip nest 505 are disposed in the interaction-effective alignment (e.g. the microplate configuration 10 is disposed above the re-grip nest 505). Then, the object manipulator 402 is vertically displaced in a downward direction to dispose the microplate configuration 10 in the re-grip nest 505, as depicted in FIG. 33. At this point, the first and second extendible arms 420A and 420B are laterally displaced away from the microplate configuration 10 to defeat the grasping of the microplate configuration 10 by the object manipulator 402. In some embodiments, for example, it is desirable to laterally displace the first and second extendible arms 420A and 420B away from the microplate configuration 10, after the microplate configuration 10 is disposed in the re-grip nest 505, such that the microplate configuration 10 is rotatable by the re-grip nest 505. In some embodiments, for example, after the microplate configuration 10 is disposed in the re-grip nest 505, the first and second extendible arms 420A and 420B are laterally displaced away from the microplate configuration 10 such that there is an absence of opposition of rotation of the microplate configuration 10, via the re-grip nest 505, by the first and second extendible arms 420A and 420B.

In some embodiments, for example, as depicted in FIG. 33, the accessory mounting member 496 defines a window 580. In some embodiments, for example, while the microplate configuration 10 is disposed in the re-grip nest 505, a barcode of the microplate configuration 10 is disposed in alignment with the window 580.

In some embodiments, for example, after the microplate configuration 10 is disposed in the re-grip nest 505 by the object manipulator 402, the barcode reader 492 is disposed in alignment with the window 580. At this point, the barcode of the microplate configuration 10 is scanned by the barcode reader 492, and the data is sent to the controller 202 to be processed.

Figure 34:
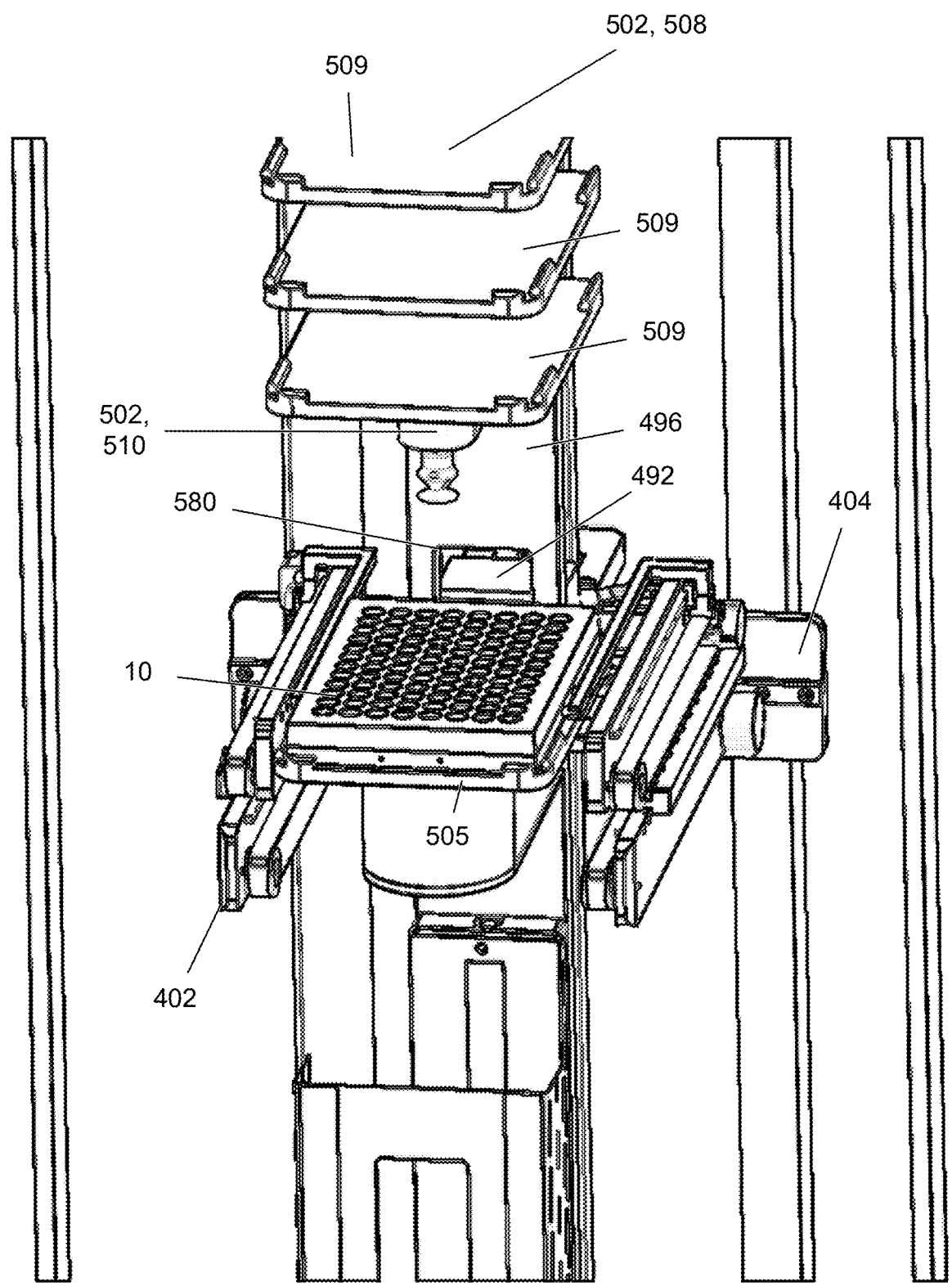
FIG. 34 is a front perspective view of the robot of FIG. 3, wherein the microplate configuration is disposed in the re-grip plate nest, and in a portrait configuration.

In some embodiments, for example, after the microplate configuration 10 is disposed the re-grip nest 505, the microplate configuration 10 is rotated by the re-grip nest 505 to effectuate the alignment of the barcode of the microplate configuration 10 with the window 580, such that the barcode can be detected by the barcode reader 492. As depicted in FIG. 34, the microplate configuration 10 is rotated by the re-grip nest 505 to a portrait configuration for detecting a barcode disposed on the short side of the microplate configuration 10.

In some embodiments, for example, after the microplate configuration 10 is disposed the re-grip nest 505, the object manipulator 402 is vertically displaced, relative to the base 302, to effectuate alignment between the barcode reader 492 and the barcode of the microplate configuration 10, for detecting the barcode. In some embodiments, for example, such vertical displacement of the object manipulator 402 to align the barcode reader 492 and the barcode of the microplate configuration 10 accounts for variable vertical placement of the barcode on the microplate configuration 10 (e.g. different vertical placement of barcode by different microplate configuration manufacturers, misplacement of barcode due to human or machine error, etc.)

In some embodiments, for example, a microplate configuration 10 that is disposed in the sleeve 506 or disposed in a plate nest 509 of the plate hotel 508 can be retrieved and disposed in the re-grip nest 505 by the object manipulator 402 for the barcode of the microplate configuration 10 to be scanned, in a manner similar to the manner by which a microplate configuration 10 that is disposed in the plate nest 1002 of the workstation 1000 is retrieved and disposed in the re-grip nest 505 by the object manipulator 402.

In some embodiments, for example, after the barcode is detected by the barcode reader 492, the microplate configuration 10 can be disposed in a nest 1002 of a workstation 1000. In some embodiments, for example, the nest 1002 can be the same nest 1002 from which the microplate configuration 10 was retrieved. In some embodiments, for example, the nest 1002 can be a different nest 1002 (e.g. a nest 1002 of a different workstation 1000) from which the microplate configuration 10 was retrieved.

In some embodiments, for example, after the barcode is detected by the barcode reader 492, the microplate configuration 10 is grasped by the end effector 410, and then the object manipulator 402 is vertically displaced to lift the microplate configuration 10 off the re-grip nest 505, such that the disposition of the object manipulator 10 in the re-grip nest 505 is defeated. Then, the first and second extendible arms 420A and 420B are extended, such that the object manipulator 402 and the microplate configuration 10 are disposed in a displacement-ready relationship. At this point, the microplate configuration 10 is displaced by the robot 110 to dispose the microplate configuration 10 in the nest 1002.

In some embodiments, for example, based on the configuration of the nest 1002 (e.g. portrait or landscape), the microplate configuration 10 is rotated to have a corresponding configuration (e.g. portrait or landscape), before the microplate configuration 10 is grasped by the object manipulator 402.

Figure 35:
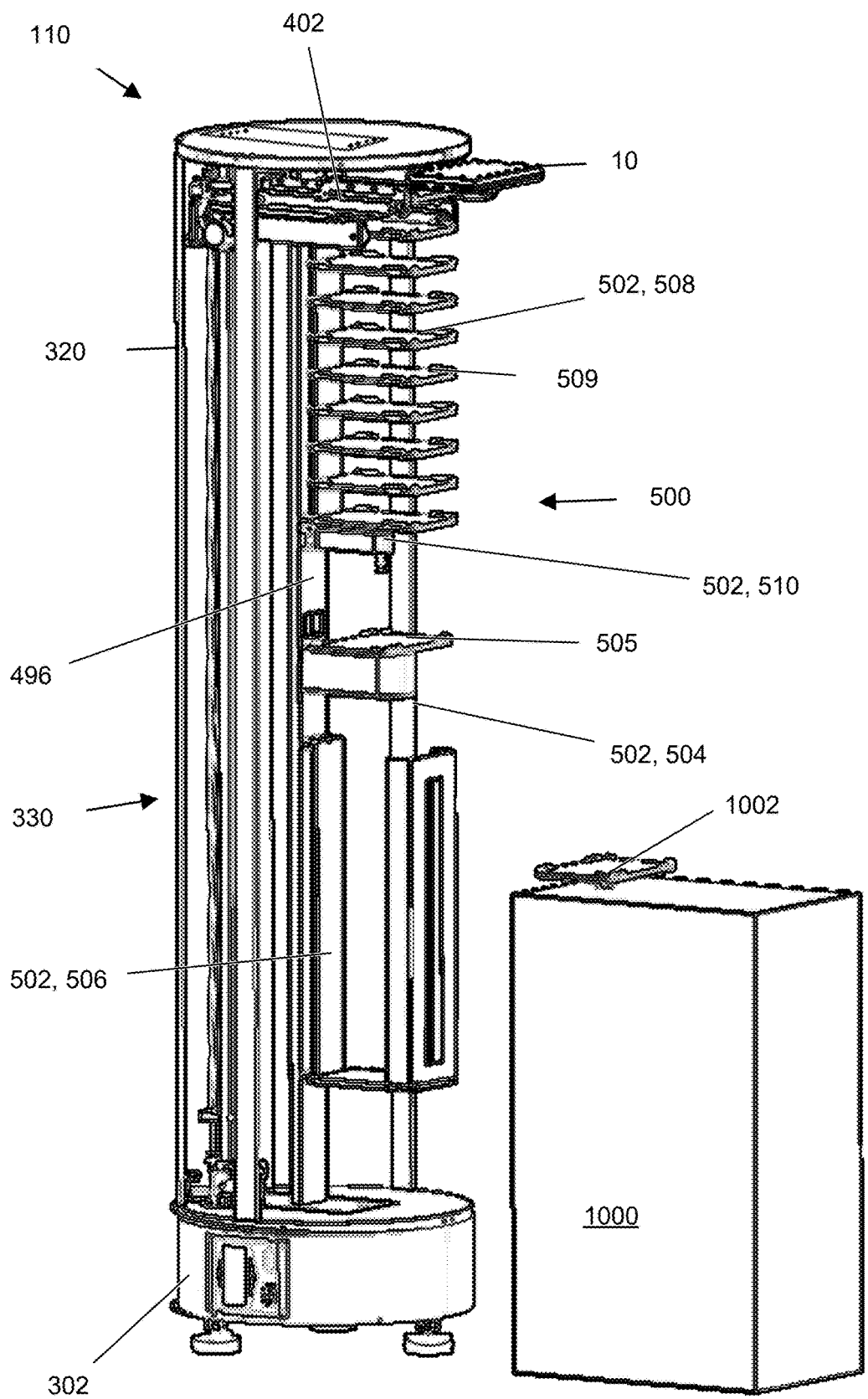
FIG. 35 is a front perspective view of the robot of FIG. 3, wherein the microplate configuration is grasped by the object manipulator, and the object manipulator is disposed in the uppermost vertical position.
Figure 36:
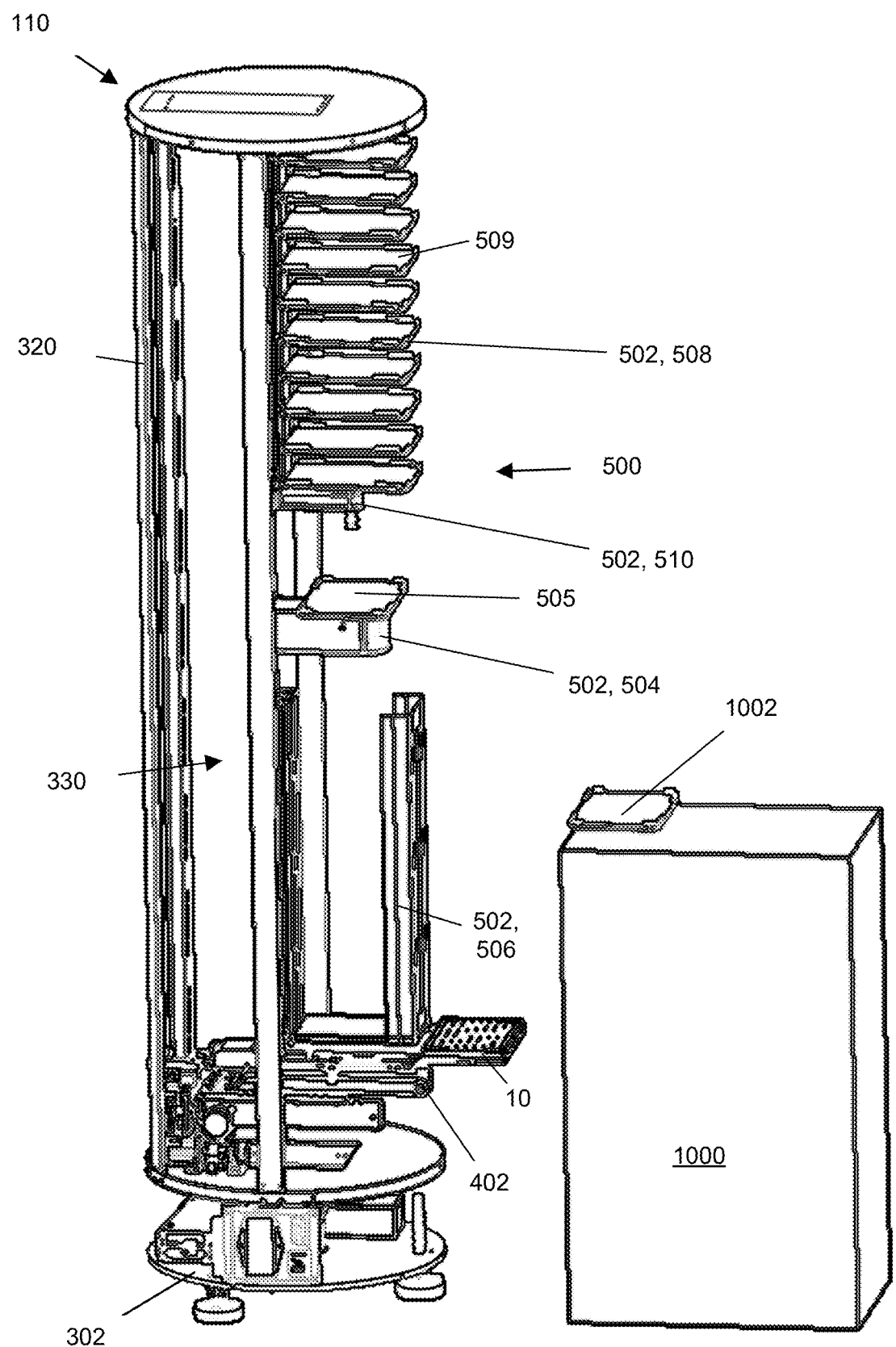
FIG. 36 is a front perspective view of the robot of FIG. 3, wherein the microplate configuration is grasped by the object manipulator, and the object manipulator is disposed in the lowermost vertical position.

In some embodiments, for example, after the barcode is detected by the barcode reader 492, the microplate configuration 10 is grasped by the end effector 410, and then the object manipulator 402 is vertically displaced to lift the microplate configuration 10 off the re-grip nest 505, such that the disposition of the object manipulator 10 in the re-grip nest 505 is defeated. Then, the first and second extendible arms 420A and 420B are extended, such that the object manipulator 402 and the microplate configuration 10 are disposed in the displacement-ready relationship. While the object manipulator 402 and the microplate configuration 10 are disposed in the displacement-ready relationship, the microplate configuration 10 can be vertically displaced in an upward or downward direction, as depicted in FIG. 35 and FIG. 36, for positioning the object manipulator 402 and the microplate configuration 10, relative to an accessory 502 of the accessory configuration 500, for effectuating an interaction between the microplate configuration 10 and the accessory 502.

In some embodiments, for example, based on the configuration of the accessory 502 (e.g. portrait or landscape), the microplate configuration 10 is rotated to have a corresponding configuration (e.g. portrait or landscape), before the microplate configuration 10 is grasped by the object manipulator 402.

In some embodiments, for example, after the barcode is detected by the barcode reader 492, and after the object manipulator 402 and the microplate configuration 10 are disposed in the displacement-ready relationship, the object manipulator 402 and the microplate configuration 10 are displaced such that the object manipulator 402 and the microplate configuration 10 are disposed above a plate nest 509 of the plate hotel 508. At this point, the first and second extendible arms 420A and 420B are retracted, such that the microplate configuration 10 and the plate nest 509 are disposed in the interaction-effective alignment (e.g. the microplate configuration 10 is disposed above the plate nest 509). Then, the object manipulator 402 is vertically displaced in a downward direction to dispose the microplate configuration 10 in the plate nest 509. At this point, the first and second extendible arms 420A and 420B are laterally displaced away from the microplate configuration 10 to defeat the grasping of the microplate configuration 10 by the object manipulator 402. Then, the same microplate configuration 10 or a different microplate configuration 10 can be grasped and displaced by the robot 110.

In some embodiments, for example, after the barcode is detected by the barcode reader 492, and after the object manipulator 402 and the microplate configuration 10 are disposed in the displacement-ready relationship, the object manipulator 402 and the microplate configuration 10 are displaced such that the object manipulator 402 and the microplate configuration 10 are disposed above the plate sleeve 506. At this point, the first and second extendible arms 420A and 420B are retracted, such that the microplate configuration 10 and the plate sleeve 506 are disposed in the interaction-effective alignment (e.g. the microplate configuration 10 is disposed above the plate sleeve 506). Then, the object manipulator 402 is vertically displaced in a downward direction to dispose the microplate configuration 10 in the plate sleeve 506. At this point, the first and second extendible arms 420A and 420B are laterally displaced away from the microplate configuration 10 to defeat the grasping of the microplate configuration 10 by the object manipulator 402. Then, the same microplate configuration 10 or a different microplate configuration 10 can be grasped and displaced by the robot 110.

Figure 37:
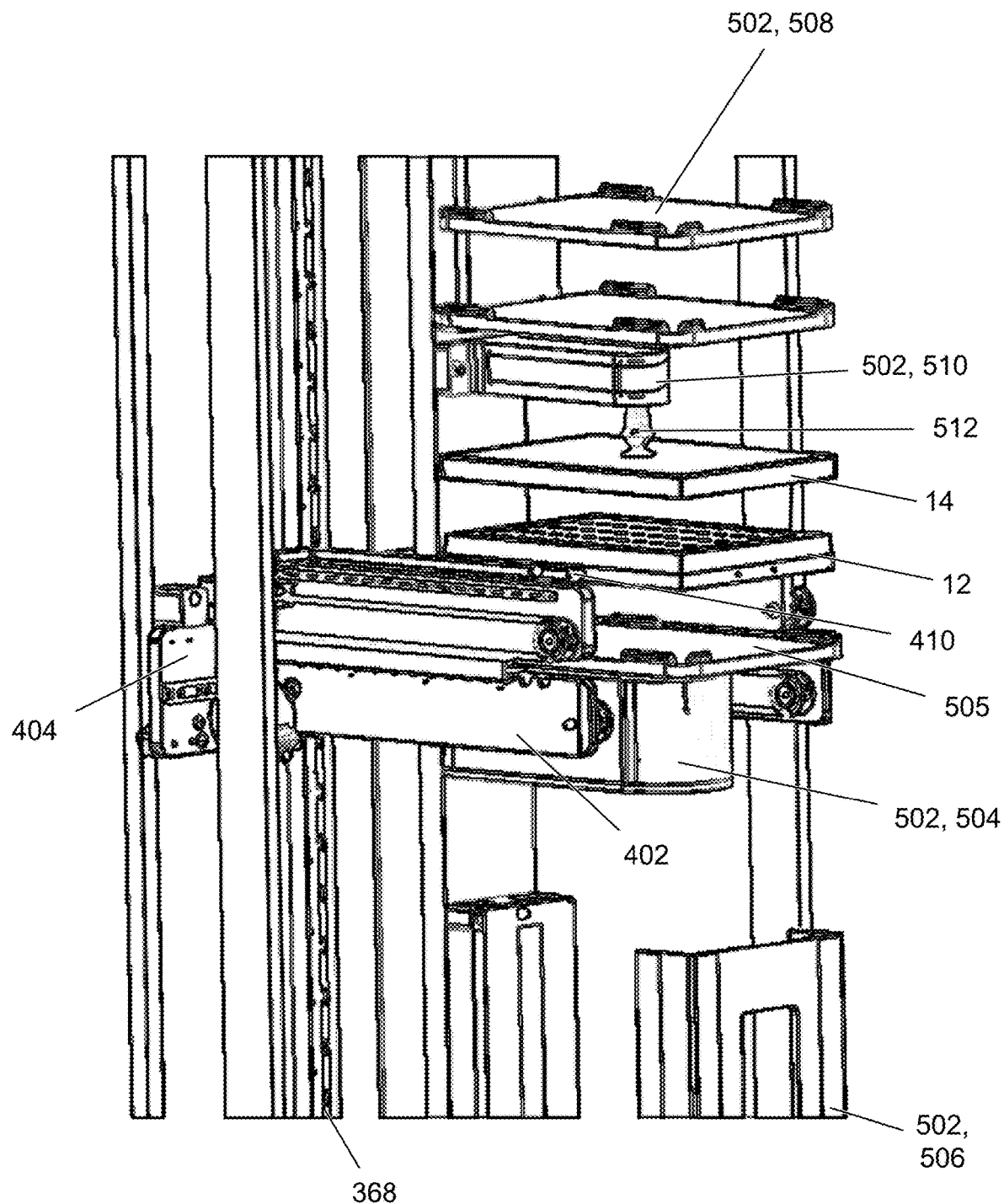
FIG. 37 is a front perspective view of the robot of FIG. 3, wherein the microplate of the microplate configuration is grasped by the object manipulator, and the lid of the microplate configuration is removed from the microplate.
Figure 38:
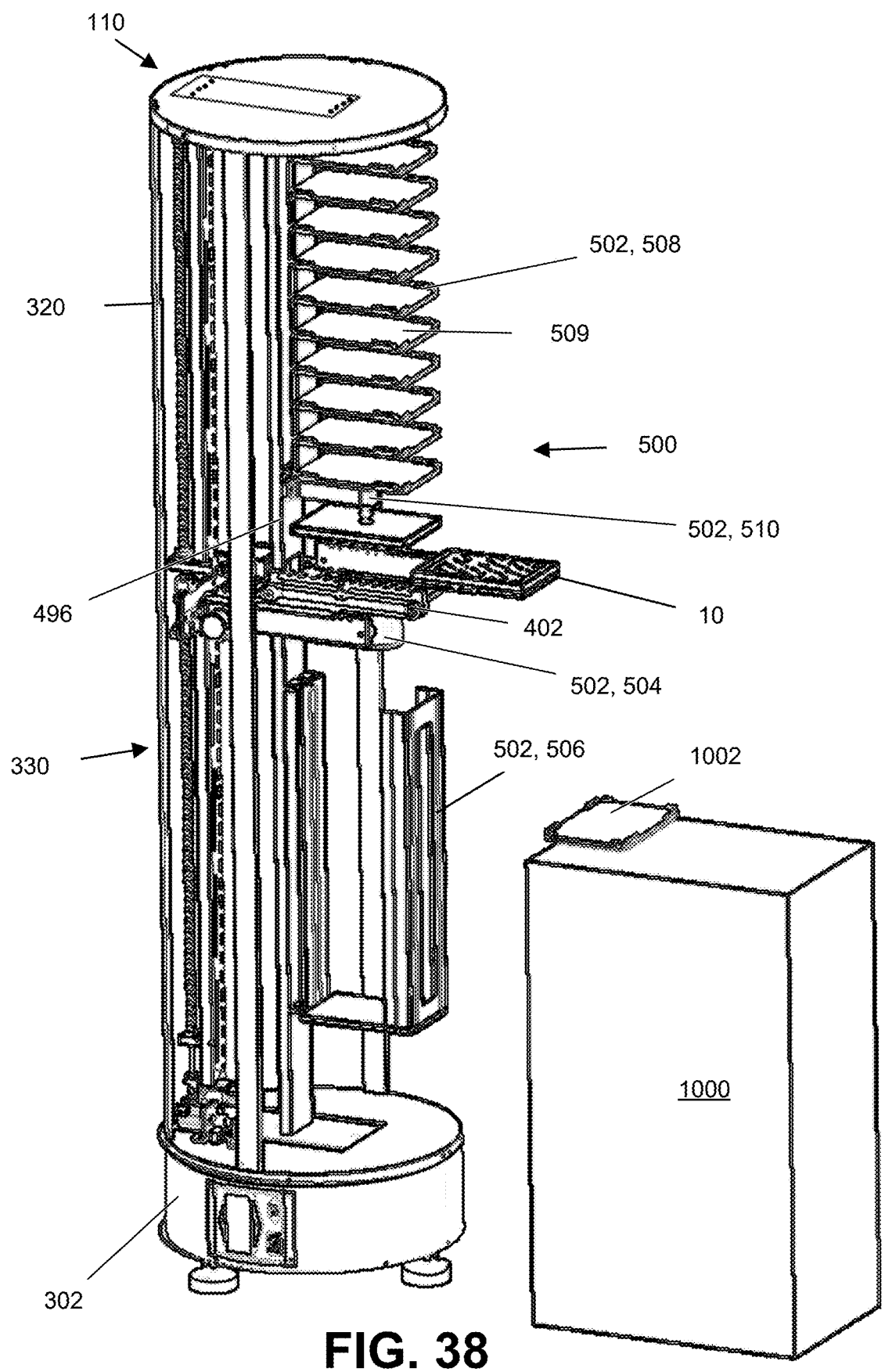
FIG. 38 is a front perspective view of the robot of FIG. 3, wherein the microplate is grasped by the object manipulator, and the object manipulator and microplate are disposed in a displacement-ready relationship.

In some embodiments, for example, after the barcode is detected by the barcode reader 492, and after the object manipulator 402 and the microplate configuration 10 are disposed in the displacement-ready relationship, wherein the object manipulator 402 is grasping the microplate 12, the object manipulator 402 and the microplate configuration 10 are displaced such that the object manipulator 402 and the microplate configuration 10 are disposed below the suction cup 512 of the de-lidder 510. At this point, the first and second extendible arms 420A and 420B are retracted, such that the microplate configuration 10 and the suction cup 512 are disposed in the interaction-effective alignment (e.g. the microplate configuration 10 is disposed below the suction cup 512). Then, the object manipulator 402 is vertically displaced in an upward direction to dispose the microplate configuration 10 and the suction cup 512 in contact engagement. At this point, the vacuum pump 514 is actuated by the controller 202, such that the lid 14 is being suctioned by the suction cup 512. At this point, while the microplate 12 is being grasped by the object manipulator 402, the object manipulator 402 is vertically displaced in a downward direction, with effect that the microplate 12 is vertically displaced in a downward direction, such that the lid 14 is removed from the microplate 12, as depicted in FIG. 37. At this point, in some embodiments, for example, the object manipulator 402 and microplate 12 is disposed in the displacement-ready relationship, as depicted in FIG. 38, and the microplate 12 is displaced by the robot 110, for example, to dispose the microplate 12 in a nest 1002 of a workstation 1000, or to effectuate an interaction with the microplate 12 and an accessory 502 of the microplate accessory configuration 500.

After the microplate 12 is released by the object manipulator 402, the object manipulator 402 can grasp the lid 14 to displace the lid 14 for effectuating an interaction between the lid 14 and a nest 1004 or an accessory 502 (e.g. dispose the lid 14 in a nest 509 of the plate hotel 508). If a lid 14 is needed, the lid 14 can be retrieved from the nest 509.

In some embodiments, for example, while the end effector 410 is grasping the lid 14, the lid 14 can be removed from the microplate 12, for example, while the microplate configuration 10 is disposed in the re-grip nest 505.

In some embodiments, for example, wherein the de-lidder 510 is disposed directly above the re-grip nest 505, while the microplate configuration 10 is disposed in the re-grip nest 505, the microplate configuration 10 and the suction cup 512 are disposed in the interaction-effective alignment (e.g. the microplate configuration 10 is disposed below the suction cup 512). In such embodiments, for example, after the barcode is detected by the barcode reader 492, the microplate configuration 10 is grasped by the object manipulator 402, and vertically displaced in an upward direction, to dispose the microplate configuration 10 and the suction cup 512 in contact engagement, for removing the lid 14 from the microplate 12.

In some embodiments, for example, the robot 110 can be installed on the ground of the site 102, which reserves lab bench space. The height of the robot 110 allows for floor-based mounting with the reach of the robot 110 allowing for interaction with a workstation 1000 that is disposed on a lab bench.

Figure 39:
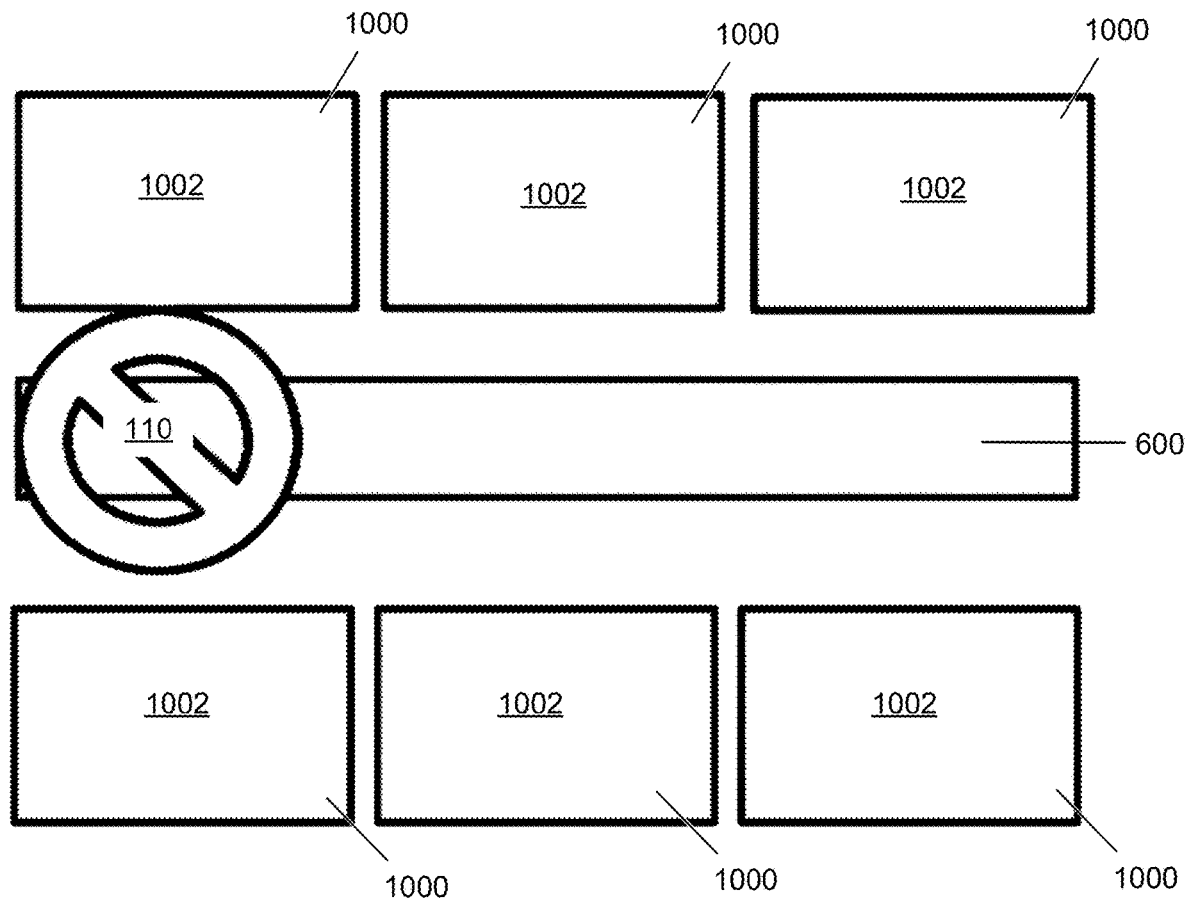
FIG. 39 is a schematic of the robot of FIG. 3 and a plurality of workstations in a linear system.

In some embodiments, for example, the robot 110 can be installed on a track 600, as depicted in FIG. 39, such that the robot 110 can reach a linear array of workstations 1000, as part of a linear system.

Figure 40:
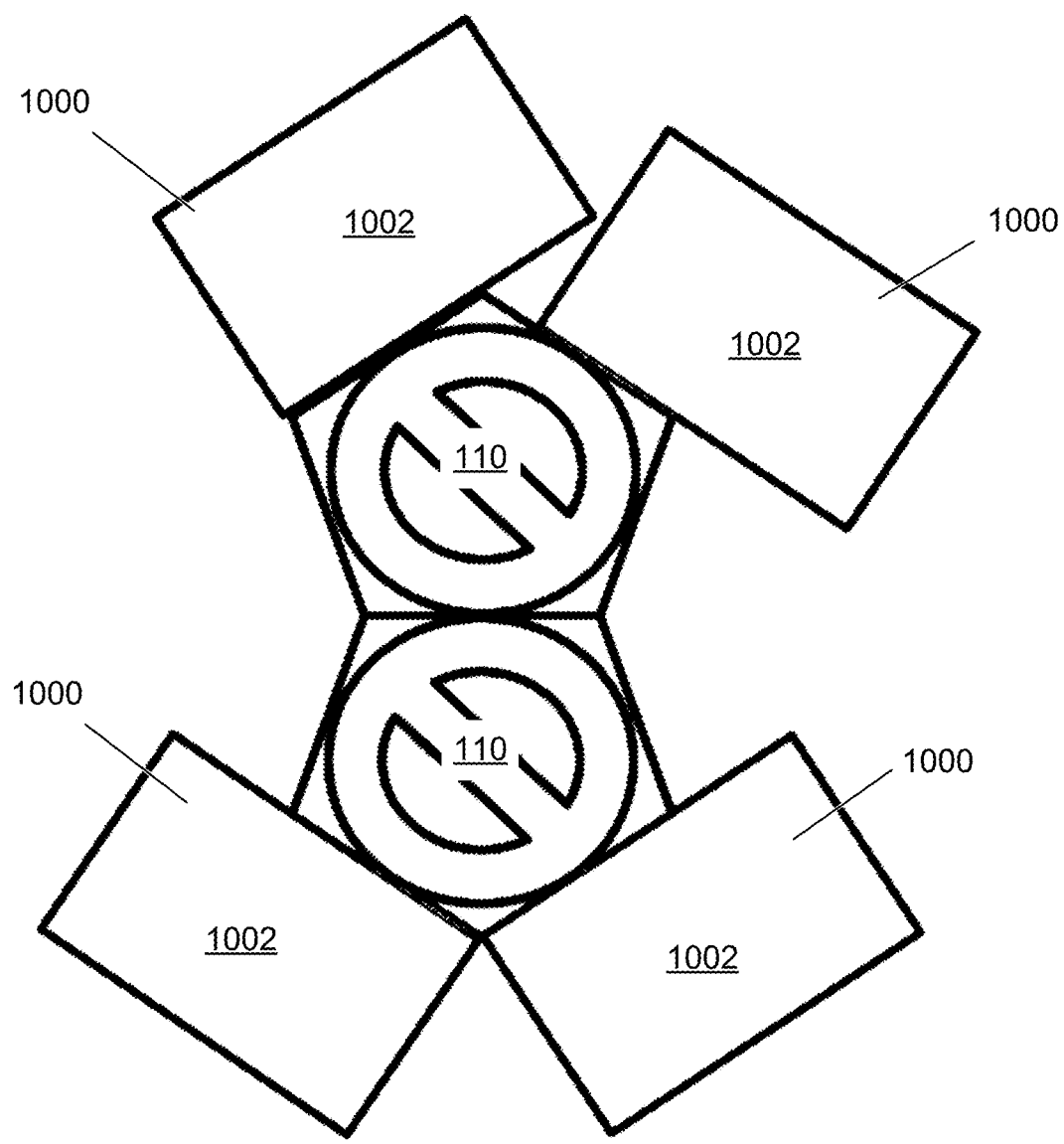
FIG. 40 is a schematic of the robot of FIG. 3 and a plurality of workstations in a cluster system.

In some embodiments, for example, a robot 110 can displace an object, such as a microplate configuration 10, for interaction with another robot 110, as part of a cluster system, as depicted in FIG. 40, such that the number of workstations 1000 in the system can be increased.

In some embodiments, for example, the base 302 is a mobility platform is configured for becoming co-operatively disposed in contact engagement with the reaction surface (e.g. the ground) for facilitating movement of the robot 110 across the reaction surface within a site 102. In such embodiments, for example, the base 302 include wheels for effectuating such movement across the reaction surface.

In some embodiments, for example, the accessories 502 can be removed from the accessory mounting member 496 and placed on a reaction surface, such as a lab bench, such that there is an absence of opposition of vertical displacement of the object 10, relative to the base 302, by the accessories 302.

In some embodiments, for example, the accessories 502 can be removed from the accessory mounting member 496, such that it is easier to ship the robot 110, and easier to set up the robot 110, and that other desired accessories 502 can be connected to the accessory mounting member 496 for the robot 110 to provide the desired functionality.

In some embodiments, for example, the robot 110 is functional in response to connection with a power source and with the server 114 and/or network 116. In some embodiments, for example, the robot 110 may be functional without connection to other external components, such as a hydraulic source or pneumatic source.

In some embodiments, for example, the extendibility and retractability of the first and second extendible arms 420A and 420B, relative to the mounting plate 404 and also relative to the base 302, is such that the entirety of the robot 110 does not have to be disposed in the space, in which the object 10 is disposed, for effectuating the interaction between the robot 110 and the object 10 (e.g. for grasping the object 10). In some embodiments, for example, the extendibility and retractability of the first and second extendible arms 420A and 420B, relative to the mounting plate 404 and also relative to the base 302, is such that the interaction between the robot 110 and the object 10, for grasping the object 10, is effectuated between a relatively small portion of the robot 110 (e.g. the end effector 410) and the object 10, and after the object 10 is grasped by the end effector 410, the object 10 is displaceable, via the first and second extendible arms 420A and 420B, relative to a relatively large portion of the robot 110 (e.g. the base 302, the frame 322, the accessory configuration 500, the support member or mounting plate 404, the lift mechanism 340, and the like), which, in some embodiments, for example, results in space savings.

In some embodiments, for example, while the object 10 is grasped by the end effector 410, the object 10 is displaceable, relative to the support member 404 and also relative to the base 302, via the first and second extendible arms 420A and 420B, such that the object 10 is displaced towards the relatively large portion of the robot 110 (e.g. towards the remaining portion of the robot 110). In some embodiments, for example, while the object 10 is grasped by the end effector 410, the object 10 is displaceable, relative to the support member 404 and also relative to the base 302, via the first and second extendible arms 420A and 420B, such that the object 10 is displaced towards a central space or central array of the robot 110 (e.g. towards the window 520 or the columnar space 540). In some embodiments, for example, while the object 10 is grasped by the end effector 410, the object 10 is displaceable, relative to the support member 404 and also relative to the base 302, via the first and second extendible arms 420A and 420B, such that the minimum spacing distance between the central space of the robot 110 and the object 10 is reduced. In some embodiments, for example, while the object 10 is grasped by the end effector 410, the object 10 is displaceable, relative to the support member 404 and also relative to the base 302, via the first and second extendible arms 420A and 420B, such that at least a portion of the object 10 is received in the window 520 or columnar space 540. In some embodiments, for example, while the object 10 is grasped by the end effector 410, the object 10 is displaceable, relative to the support member 404 and also relative to the base 302, via the first and second extendible arms 420A and 420B, such that the entirety of the object 10 is received in the window 520 or columnar space 540. In some embodiments, for example, while the object 10 is grasped by the end effector 410, the object 10 is displaceable, relative to the support member 404 and also relative to the base 302, via the first and second extendible arms 420A and 420B, such that the minimum spacing distance between the object 10 and the frame 322 is reduced. In some embodiments, for example, while the object 10 is grasped by the end effector 410, the object 10 is displaceable, relative to the support member 404 and also relative to the base 302, via the first and second extendible arms 420A and 420B, such that at least a portion of the object 10 is received in the frame 322. In some embodiments, for example, while the object 10 is grasped by the end effector 410, the object 10 is displaceable, relative to the support member 404 and also relative to the base 302, via the first and second extendible arms 420A and 420B, such that the entirety of the object 10 is received in the frame 322.

In some embodiments, for example, the extendibility and retractability of the first and second extendible arms 420A and 420B, relative to the mounting plate 404 and also relative to the base 302, is such that the interaction between the robot 110 and the object 10, for grasping the object 10, is effectuatable in a first space wherein the object 10 is disposed and wherein the relatively small portion of the robot 110 (e.g. the end effector 410, a portion of the terminal arm segment 454A) is receivable such that the interaction between the robot 110 and the object 10 is effectuatable, but wherein the remaining, relatively large portion of the robot 110 is not receivable, while the remaining portion of the robot 110 is disposed in a second space that is configured to receive the remaining portion of the robot 110. In some embodiments, for example, the second space is larger than the first space. In some embodiments, for example, the first space is a confined space.

In some embodiments, for example, a kit for modifying a robot, the robot comprising a base, includes robot adaptor components that comprise the object manipulator 402. In some embodiments, for example, the robot to be modified is a Selective Compliance Assembly Robot Arm or Selective Compliance Articulated Robot Arm (e.g. a SCARA robot), a collaborative robot (e.g. a cobot), or an articulated robot. In some embodiments, for example, while the robot adaptor components are installed on the robot, with effect that a modified robot is established, such that the modified robot includes the object manipulator and the base, the modified robot is configured to interact with the object 10, such as grasping the object 10, in a manner substantially similar to the manner by which the robot 110 is configured to interact with the object 10, as described herein. In some embodiments, for example, while the robot adaptor components are installed on the robot, with effect that a modified robot is established, the object manipulator functions as the end effector of the modified robot. In some embodiments, for example, the robot adaptor components further comprise the lift mechanism 340. In some embodiments, for example, while the robot adaptor components are installed on the robot, with effect that the modified robot is established, such that the modified robot includes the object manipulator 402, the lift mechanism 340, and the base, the object manipulator 402 is displaceable vertically by the lift mechanism 340, relative to the base, as described herein.

In the preceding description, for purposes of explanation, numerous details are set forth in order to provide a thorough understanding of the embodiments; however the specific details are not necessarily required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

The steps and/or operations in the flowcharts and drawings described herein are for purposes of example only. There may be many variations to these steps and/or operations without departing from the teachings of the present disclosure. For instance, the steps may be performed in a differing order, or steps may be added, deleted, or modified.

The coding of software for carrying out the above-described methods described for execution by a controller (or processor) or other apparatus is within the scope of a person of ordinary skill in the art having regard to the present disclosure. Machine readable code executable by one or more processors of one or more respective devices to perform the above-described method may be stored in a machine readable medium such as the memory of the data manager. The terms "software" and "firmware" are interchangeable within the present disclosure and comprise any computer program stored in memory for execution by a processor, comprising RAM memory, ROM memory, erasable programmable ROM (EPROM) memory, electrically EPROM (EEPROM) memory, and non-volatile RAM (NVRAM) memory. The above memory types are example only, and are thus not limiting as to the types of memory usable for storage of a computer program.

All values and sub-ranges within disclosed ranges are also disclosed. In addition, although the systems, devices and processes disclosed and shown herein may comprise a specific plurality of elements/components, the systems, devices, configurations, and assemblies may be modified to comprise additional or fewer of such elements/components. For example, although any of the elements/components disclosed may be referenced as being singular, the embodiments disclosed herein may be modified to comprise a plurality of such elements/components. The subject matter described herein intends to cover and embrace all suitable changes in technology.

Although the present disclosure is described, at least in part, in terms of methods, a person of ordinary skill in the art will understand that the present disclosure is also directed to the various components for performing at least some of the aspects and features of the described methods, be it by way of hardware (DSPs, ASIC, or FPGAs), software or a combination thereof. Accordingly, the technical solution of the present disclosure may be embodied in a non-volatile or non-transitory machine readable medium (e.g., optical disk, flash memory, etc.) having stored thereon executable instructions tangibly stored thereon that enable a processing device (e.g., a data manager) to execute examples of the methods disclosed herein.

The term "processor" may comprise any programmable system comprising systems using micro- or nano-processors/controllers, reduced instruction set circuits (RISC), application specific integrated circuits (ASICs), logic circuits, and any other circuit or processor capable of executing the functions described herein. The term "database" may refer to either a body of data, a relational database management system (RDBMS), or to both. As used herein, a database may comprise any collection of data comprising hierarchical databases, relational databases, flat file databases, object-relational databases, object oriented databases, and any other structured collection of records or data that is stored in a computer system. The above examples are example only, and thus are not intended to limit in any way the definition and/or meaning of the terms "processor" or "database".

The present disclosure may be embodied in other specific forms without departing from the subject matter of the claims. The described example embodiments are to be considered in all respects as being only illustrative and not restrictive. The present disclosure intends to cover and embrace all suitable changes in technology. The scope of the present disclosure is, therefore, described by the appended claims rather than by the foregoing description. The scope of the claims should not be limited by the embodiments set forth in the examples, but should be given the broadest interpretation consistent with the description as a whole.

What is claimed is:

1. An object manipulator, comprising:
    a first extendible arm;
    a second extendible arm;
    a support member; and
    an end effector, configured for grasping an object, comprising a first end effector counterpart and a second end effector counterpart, wherein the first end effector counterpart is disposed on the first extendible arm and the second end effector counterpart is disposed on the second extendible arm;
    wherein:
        the first extendible arm is extendible and retractable for displacing the first end effector counterpart, relative to the support member;
        the second extendible arm is extendible and retractable for displacing the second end effector counterpart, relative to the support member;
        the end effector is configurable in a grasping-effective configuration and a grasping-ineffective configuration, wherein:
            in the grasping-effective configuration, the first end effector counterpart and the second end effector counterpart are co-operatively configured for grasping the object; and
            in the grasping-ineffective configuration, the first end effector counterpart and the second end effector counterpart are co-operatively configured such that the end effector is ineffective for grasping the object, such that there is an absence of grasping of the object;
        the end effector and the object are configurable for disposition in a grasping-effectible relationship and a grasping-ineffective relationship, wherein, while the end effector is in the grasping-ineffective configuration, and:
            the end effector and the object are disposed in the grasping-effectible relationship, the first and second end effector counterparts are disposed, relative to the object, such that grasping of the object, by the end effector, is effectuatable via transition of the end effector from the grasping-ineffective configuration to the grasping-effective configuration; and
            the end effector and the object are disposed in the grasping-ineffective relationship, the first end effector counterpart and the second end effector counterpart are displaceable, relative to the object, such that the end effector and the object become disposed in the grasping-effective relationship, wherein the displacement of the first end effector counterpart and the second end effector counterpart, relative to the object, for effectuating the disposition of the end effector and the object in the grasping-effective relationship, includes displacement of the first end effector counterpart and the second end effector counterpart, relative to the object, via the first and second extendible arms; and
        while the object is grasped by the end effector, the object is displaceable, relative to the support member, via the first and second extendible arms.

2. The object manipulator of claim 1, wherein:
    the transition of the end effector from the grasping-ineffective configuration to the grasping-effective configuration, to effectuate the grasping of the object, while the end effector and the object are disposed in the grasping-effectible relationship, is effectuatable:
        while the first extendible arm is disposed in a retracted configuration and the second extendible arm is disposed in a retracted configuration, and
        also while the first extendible arm is disposed in an extended configuration and the second extendible arm is disposed in an extended configuration.

3. The object manipulator of claim 1, wherein:
    while: (i) the end effector is in the grasping-ineffective configuration, and (ii) the end effector and the object are disposed in the grasping-ineffective relationship:
        the displacement of the first end effector counterpart and the second end effector counterpart, relative to the object, for effectuating the disposition of the end effector and the object in the grasping-effective relationship, includes displacement of the first end effector counterpart and the second end effector counterpart, relative to the object, via extension of the first extendible arm and extension of the second extendible arm.

4. The object manipulator of claim 1, wherein:
    while: (i) the end effector is in the grasping-ineffective configuration, and (ii) the end effector and the object are disposed in the grasping-ineffective relationship:
        the displacement of the first end effector counterpart and the second end effector counterpart, relative to the object, for effectuating the disposition of the end effector and the object in the grasping-effective relationship, includes displacement of the first end effector counterpart and the second end effector counterpart, relative to the object, via retraction of the first extendible arm and retraction of the second extendible arm.

5. The object manipulator of claim 1, wherein:
while the end effector and the object are disposed in the grasping-effectible relationship:
the first end effector counterpart is disposed in opposing relationship with a first side surface of the object; and
the second end effector counterpart is disposed in opposing relationship with a second side surface of the object, wherein the second side surface is disposed on an opposite side of the object relative to the first side surface.

6. The object manipulator of claim 5, wherein:
while the end effector and the object are disposed in the grasping-ineffective relationship:
the first end effector counterpart is disposed in an offset relationship with the first side surface of the object; and
the second end effector counterpart is disposed in an offset relationship with the second side surface of the object.

7. The object manipulator of claim 1, wherein:
while: (i) the end effector is in the grasping-ineffective configuration, and (ii) the end effector and the object are disposed in the grasping-ineffective relationship:
the first and second end effector counterparts are disposed, relative to the object, such that there is an absence of grasping of the object, by the end effector, in response to the transition of the end effector from the grasping-ineffective configuration to the grasping-effective configuration.

8. The object manipulator of claim 1, wherein:
while the end effector is disposed in the grasping-effective configuration, relative to its disposition in the grasping-ineffective configuration, the first and second end effector counterparts are disposed closer together.

9. The object manipulator of claim 1, wherein:
the first extendible arm is displaceable laterally, relative to the support member;
the second extendible arm is displaceable laterally, relative to the support member;
wherein:
in transitioning from the grasping-effective configuration to the grasping-ineffective configuration:
the first extendible arm is displaced laterally, relative to the support member, in a first direction;
the second extendible arm is displaced laterally, relative to the support member, in a second direction that is opposite the first direction;
with effect that the minimum spacing distance between the first end effector counterpart and the second end effector counterpart is increased; and
in transitioning from the grasping-ineffective configuration to the grasping-effective configuration:
the first extendible arm is displaced laterally, relative to the support member, in the second direction;
the second extendible arm is displaced laterally, relative to the support member, in the first direction;
with effect that the minimum spacing distance between the first end effector counterpart and the second end effector counterpart is reduced.

10. The object manipulator of claim 9, wherein: (i) the lateral displacement of the first extendible arm, relative to the support member, and (ii) the lateral displacement of the second extendible arm, relative to the support member, occurs simultaneously.

11. The object manipulator of claim 9, wherein:
the lateral displacement of the first extendible arm is along a first extendible arm lateral displacement axis;
the lateral displacement of the second extendible arm is along a second extendible arm lateral displacement axis; and
the first extendible arm lateral displacement axis and the second extendible arm lateral displacement axis are disposed in a parallel relationship.

12. The object manipulator of claim 9, wherein:
the first extendible arm is extendible and retractable along a first extendible arm longitudinal displacement axis;
the second extendible arm is extendible and retractable along a second extendible arm longitudinal displacement axis; and
the first extendible arm longitudinal displacement axis and the second extendible arm longitudinal displacement axis are disposed in a parallel relationship.

13. The object manipulator of claim 12, wherein:
the first extendible arm lateral displacement axis and the first extendible arm longitudinal displacement axis are disposed in a perpendicular relationship; and
the second extendible arm lateral displacement axis and the second extendible arm longitudinal displacement axis are disposed in a perpendicular relationship.

14. The object manipulator of claim 9, wherein:
the extension and retraction of the first extendible arm is independent of the lateral displacement of the first extendible arm, relative to the support member; and
the extension and retraction of the second extendible arm is independent of the lateral displacement of the second extendible arm, relative to the support member.

15. The object manipulator of claim 1, wherein:
the first extendible arm is a first telescoping arm; and
the second extendible arm is a second telescoping arm.

16. The object manipulator of claim 1, wherein the extension and retraction of the first and second extendible arms occurs simultaneously.

17. The object manipulator of claim 1, wherein:
while the object is grasped by the end effector, the grasping of the object by the end effector is defeatable via transition of the end effector from the grasping-effective configuration to the grasping-ineffective configuration.

18. The object manipulator of claim 1, wherein:
the first end effector counterpart and the second end effector counterpart are disposed between the first extendible arm and the second extendible arm.

19. The object manipulator of claim 1, wherein:
the first extendible arm and the second extendible arm are disposed in opposing relationship.

20. The object manipulator of claim 1, wherein:
the object is a microplate.

21. The object manipulator of claim 1, wherein:
while the object is grasped by the end effector, the displaceability of the object, relative to the support member, is such that the minimum spacing distance between the object and the support member is reduced.

22. The object manipulator of claim 1, wherein:
while the object is grasped by the end effector, the displaceability of the object, relative to the support member, is such that the minimum spacing distance between the object and the support member is increased.

23. A kit for modifying a robot, the robot comprising a base, the kit comprising:
  robot adaptor components, comprising:
    an object manipulator, comprising:
      a first extendible arm;
      a second extendible arm; and
      an end effector, configured for grasping an object, comprising a first end effector counterpart and a second end effector counterpart, wherein the first end effector counterpart is disposed on the first extendible arm and the second end effector counterpart is disposed on the second extendible arm;
  wherein:
    while the robot adaptor components are installed on the robot, with effect that a modified robot is established, such that the modified robot includes the object manipulator and the base:
      the first extendible arm is extendible and retractable for displacing the first end effector counterpart, relative to the base;
      the second extendible arm is extendible and retractable for displacing the second end effector counterpart, relative to the base;
      the end effector is configurable in a grasping-effective configuration and a grasping-ineffective configuration, wherein:
        in the grasping-effective configuration, the first end effector counterpart and the second end effector counterpart are co-operatively configured for grasping the object; and
        in the grasping-ineffective configuration, the first end effector counterpart and the second end effector counterpart are co-operatively configured such that the end effector is ineffective for grasping the object, such that there is an absence of grasping of the object;
      the end effector and the object are configurable for disposition in a grasping-effectible relationship and a grasping-ineffective relationship, wherein, while the end effector is in the grasping-ineffective configuration, and:
        the end effector and the object are disposed in the grasping-effectible relationship, the first and second end effector counterparts are disposed, relative to the object, such that grasping of the object, by the end effector, is effectuatable via transition of the end effector from the grasping-ineffective configuration to the grasping-effective configuration; and
        the end effector and the object are disposed in the grasping-ineffective relationship, the first end effector counterpart and the second end effector counterpart are displaceable, relative to the object, such that the end effector and the object become disposed in the grasping-effective relationship, wherein the displacement of the first end effector counterpart and the second end effector counterpart, relative to the object, for effectuating the disposition of the end effector and the object in the grasping-effective relationship, includes displacement of the first end effector counterpart and the second end effector counterpart, relative to the object, via the first and second extendible arms; and
      while the object is grasped by the end effector, the object is displaceable, relative to the base, via the first and second extendible arms.

24. The kit of claim 23, wherein, while the modified robot is established:
  the transition of the end effector from the grasping-ineffective configuration to the grasping-effective configuration, to effectuate the grasping of the object, while the end effector and the object are disposed in the grasping-effectible relationship, is effectuatable:
    while the first extendible arm is disposed in a retracted configuration and the second extendible arm is disposed in a retracted configuration, and
    also while the first extendible arm is disposed in an extended configuration and the second extendible arm is disposed in an extended configuration.

25. The kit of claim 23, wherein:
  while the modified robot is established, and while: (i) the end effector is in the grasping-ineffective configuration, and (ii) the end effector and the object are disposed in the grasping-ineffective relationship:
    the displacement of the first end effector counterpart and the second end effector counterpart, relative to the object, for effectuating the disposition of the end effector and the object in the grasping-effective relationship, includes displacement of the first end effector counterpart and the second end effector counterpart, relative to the object, via extension of the first extendible arm and extension of the second extendible arm.

26. The kit of claim 23, wherein:
  while the modified robot is established, and while: (i) the end effector is in the grasping-ineffective configuration, and (ii) the end effector and the object are disposed in the grasping-ineffective relationship:
    the displacement of the first end effector counterpart and the second end effector counterpart, relative to the object, for effectuating the disposition of the end effector and the object in the grasping-effective relationship, includes displacement of the first end effector counterpart and the second end effector counterpart, relative to the object, via retraction of the first extendible arm and retraction of the second extendible arm.

27. The kit of claim 23, wherein:
  while the modified robot is established, and while the end effector and the object are disposed in the grasping-effectible relationship:
    the first end effector counterpart is disposed in opposing relationship with a first side surface of the object; and
    the second end effector counterpart is disposed in opposing relationship with a second side surface of the object, wherein the second side surface is disposed on an opposite side of the object relative to the first side surface.

28. The kit of claim 27, wherein:
  while the modified robot is established, and while the end effector and the object are disposed in the grasping-ineffective relationship:
    the first end effector counterpart is disposed in an offset relationship with the first side surface of the object; and
    the second end effector counterpart is disposed in an offset relationship with the second side surface of the object.

29. The kit of claim 23, wherein:
  while the modified robot is established, and while: (i) the end effector is in the grasping-ineffective configuration, and (ii) the end effector and the object are disposed in the grasping-ineffective relationship:
the first and second end effector counterparts are disposed, relative to the object, such that there is an absence of grasping of the object, by the end effector, in response to the transition of the end effector from the grasping-ineffective configuration to the grasping-effective configuration.

30. The kit of claim 23, wherein:
while the modified robot is established, and while the end effector is disposed in the grasping-effective configuration, relative to its disposition in the grasping-ineffective configuration, the first and second end effector counterparts are disposed closer together.

31. The kit of claim 23, wherein, while the modified robot is established:
the first extendible arm is displaceable laterally, relative to the base;
the second extendible arm is displaceable laterally, relative to the base;
wherein:
in transitioning from the grasping-effective configuration to the grasping-ineffective configuration:
the first extendible arm is displaced laterally, relative to the base, in a first direction;
the second extendible arm is displaced laterally, relative to the base, in a second direction that is opposite the first direction;
with effect that the minimum spacing distance between the first end effector counterpart and the second end effector counterpart is increased; and
in transitioning from the grasping-ineffective configuration to the grasping-effective configuration:
the first extendible arm is displaced laterally, relative to the base, in the second direction;
the second extendible arm is displaced laterally, relative to the base, in the first direction;
with effect that the minimum spacing distance between the first end effector counterpart and the second end effector counterpart is reduced.

32. The kit of claim 31, wherein: (i) the lateral displacement of the first extendible arm, relative to the base, and (ii) the lateral displacement of the second extendible arm, relative to the base, occurs simultaneously.

33. The kit of claim 31, wherein:
the lateral displacement of the first extendible arm is along a first extendible arm lateral displacement axis;
the lateral displacement of the second extendible arm is along a second extendible arm lateral displacement axis; and
the first extendible arm lateral displacement axis and the second extendible arm lateral displacement axis are disposed in a parallel relationship.

34. The kit of claim 31, wherein:
the first extendible arm is extendible and retractable along a first extendible arm longitudinal displacement axis;
the second extendible arm is extendible and retractable along a second extendible arm longitudinal displacement axis; and
the first extendible arm longitudinal displacement axis and the second extendible arm longitudinal displacement axis are disposed in a parallel relationship.

35. The kit of claim 34, wherein:
the first extendible arm lateral displacement axis and the first extendible arm longitudinal displacement axis are disposed in a perpendicular relationship; and the second extendible arm lateral displacement axis and the second extendible arm longitudinal displacement axis are disposed in a perpendicular relationship.

36. The kit of claim 31, wherein:
the extension and retraction of the first extendible arm is independent of the lateral displacement of the first extendible arm, relative to the base; and
the extension and retraction of the second extendible arm is independent of the lateral displacement of the second extendible arm, relative to the base.

37. The kit of claim 23, wherein:
the first extendible arm is a first telescoping arm; and
the second extendible arm is a second telescoping arm.

38. The kit of claim 23, wherein the extension and retraction of the first and second extendible arms occurs simultaneously.

39. The kit of claim 23, wherein:
while the modified robot is established, and while the object is grasped by the end effector, the grasping of the object by the end effector is defeatable via transition of the end effector from the grasping-effective configuration to the grasping-ineffective configuration.

40. The kit of claim 23, wherein:
the first end effector counterpart and the second end effector counterpart are disposed between the first extendible arm and the second extendible arm.

41. The kit of claim 23, wherein:
the first extendible arm and the second extendible arm are disposed in opposing relationship.

42. The kit of claim 23, wherein:
the object is a microplate.

43. The kit of claim 23, wherein:
while the modified robot is established, and while the object is grasped by the end effector, the displaceability of the object, relative to the base, is such that the minimum spacing distance between the object and the base is reduced.

44. The kit of claim 23, wherein:
while the modified robot is established, while the object is grasped by the end effector, the displaceability of the object, relative to the base, is such that the minimum spacing distance between the object and the base is increased.

45. The kit of claim 23, wherein:
the robot adaptor components further comprise a lift mechanism;
wherein, the robot adaptor components are installed on the robot, with effect that the modified robot is established, such that the modified robot includes the object manipulator, the lift mechanism, and the base, the object manipulator is displaceable vertically by the lift mechanism, relative to the base.

46. A robot, comprising:
a base;
an object manipulator, comprising:
a first extendible arm;
a second extendible arm; and
an end effector, configured for grasping an object, comprising a first end effector counterpart and a second end effector counterpart, wherein the first end effector counterpart is disposed on the first extendible arm and the second end effector counterpart is disposed on the second extendible arm;
wherein:
the first extendible arm is extendible and retractable for displacing the first end effector counterpart, relative to the base;

the second extendible arm is extendible and retractable for displacing the second end effector counterpart, relative to the base;

the end effector is configurable in a grasping-effective configuration and a grasping-ineffective configuration, wherein:

in the grasping-effective configuration, the first end effector counterpart and the second end effector counterpart are co-operatively configured for grasping the object; and in the grasping-ineffective configuration, the first end effector counterpart and the second end effector counterpart are co-operatively configured such that the end effector is ineffective for grasping the object, such that there is an absence of grasping of the object;

the end effector and the object are configurable for disposition in a grasping-effectible relationship and a grasping-ineffective relationship, wherein, while the end effector is in the grasping-ineffective configuration, and:

the end effector and the object are disposed in the grasping-effectible relationship, the first and second end effector counterparts are disposed, relative to the object, such that grasping of the object, by the end effector, is effectuatable via transition of the end effector from the grasping-ineffective configuration to the grasping-effective configuration; and the end effector and the object are disposed in the grasping-ineffective relationship, the first end effector counterpart and the second end effector counterpart are displaceable, relative to the object, such that the end effector and the object become disposed in the grasping-effective relationship, wherein the displacement of the first end effector counterpart and the second end effector counterpart, relative to the object, for effectuating the disposition of the end effector and the object in the grasping-effective relationship, includes displacement of the first end effector counterpart and the second end effector counterpart, relative to the object, via the first and second extendible arms; and while the object is grasped by the end effector, the object is displaceable, relative to the base, via the first and second extendible arms.

* * * * *